United States Patent
Marchewka et al.

(10) Patent No.: US 12,366,787 B2
(45) Date of Patent: Jul. 22, 2025

(54) OPTICAL ACTIVATION OF CHEMICAL ENTITIES IN ELECTROPHORETIC DISPERSIONS FOR DISPLAY DEVICES

(71) Applicant: HALION DISPLAYS INC., Kitchener (CA)

(72) Inventors: Ryan Phillip Marchewka, Waterloo (CA); Matthew Thomas Lavrisa, Ottawa (CA); Injla Khan, Kitchener (CA)

(73) Assignee: HALION DISPLAYS INC., Guelph (CA)

( * ) Notice: Subject to any disclaimer, the term of this patent is extended or adjusted under 35 U.S.C. 154(b) by 907 days.

(21) Appl. No.: 17/291,413

(22) PCT Filed: Sep. 30, 2019

(86) PCT No.: PCT/IB2019/058306
§ 371 (c)(1),
(2) Date: May 5, 2021

(87) PCT Pub. No.: WO2020/095127
PCT Pub. Date: May 14, 2020

(65) Prior Publication Data
US 2021/0373405 A1    Dec. 2, 2021

Related U.S. Application Data

(60) Provisional application No. 62/755,767, filed on Nov. 5, 2018, provisional application No. 62/755,746, filed on Nov. 5, 2018.

(51) Int. Cl.
*G02F 1/167*        (2019.01)
*C09K 9/02*         (2006.01)
(Continued)

(52) U.S. Cl.
CPC ............... *G02F 1/167* (2013.01); *C09K 9/02* (2013.01); *G02F 1/0018* (2013.01);
(Continued)

(58) Field of Classification Search
CPC .. G02F 1/167; G02F 1/1685; G02F 2202/023; C09K 9/02
See application file for complete search history.

(56) References Cited

U.S. PATENT DOCUMENTS 6,825,290 B2 *  11/2004  Adam ................ C08F 8/00
                                                526/78
9,958,797 B1 *   5/2018  Lu ................. G03G 9/08708
(Continued)

FOREIGN PATENT DOCUMENTS

CN        1820223 A      8/2006
CN     101828785 A       9/2010
(Continued)

OTHER PUBLICATIONS

ISA/CA, International Search Report and Written Opinion, Dec. 31, 2019, re PCT International Patent Application No. PCT/IB2019/058306.

*Primary Examiner* — Bijan Ahvazi
(74) *Attorney, Agent, or Firm* — Perry + Currier Inc.

(57) ABSTRACT

Example electrophoretic dispersions for use in electrophoretic displays are provided. An example electrophoretic dispersion includes a first chemical entity and a second chemical entity. The first and second chemical entities are to be induced to reversibly interact to switch between a separated state and an optically active state in response to a change in an electromagnetic field passing through the electrophoretic dispersion to change an optical property of the electrophoretic dispersion. Electrophoretic display devices, methods for operating electrophoretic display devices, non-transitory machine-readable storage mediums, (Continued)

and methods for producing electrophoretic dispersions are also provided.

20 Claims, 30 Drawing Sheets

(51) Int. Cl.
    *G02F 1/00*          (2006.01)
    *G02F 1/1685*      (2019.01)
    *G02F 1/1675*      (2019.01)

(52) U.S. Cl.
    CPC .......... *G02F 1/1685* (2019.01); *G02F 1/1675* (2019.01); *G02F 2001/1678* (2013.01); *G02F 2202/023* (2013.01)

(56) References Cited

U.S. PATENT DOCUMENTS

| | | |
|---|---|---|
| 2002/0114557 A1 | 8/2002 | Zhang et al. |
| 2002/0145792 A1 | 10/2002 | Jacobson et al. |
| 2002/0171620 A1 | 11/2002 | Gordon, II et al. |
| 2003/0210455 A1 | 11/2003 | Tseng et al. |
| 2004/0226820 A1 | 11/2004 | Webber et al. |
| 2005/0213191 A1 | 9/2005 | Whitesides et al. |
| 2007/0285843 A1 | 12/2007 | Tran |
| 2008/0002333 A1 | 1/2008 | Vincent et al. |
| 2008/0013155 A1 | 1/2008 | Honeyman et al. |
| 2010/0002287 A1 | 1/2010 | Naijo et al. |
| 2011/0216392 A1 | 9/2011 | Baisch et al. |
| 2011/0286081 A1 | 11/2011 | Jacobson |
| 2013/0193385 A1 | 8/2013 | Li et al. |
| 2014/0376081 A1 | 12/2014 | Yokokawa et al. |
| 2015/0124312 A1 | 5/2015 | Mitsugi et al. |
| 2016/0026062 A1 | 1/2016 | Zhang |

FOREIGN PATENT DOCUMENTS

| | | | | |
|---|---|---|---|---|
| CN | 104813413 A | | 7/2015 | |
| EP | 1507165 A1 | | 2/2005 | |
| JP | 2005227795 A | | 8/2005 | |
| JP | 2008241806 A | | 10/2008 | |
| JP | 2013235263 A | | 11/2013 | |
| JP | 2015018097 A | * | 1/2015 | ............. G02F 1/167 |
| JP | 2015075542 A | | 4/2015 | |
| JP | 6463651 B2 | | 2/2019 | |
| TW | 200635661 A | | 10/2006 | |
| TW | 201733968 A | | 10/2017 | |
| TW | 201835199 A | | 10/2018 | |
| WO | WO-9803896 A1 | | 1/1998 | |
| WO | WO-2011058725 A1 | | 5/2011 | |
| WO | WO-2018070094 A1 | | 4/2018 | |

* cited by examiner

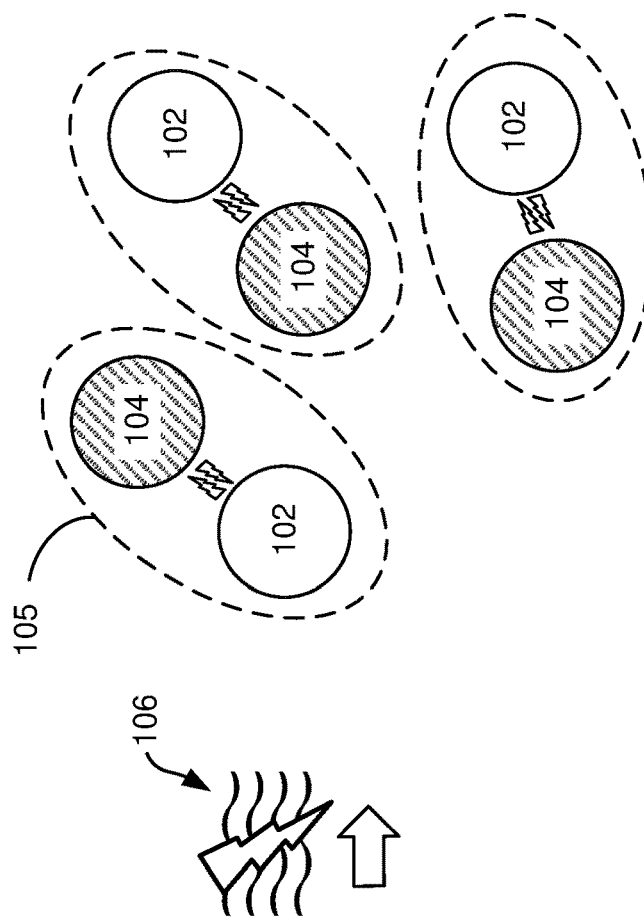
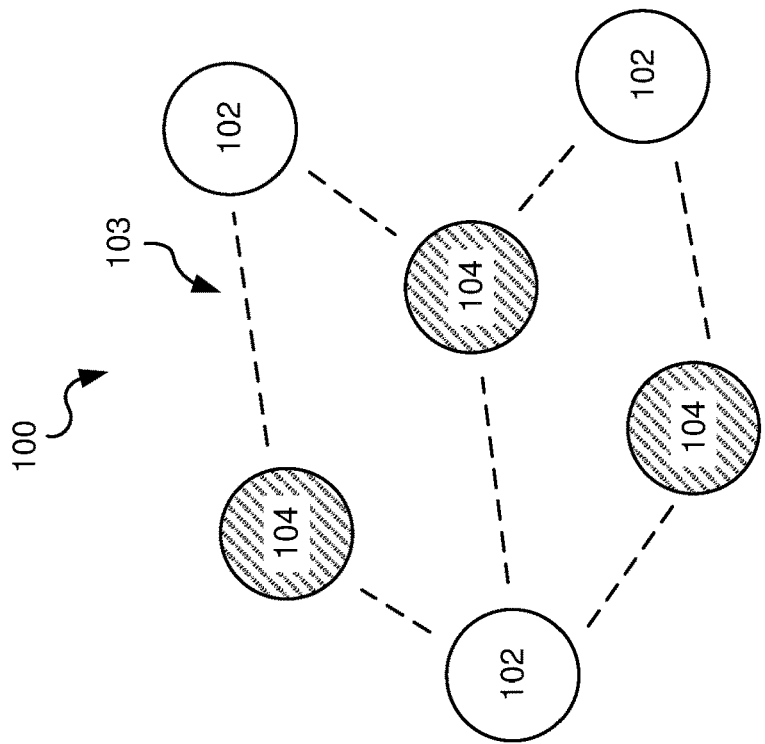
FIG. 1

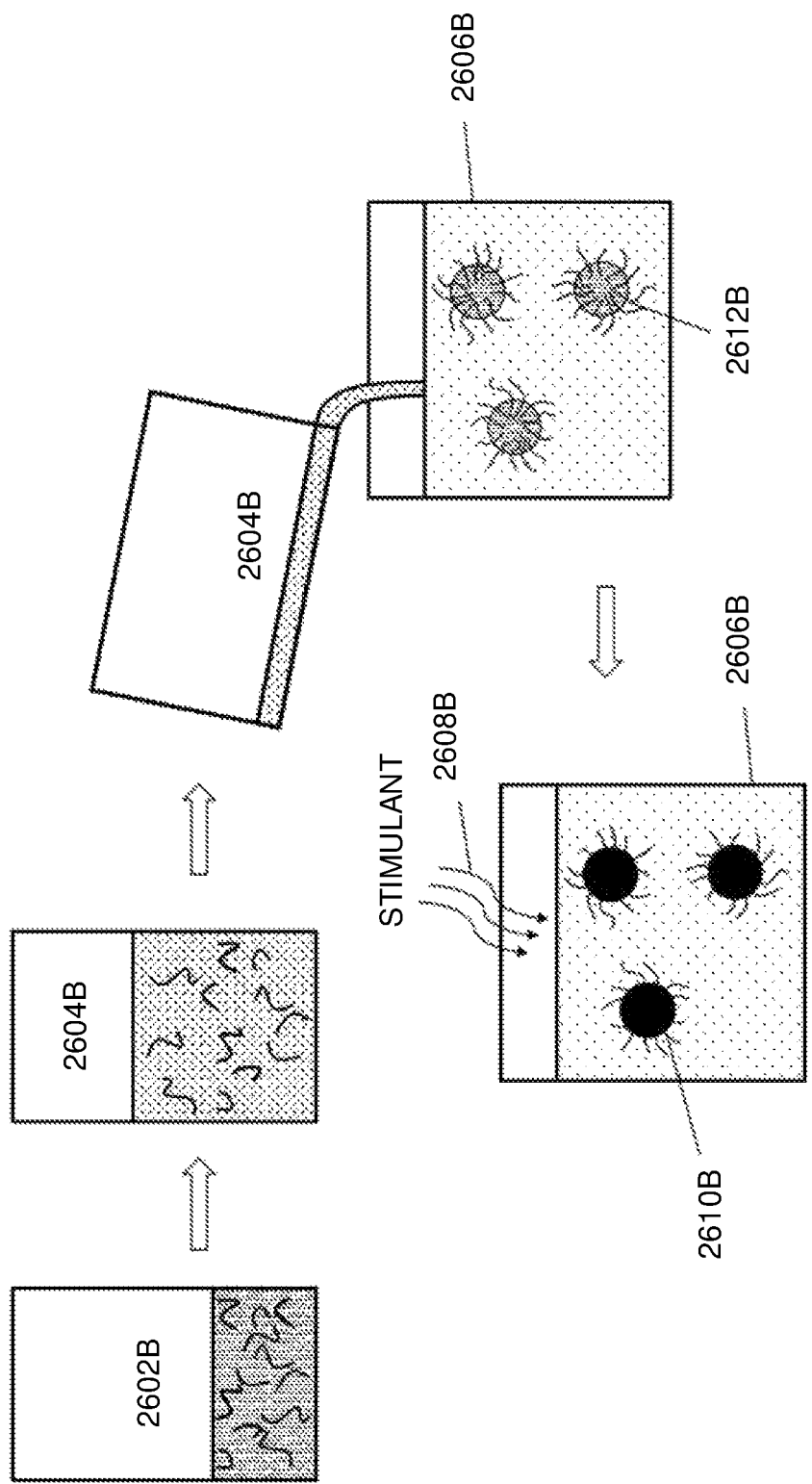

OPTICAL ACTIVATION OF CHEMICAL ENTITIES IN ELECTROPHORETIC DISPERSIONS FOR DISPLAY DEVICES

CROSS-REFERENCE TO RELATED APPLICATIONS

This application claims priority to U.S. Provisional Application 62/755,767, filed Nov. 5, 2018, and U.S. Provisional Application 62/755,746, filed Nov. 5, 2018 the entirety of which is incorporated herein by reference.

FIELD

The present specification relates to display devices, and in particular to electrophoretic display devices.

BACKGROUND

A display device may operate according to an additive or subtractive colour system. An additive colour system involves the use of a combination of different dyes which reflect different bands of the electromagnetic spectrum, typically in the red, green, and blue visible light portions of the electromagnetic spectrum. A subtractive colour system involves the use of a combination of different dyes which, in contrast, absorb different bands of the electromagnetic spectrum, again, usually in the red, green and blue visible light portions of the electromagnetic spectrum, resulting in dyes which are cyan, magenta and yellow, respectively. In either system, images and video may be displayed by varying the degree to which the dyes are used in each pixel.

An example of an additive colour system is a liquid crystal (LC) display. An LC display employs colour filters of red, green, and blue subpixels situated close together. The display uses a liquid crystal cell to vary the intensity of light passing through the colour filters. The intensity of light passing through the subpixels can be controlled to generate images. LC displays have the drawback that a significant portion of the total available light intensity is lost, on average about 67%, since each colour filter absorbs all of the wavelengths that the other two colour filters would otherwise pass. Without a sufficiently bright light source, an LC display typically provides a dim image with low colour contrast, especially under outdoor lighting conditions, and even under typical indoor lighting conditions.

An example of a subtractive colour system is an electrowetting display. An electrowetting display which employs colour filters of overlapping layers of pixels containing cyan, magenta, or yellow oil droplets. The oil droplets can be controlled to coalesce into a small droplet in the corner of a pixel, so as to absorb little light, or to be stretched out to cover some or all of the pixel, so as to absorb more light. The light that ultimately passes through each of the layers can be of a wide range of colours. A drawback of an electrowetting display is that the fluid properties of the oils dictate that some portion of the pixels are always covered by oils, which subtracts light from the display, thereby reducing the overall brightness of the display.

Another kind of display device is an electrochromic display, in which an electric current is applied to change an oxidation state of a material, causing the material to change from one colour state to another. Electrochromic display devices generally do not suffer from the same optical losses as LC displays or electrowetting displays, but have the disadvantages that they are slow and consume a significant amount of power to cause pixels to change colour, and that side reactions reduce the lifetime of the display.

SUMMARY

According to an aspect of the specification, an electrophoretic dispersion for use in an electrophoretic display is provided. The electrophoretic dispersion includes a first chemical entity and a second chemical entity. The first and second chemical entities are to be induced to reversibly interact to switch between a separated state and an optically active state in response to a change in an electromagnetic field passing through the electrophoretic dispersion to change an optical property of the electrophoretic dispersion.

According to another aspect of the specification, an electrophoretic display device is provided. The electrophoretic display device includes a display including a pixel chamber to contain an electrophoretic dispersion and to convey an optical property of the electrophoretic dispersion. The electrophoretic dispersion is to contain a first chemical entity and a second chemical entity. The electrophoretic display device further includes electrodes to alter an electromagnetic field passing through the pixel chamber to induce the first and second chemical entities to reversibly switch between a separated state and an optically active state to change an optical property of the electrophoretic dispersion. The electrophoretic display device further includes a controller to control the electrodes to change the electromagnetic field to cause the pixel chamber to convey an optical property corresponding to an image to be displayed by the display.

According to another aspect of the specification, method for operating an electrophoretic display device is provided. The method involves obtaining image data representing an image to be displayed by the electrophoretic display device. The method further involves generating a mapping of voltages to pixel electrodes of the electrophoretic display device, the pixel electrodes to control pixel chambers containing component chemical entities that exhibit a first optical property when induced by an electromagnetic field to adopt a separated state and that exhibit a second optical property when induced by an electromagnetic field to adopt an active state. The method further involves applying the mapping of voltages to the pixel electrodes to cause the component chemical entities to adopt the separated state or the active state.

According to another aspect of the specification, a non-transitory machine-readable storage medium comprising instructions that when executed cause a processor of a computing device to operate an electrophoretic display device is provided. The instructions, when executed, cause the processor to obtain image data representing an image to be displayed by an electrophoretic display device, generate a mapping of voltages to pixel electrodes of the electrophoretic display device, the pixel electrodes to control pixel chambers containing component chemical entities that exhibit a first optical property when induced by an electromagnetic field to adopt a separated state and that exhibit a second optical property when induced by an electromagnetic field to adopt an active state, and apply the mapping of voltages to the pixel electrodes to cause the component chemical entities to adopt the separated state or the active state.

According to another aspect of the specification, a method for producing an electrophoretic dispersion for use in an electrophoretic display is provided. The method involves fabricating a charged polymeric core, fabricating a polymeric corona or a precursor to the polymeric corona, and embedding component chemical entities in the polymeric corona or precursor to the polymeric corona. The component chemical entities to exhibit a first optical property when induced by an electromagnetic field to adopt a separated state and that exhibit a second optical property when induced by an electromagnetic field to adopt an active state.

According to another aspect of the specification, a method for producing an electrophoretic dispersion for use in an electrophoretic display is provided. The method involves combining an amphiphilic block copolymer, a hydrophobic monomer, an ionic surfactant, and a radical initiator in a hydrophobic phase. The method further involves combining the hydrophobic phase with a hydrophilic phase to form a nanoemulsion including a hydrophobic droplet suspended in the hydrophilic phase and ionic surfactant coalescing around the hydrophobic droplet. The method further involves activating the radical initiator to crosslink a hydrophobic block of the amphiphilic block copolymer with the hydrophobic monomer to form a polymeric particle having a polymeric corona, the ionic surfactant imparting a charge to the polymeric corona. The method further involves combining the nanoemulsion with a lipophilic counter-ion to neutralize the charge of the polymeric particle. The method further involves functionalizing the polymeric corona of the polymeric particle to couple a chemical entity to hydrophilic block of the amphiphilic block copolymer of the polymeric particle to form a first part of an electrophoretic dispersion, the chemical entity to be induced to interact with a complementary component chemical entity of a second part of the electrophoretic dispersion to change an optical property of the electrophoretic dispersion in response to a change in an electromagnetic field passing through the electrophoretic dispersion.

BRIEF DESCRIPTION OF THE DRAWINGS

Non-limiting embodiments are now described, by way of example only, with reference to the attached Figures.

FIG. 1 is a schematic diagram of an example electrophoretic dispersion for an electrophoretic display.

FIG. 19A is a schematic diagram of an example pixel chamber incorporated into a reflective display.

FIG. 19B is a schematic diagram of an example pixel chamber incorporated into a side-lit reflective display.

FIG. 19C is a schematic diagram of an example pixel chamber incorporated into a back-lit transmissive display.

FIG. 26C is a schematic diagram depicting example stages of the production of an electrophoretic dispersion according to the method of FIG. 26B.

DETAILED DESCRIPTION

Figure 2:
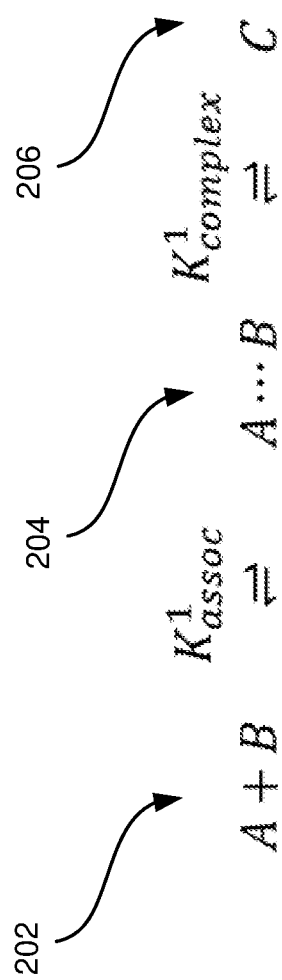
FIG. 2 is a chemical equation showing an example scheme by which two chemical entities interact to form an optically active state, the optically active state being a charge transfer complex.

An electrophoretic display generates images by causing particles to move within suspension fluids contained inside pixel chambers. The particles are electrically charged and therefore can be made to move in response to changes in an electromagnetic field passing through the suspension fluid. The particles also exhibit particular absorption spectra which, if the particles are properly located in the pixel chambers, can be transmitted or reflected by the pixel chambers themselves to generate images. For example, a pixel chamber may transmit or reflect an absorption spectra of a group of particles contained within it only if the particles are positioned to cover a transparent forward-facing side of the pixel chamber. If the particles do not cover the forward-facing side of the pixel chamber, a different absorption spectra is transmitted or reflected by the pixel chamber, such as the absorption spectra of another component of the suspension fluid which occupies the forward-facing side of the pixel chamber. Thus, the pixels of an electrophoretic display may be changed by movement of particles inside corresponding pixel chambers. The suspension fluid containing the charged particles capable of moving in response to an electromagnetic field may be termed an electrophoretic dispersion.

Such conventional electrophoretic displays are limited by the speed with which the charged particles are able to move through the electrophoretic dispersions to the appropriate location. This limitation corresponds to a limit in the refresh rate of the display device and its capability to display video. Such conventional electrophoretic displays are also limited in that the particles, even when not being used to exhibit their absorption spectra, nevertheless persist elsewhere in the suspension fluid. The persistence of these unused particles may result in an overall loss of brightness of the display. Such limitations to refresh rate and brightness are common in several other display technologies like reflective LC displays, electrowetting displays, and electrochromic displays.

These limitations may be avoided in an electrophoretic display if the mechanism by which the colour, or other optical property, of the pixel chambers can be controlled in a manner that is not dependent on the bulk movement of chemical entities into and out of the line of sight, and if the persistence of unused chemical entities in the suspension fluid can be avoided.

Such a mechanism may involve the use of two chemical entities which may be induced to reversibly interact to achieve an optically active state which causes a change in an optical property exhibited by the pixel chamber in which the chemical entities are contained. The first and second chemical entities may alternate between a separated state when sufficiently distant from one another and the optically active state when in sufficiently close proximity. The chemical entities may alternate between the separated state and the optically active state by moving together or apart in response to a change in an electromagnetic field. Chemical entities which interact in this way may be termed component chemical entities or complementary chemical entities.

Such an electrophoretic dispersion may be incorporated into a colour filter of an electrophoretic display device. The electrophoretic display device may be capable of achieving high transmittance and degree of saturation along with a high refresh rate and low power requirements. The electrophoretic display device may include a reflective display or a transmissive display. Such a reflective display may be edge-lit or side-lit, or may include no active lighting, and rather, lighting may be provided by reflecting incident light. The electrophoretic display device may include a transmissive display, which may include a back light.

Although the optical property-changing mechanism involves the movement of chemical entities, the optical change may be achieved by the movement of chemical entities over shorter distances than required by mechanisms which involve the movement of particles from one end of a pixel chamber to the other. Further, since the optically active state is generated by an interaction between chemical entities rather than the movement of particles having fixed optical properties, there is no persistence of unused particles having undesired optical properties in the electrophoretic dispersion. Rather, the electrophoretic dispersion may adopt a colourless state when its chemical entities are not in the optically active state. Adopting a colourless state when not in the optically active state may allow light to pass through the pixel chamber without significant loss in brightness. Thus, layers of pixel chambers may be stacked on top of one another, with each layer of pixel chamber contributing a different colour to the colour filter, to provide a full colour display with significantly less brightness loss than other display technologies.

FIG. 1 is a schematic diagram of an example electrophoretic dispersion 100 for use in an electrophoretic display. The electrophoretic dispersion 100 includes a first chemical entity 102 and a second chemical entity 104.

The first and second chemical entities 102, 104 may be induced to reversibly switch between a separated state 103 and an optically active state 105 in response to a change in an electromagnetic field 106 passing through the electrophoretic dispersion 100 to change an optical property of the electrophoretic dispersion 100. In other words, the chemical entities 102, 104 in the separated state 103 impart a first optical property to the electrophoretic dispersion 100, and the chemical entities 102, 104 in the optically active state 105 impart a second optical property to the electrophoretic dispersion 100, the second optical property being different from the first optical property.

The change in the electromagnetic field 106 may include substantially generating the electromagnetic field 106, substantially eliminating the electromagnetic field 106, increasing an intensity of the electromagnetic field 106, or decreasing an intensity of the electromagnetic field 106. In other words, in some examples, the change in the electromagnetic field 106 may be binary, in that substantially all of the chemical entities 102, 104 switch on or off between separated and optically active in states 103, 105 respectively, by generation or removal of the electromagnetic field 106. In other examples, the change in the electromagnetic field 106 may be continuous, in that a proportion of the chemical entities 102, 104 change from the separated state 103 to the optically active state 105, or change from the separated state 103 to the optically active state 105, by increasing or decreasing the intensity of the electromagnetic field 106.

The optical property changed by switching the first and second chemical entities 102, 104 between the separated state 103 and the optically active state 105 may include an absorption spectrum exhibited by the electrophoretic dispersion 100. In other words, the electrophoretic dispersion 100 may exhibit a first colour, degree of saturation, or other optical property when the chemical entities 102, 104, or a significant proportion thereof, are in the separated state 103, and the electrophoretic dispersion 100 may exhibit a second colour, degree of saturation, or other optical property when the chemical entities 102, 104, or a significant proportion thereof, are in the optically active state 105. Therefore, application or adjustment of the electromagnetic field 106 may cause a change in colour, degree of saturation, or another optical property of the image being displayed by the electrophoretic device.

The separated state 103 may be achieved by the first and second chemical entities 102, 104 being sufficiently distant from one another in the electrophoretic dispersion 100 such that the optical property associated with the separated state 103 is adopted. The optically active state 105 may be achieved by a reversible chemical or conformational change of at least one of the first and second chemical entities 102, 104 caused by the first and second chemical entities 102, 104 being in close proximity. In close proximity, the chemical entities 102, 104 may me able to experience intramolecular forces between one another. For example, the first chemical entity 102 may be an electron acceptor, the second chemical entity 104 may be an electron donor, and the optically active state 105 may be an optically active charge transfer complex state which exhibits a different absorption spectrum than any proportional sum of the chemical entities 102, 104. As another example, the first chemical entity 102 may be an activatable tautomer, the second chemical entity 104 may be a stabilizer of the activatable tautomer, and the optically active state 105 may be the activatable tautomer being stabilized in an optically active state. In such examples, "activatable" may mean "mutable" in that the activatable tautomer may exhibit an absorption spectrum which is in the visible spectrum, and yet may be induced by the stabilizer to exhibit an absorption spectrum which is not in the visible spectrum, and thus the activatable tautomer may be referred to as a "mutable" tautomer.

FIG. 2 is a chemical equation showing an example set of equilibrium states whereby two chemical entities, an electron acceptor (A) and an electron donor (B), interact to form an optically active charge transfer complex (C) in an electrophoretic dispersion.

In a separated state 202, the chemical entities A and B are separated by a distance great enough that they cannot directly interact with one another. In an associating stated 204, the chemical entities A and B are in sufficiently close proximity that they are able to interact with one another via intermolecular interactions such as van der Waals forces, dipole-dipole interactions, quadrupole interactions, pi interactions, hydrogen bonding or ionic interactions. In an optically active state 206, the chemical entities A and B form an optically active charge transfer complex (C). The equilibrium constants $K^1_{assoc}$ and $K^1_{complex}$ represent equilibrium constants of association of A and B and of complexation of A and B, respectively. The optically active state 206 is a stable state in which A and B form a complex C under the electromagnetic conditions of the electrophoretic dispersion.

In the associating state 204, due at least in part to the weak nature of many intermolecular interactions, the separated state 202 and associating state 204 reach an equilibrium which depends on the strength of the interaction between A and B and the number of pairs of chemical entities A and B which are in close enough physical proximity to form the associating state.

The process of transitioning from the separated state 202 to the associating state 204, and from the associating state 204 to the optically active state 206, are reversible processes, with each of the three states reaching an equilibrium. Further, the overall transition from the separated state 202 to the optically active state 206 is a reversible process. When A and B are sufficiently physically separated, this equilibrium is substantially shifted to the left because the association equilibrium constant $K^1_{assoc}$ is forced to be small. However, when A and B are brought into close proximity, the equilibrium shifts towards the optically active state 206.

The optically active state 206 has a different absorption spectrum than any proportional sum of the spectra of the component chemical entities A and B in the separated state 202. As a result, if the association equilibrium constant, $K^1_{assoc}$, and the complexation equilibrium constant, $K^1_{complex}$, are high enough, the absorption spectrum of a significant portion of the electrophoretic dispersion can be measurably changed by alternatively bringing the component chemical entities A and B into close proximity and/or separating the component chemical entities A and B.

The equilibrium is primarily manipulated by changing the number of component chemical entities A and B that are in close enough proximity to one another to associate, which effectively changes $K^1_{assoc}$. Although high $K^1_{assoc}$ and $K^1_{complex}$ tend to produce the optically active state 206, it is notable that values of the $K^1$ equilibrium constants above about $10^8$ may not be desirable, because this can hinder the dissociation of the optically active state 206 and associating state 204 back into the separated state 202. It is important to allow some degree of dissociation in the right to left direction to allow for reversibility of the process. As such, a range of $K^1_{assoc}$ and $K^1_{complex}$ values between 0.01 and $10^8$ is preferred, between 1 to $10^6$ is more preferred, and between $10^3$ to $10^5$ is most preferred.

In applications in which A and B are selected to cause a change in exhibited absorption spectra, the electron acceptor (A) may be molecule which is relatively electron-deficient, has a high ionization potential, and has a HOMO-LUMO band gap which places its longest absorption wavelength outside of the visible spectrum. Further, the electron donor (B) may be a molecule which is has low ionization potential and a HOMO-LUMO band gap which places its longest absorption wavelength outside of the visible spectrum.

Figure 3:
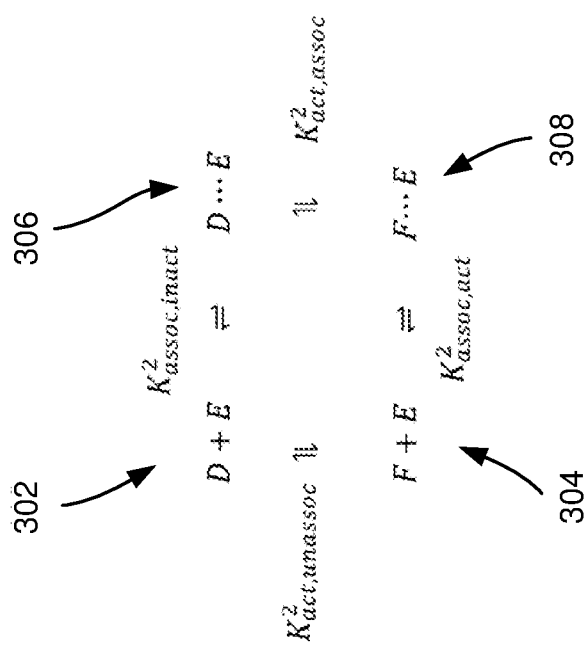
FIG. 3 is a chemical equation showing an example scheme by which two chemical entities interact to form an optically active state, the optically active state including one of the chemical entities being in a particular tautomeric form.

FIG. 3 is a chemical reaction equation showing another example set of equilibrium states whereby two chemical entities, an activatable tautomer (D) and a stabilizer (E) of the activatable tautomer, interact to form an optically active form (F) of the activatable tautomer in an electrophoretic dispersion.

In the present example, the activatable tautomer has an energetic preference for the first form, D, over the second form F. Form D has a different absorption spectrum than form F. While form D may be the predominant form of the mutable chemical entity, form F is still kinetically and thermodynamically possible at temperatures around and above room temperature, and occurs naturally in solution expressed by the equilibrium constant $K^2_{act,unassoc}$. This equilibrium constant is by definition less than or equal to 1, or else form D and form F would simply switch roles in the scheme.

Chemical entity E, the stabilizing entity in this scheme, either stabilizes the energetically-preferred form D, in which case it is said to be deactivating, or it can stabilize form F, in which case it is said to be activating, by its interaction with the activatable tautomer.

In this scheme, there is depicted an inactive unassociated state 302, in which the activatable tautomer is in the optically inactive form. The inactive unassociated state 302 is the most preferred state when the activatable tautomer and the stabilizing entity E are sufficiently physically distant from one another. However, an active unassociated state 304 can also arise when the activatable tautomer and the stabilizing entity E are physically separated, if the activatable tautomer spontaneously changes form from the optically inactive form D to the optically active form F. Generally, the active unassociated state 304 is less preferred than the inactive unassociated state 302 because the equilibrium constant $K^2_{act,unassoc}$ is by definition less than or equal to 1. When the activatable tautomer and the stabilizing entity E are brought into close enough proximity to allow their interaction by intermolecular forces, the equilibrium constants $K^2_{assoc,inact}$ and $K^2_{assoc,act}$ are substantially increased in magnitude, which shifts the equilibrium in the direction of the inactive associated state 306 and the optically active state 308. The optically active state 308 may also be referred to as an "interacting" state. In summary, states denoted by D+E and F+E, states 302 and 304 respectively, are called unassociated states, where the two component chemical entities are separated enough that intermolecular interactions between them have a negligible effect on their behaviour. Conversely, states denoted by D . . . E and F . . . E, states 306 and 308 respectively, are called associated states, where intermolecular forces between the pair are non-negligible and have an effect on their behaviour. States with the D form of the activatable tautomer are called inactive states, and states with the F form of the activatable tautomer are called active states.

The optically active state 308 denoted as F . . . E, which has a different absorption spectrum than any proportional sum of the spectra of the component chemical entities D, E and F in any of the other states. Thus, transitioning the chemical entities D and E and/or F and E to the optically active state F . . . E may be used to change the absorption spectrum of the electrophoretic dispersion.

The stabilizing entity E interacts more strongly with one form of the activatable tautomer than the other, and thus stabilizes that form of the activatable tautomer. In most cases, since $K^2_{act,unassoc}$ is less than or equal to 1, it is preferable for the form F to be stabilized where form F causes the greatest change in absorption spectrum of the electrophoretic dispersion. However, if $K^2_{act,unassoc}$ is close to 1, the equilibrium between D and F can be shifted in either direction by the presence of E and still produce a noticeable change in the absorption spectrum of the electrophoretic dispersion.

Stabilizer E may stabilize the mutable chemical entity by attractive interactions such as hydrogen bonds, pi interactions and dipole-dipole interactions which lower the total electronic energy of the two chemical entities. Stabilizer E can interact favourably with both forms of the mutable chemical entity, but interacts more favourably with one over the other, meaning that if E is activating, $K^2_{assoc,act} > K^2_{assoc,inact}$ and $K^2_{act,assoc} > K^2_{act,unassoc}$ or vice versa if E is deactivating. That is, if E is activating, the association of E with F is greater than the association of E with D, and the activation of D to F is more favourable when D is associated with E than it is when D is not associated with E, and vice versa if E is deactivating. Although $K^2_{act,unassoc}$ is less than 1, this does not place a restriction on $K^2_{act,assoc}$, which can be greater than, equal to or less than 1, without violating these inequalities regardless of whether the stabilizing entity E is activating or deactivating.

Throughout this specification, the term optically active state denotes a state in which two component chemical entities interact in close proximity to achieve exhibition of a different optical property than when the component chemical entities are separated. In cases in which the optically active state differs from the optically inactive state in terms of absorption spectra, such as in implementations in which the component chemical entities are interacted to produce a visible colour change, the term optically active state may be used to refer to the state exhibited by the two component chemical entities without regard to whether the optically active state is associated with absorption spectra having peaks in the visible spectrum. That is, the optically active state may be associated with an absorption spectra having peaks outside the visible spectrum.

Figure 4:
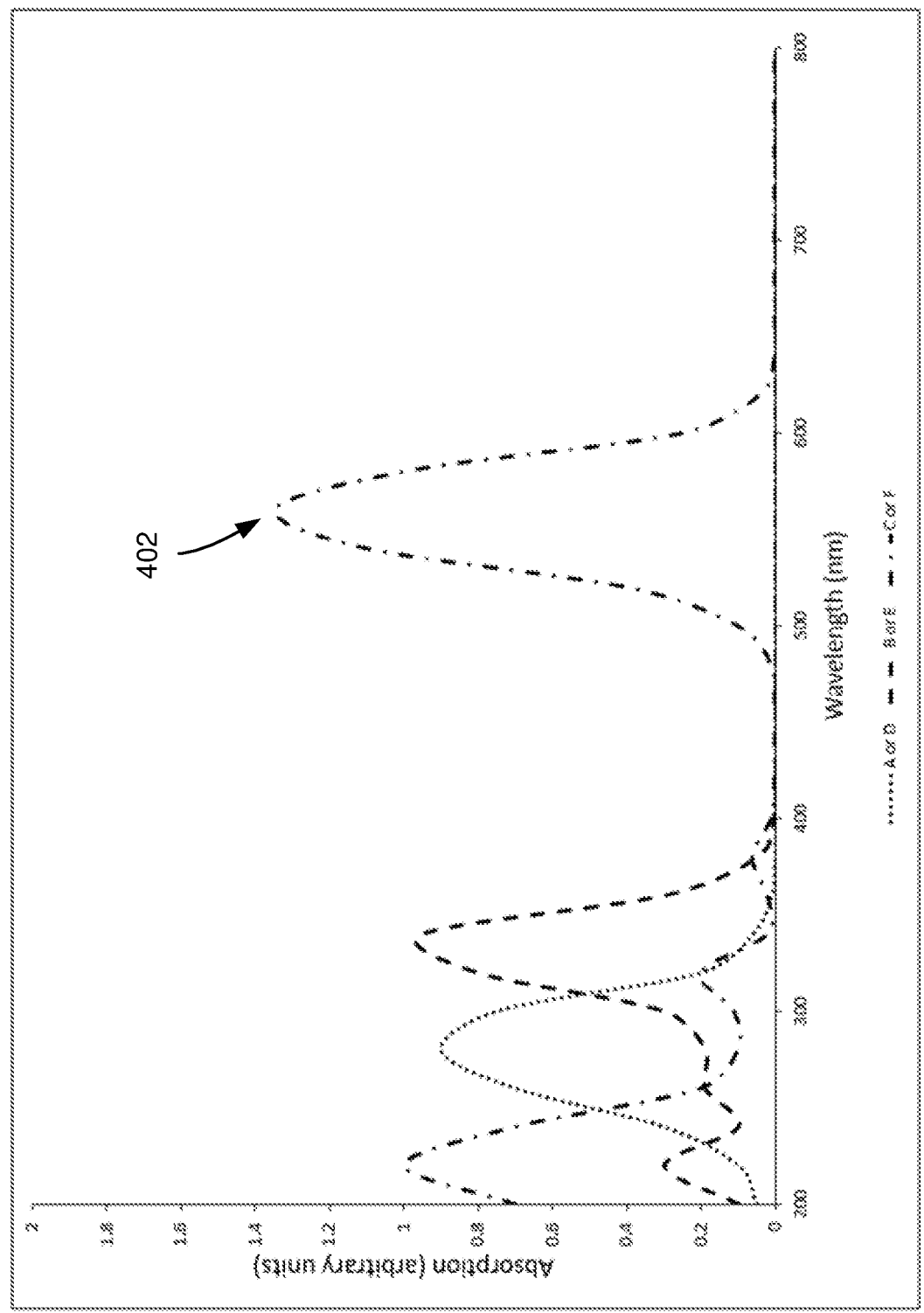
FIG. 4 is a wavelength absorption plot showing example absorption spectra curves which illustrate a change in absorption spectra caused by the interaction of chemical entities to form an optically active state.

FIG. 4 is a wavelength absorption plot showing three example absorption spectra curves of component chemical entities in an electrophoretic dispersion. The spectra curves shown are for illustrative purposes only and are not meant to reflect the actual electronic absorption spectra of any chemical entities discussed herein, but are illustrative of the concepts of the schemes described herein.

The dotted lines show example absorption spectra of any first chemical entity, such as entity A of FIG. 2 or entity D of FIG. 3. The dashed lines show an example absorption spectra of any second chemical entity, such as entity B of FIG. 2 or entity E of FIG. 3. The dash-dotted lines show an example absorption spectra of the chemical entities in an optically active state, such as the complex C in FIG. 2 or the active associate state F . . . E in FIG. 3.

The three different components all have differing absorption spectra, each having one strong absorption peak in the UV portion of the spectrum, but each at a different central wavelength. Further reference will be had to these peaks in the UV portion of the spectrum in the discussion of FIGS. 5 and 6.

The optically active chemical entity, represented by the dash-dotted lines, also features an absorption peak in the visible portion of the spectrum, denoted as the active band 402. It is not necessary that this active band 402 be in the visible portion of the spectrum, but rather is intended to cover wavelengths are important to the functioning of the device. In electrophoretic display devices made for viewing by the human eye, the active band 402 will be in the visible portion of the spectrum. Thus, the electrophoretic dispersion is colourless when the optically active chemical entity is not present, and takes on the complementary colour of the active band 402 when the optically active chemical entity is present in significant proportion, in this example, magenta. It is contemplated, however, that in other applications, the active band 402 may be in another portion of the spectrum. The active band 402 may cover any region or regions of wavelengths where the absorption of the optically active chemical entity is substantially different than the absorption of the other two component chemical entity.

Figure 5:
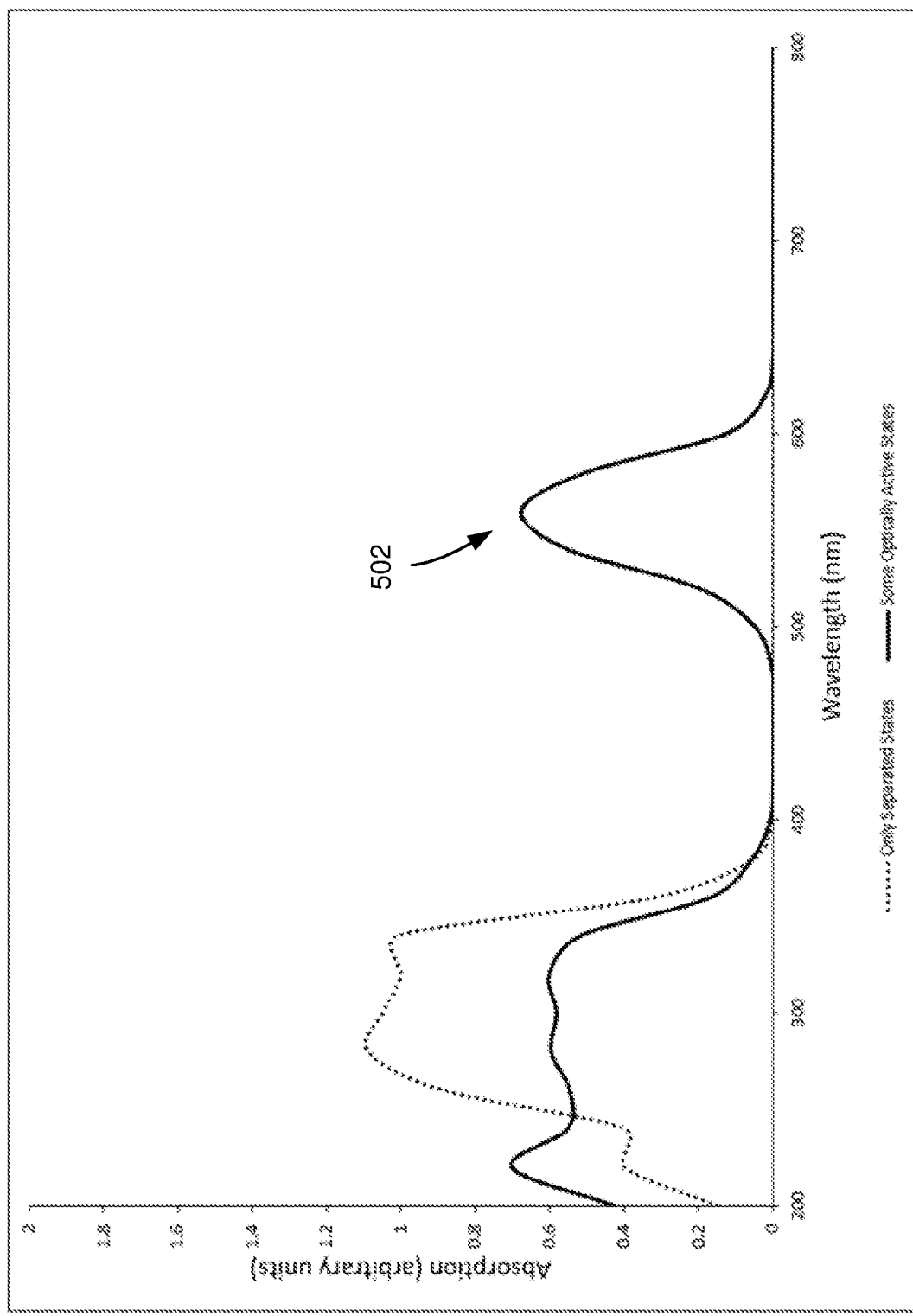
FIG. 5 is a wavelength absorption plot showing example absorption spectra curves which illustrate a change in absorption spectra caused by the interaction of chemical entities to form an optically active state according to the scheme of FIG. 2.

FIG. 5 is a wavelength absorption plot showing two example absorption spectra curves representing the absorption spectra of the chemical entities described in the chemical equations of FIG. 2 in an electrophoretic dispersion. The spectra curves shown are for illustrative purposes only and are not meant to reflect the actual electronic absorption spectra of any chemical entities discussed herein, but are illustrative of the concepts of the schemes described herein. The dotted line represents the absorption spectra of the chemical entities A and B in a separated state. The solid line represents the absorption spectra of the optically active state 206 in which the chemical entities A and B form complex C.

When the chemical entities A and B are separated, the optically active state 206 does not form, and so the absorption spectrum of the electrophoretic dispersion does not have any substantial absorption in the active band 502. However, when the component chemical entities are brought together to form the optically active state 206, and the electrophoretic dispersion absorbs light in the active band 502. The more component chemical entities A and B that are brought together to form the optically active state 206, the stronger the absorption in the active band 502. When the optically active state 206 is formed, the component chemical entities A and B are consumed to form C, which is reflected by decreases in the absorption strength shown by the solid line between about 280 and 360 nm, which are wavelengths which correspond primarily to chemical entities A and B on.

Figure 6:
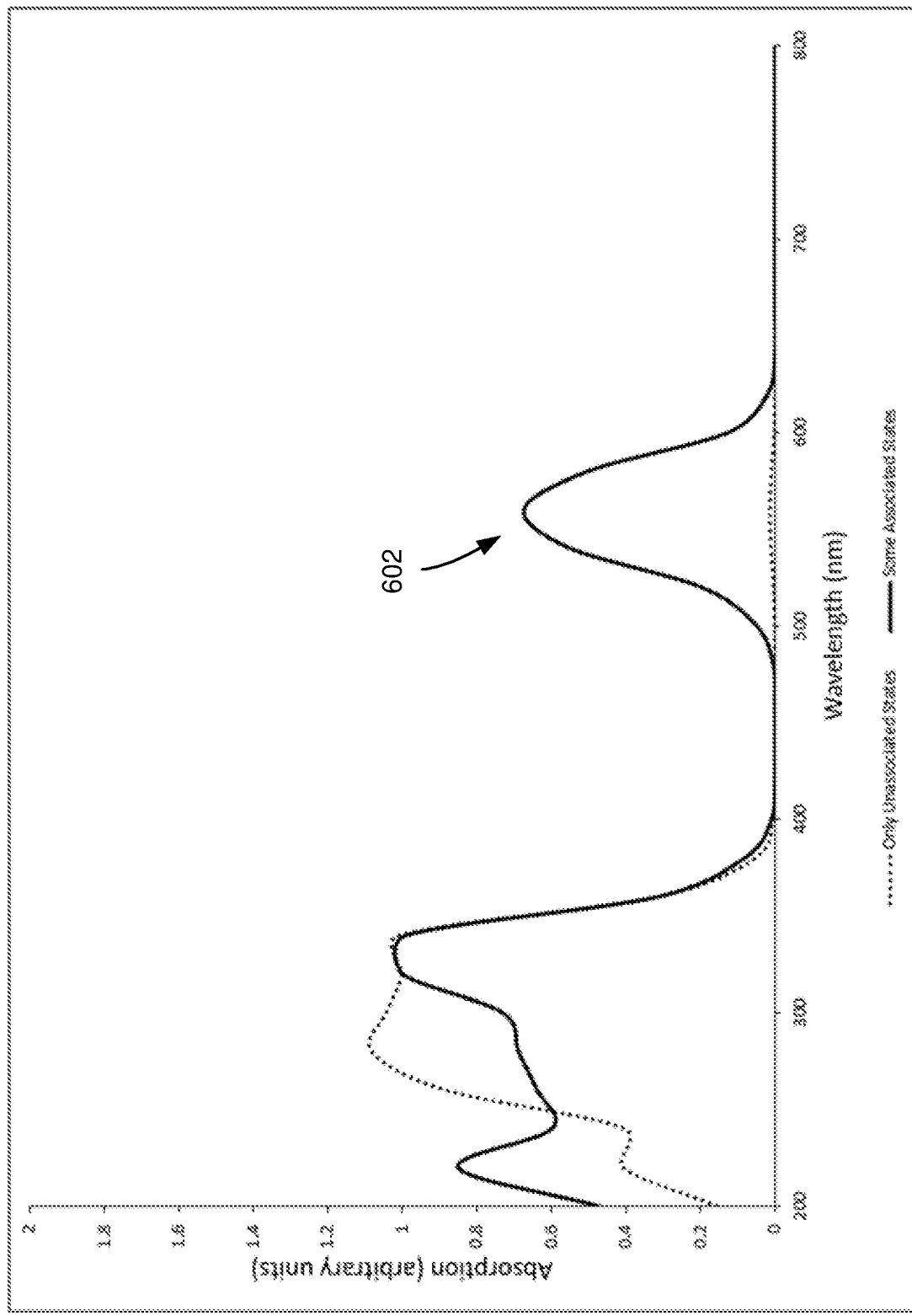
FIG. 6 is a wavelength absorption plot showing example absorption spectra curves which illustrate a change in absorption spectra caused by the interaction of chemical entities to form an optically active state according to the scheme of FIG. 3.

FIG. 6 is a wavelength absorption plot showing two example absorption spectra curves representing the absorption spectra of the chemical entities described in the chemical equations of FIG. 3 in an electrophoretic dispersion. The spectra curves shown are for illustrative purposes only and are not meant to reflect the actual electronic absorption spectra of any chemical entities discussed herein, but are illustrative of the concepts of the schemes described herein. The dotted line represents the absorption spectra of the chemical entities D and E in a separated state. The solid line represents the absorption spectra of the optically active state 308 in which the stabilizer E stabilizes the activatable tautomer in form F.

When the chemical entities are separated, the optically inactive form of the activatable tautomer is strongly favoured over the optically active form, and the absorption spectrum of the electrophoretic dispersion exhibits only a very weak absorption in the active band 602. However, when the component chemical entities are brought together to form the optically active state 308, the electrophoretic dispersion absorbs more light in the active band 602. The more component chemical entities D and E that are brought together, the stronger the absorption in the active band 602. When chemical entity F is formed, the stabilizing entity E is not consumed. However, the inactive form of the activatable tautomer D is consumed, which is reflected by decreases in the absorption strength shown by the solid line between about 280 and 320 nm, which are wavelengths which correspond primarily to member D.

Figure 7:
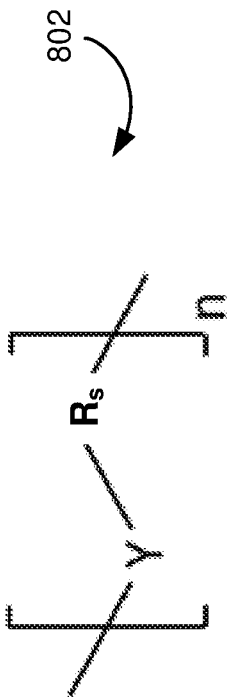
FIG. 7 is a chemical diagram depicting an example chemical entity attached to a polymer chain.

FIG. 7 is a chemical diagram depicting an example component chemical entity (X) attached to a polymer chain 702 having a linking unit ($R_L$) and a spacing unit ($R_S$). The component chemical entity X is attached to the functional polymer chain 702 to enable many such component chemical entities X to be compacted into a small space and moved as a collection, such as when moved by a change in an electromagnetic field. The component chemical entity X may be any of the chemical entities A or B of FIG. 2 or D, E, or F of FIG. 3. Thus, any of these component chemical entities may be attached to the polymer chain 702 to assist in providing motility to the component chemical entities in an electrophoretic dispersion.

$R_L$ is a linking unit which links chemical entity X to the backbone of the polymer. Example $R_L$ units include monomers capable of forming into substitutable linked polymers such as acrylates, methacrylates, acrylamides, and styrene derivatives, and which preferably confer solubility in the dispersion medium. $R_s$ is a spacer unit which allows for some distance between chemical entities X to reduce steric effects. Example $R_s$ units similarly include monomers capable of forming into linked polymers without necessarily being substitutable. In some examples, both $R_L$ and $R_s$ can be the same for each repeat unit such that the entities X are evenly spaced along the polymer chain 702. In other examples, $R_L$ and/or $R_s$ can vary from one repeat unit to the next such that the distance between consecutive component chemical entities X varies. In yet further examples, some of the $R_L$ or $R_s$ branches may not be connected to any component chemical entities. Although the component chemical entities X need not be grouped together with other component chemical entities X, having a collection of component chemical entities X grouped together in close proximity may allow for a greater control of the formation of optically active states.

Figure 8:
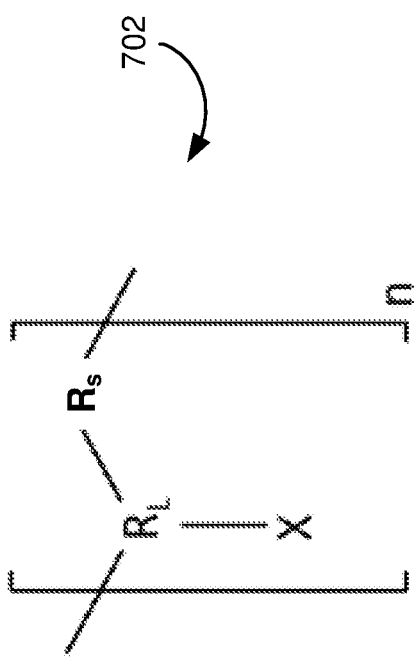
FIG. 8 is a chemical diagram depicting another example chemical entity attached to a polymer chain.

FIG. 8 is a chemical diagram depicting an example chemical entity (Y) integrated into a backbone of a polymer chain 802 having a spacing unit ($R_S$). The component chemical entity Y is attached to the polymer chain 802 in at least two places. The component chemical entity Y is attached to a functional polymer chain 802 to enable many such component chemical entities Y can be compacted into a small space and moved as a collection, such as when moved by a change in an electromagnetic field. The component chemical entity Y may be any of the chemical entities A or B of FIG. 2 or D, E, or F of FIG. 3. Thus, any of these component chemical entities may be attached to the polymer chain 802 to assist in providing motility to the component chemical entities in an electrophoretic dispersion.

$R_s$ is again a spacer unit which allows for some distance between entities Y to reduce steric effects. In some examples, $R_s$ can be the same for each repeat unit such that the entities Y are evenly spaced along the polymer chain 802. In other examples, $R_s$ can vary from one repeat unit to the next such that the distance between consecutive component chemical entities Y varies. Although the component chemical entities Y need not be grouped together with other component chemical entities Y, having a collection of component chemical entities Y grouped together in close proximity may allow for a greater control of the formation of optically active states.

Figure 9B:
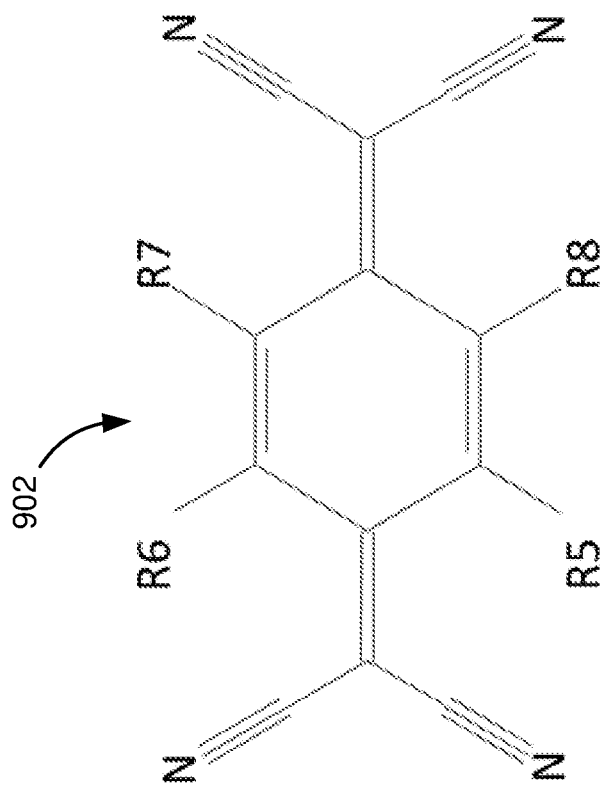
FIG. 9B is a chemical diagram depicting an example electron donor based on tetrathiafulvalene.
Figure 9A:
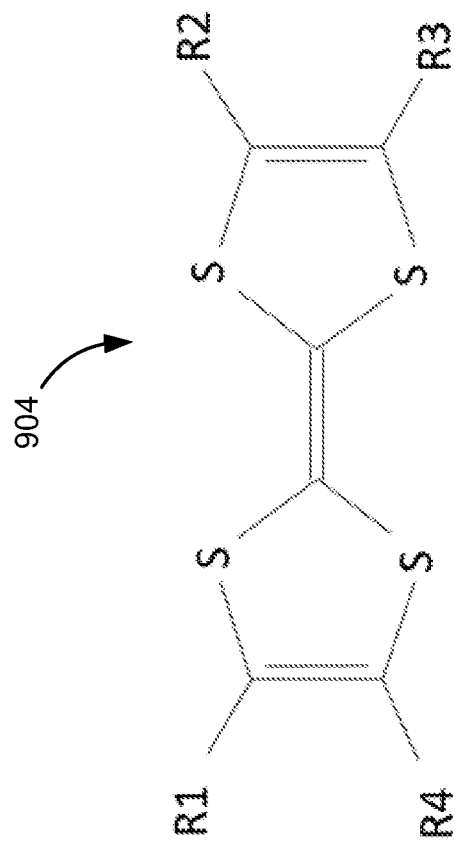
FIG. 9A is a chemical diagram depicting an example acceptor based on tetracyanoquinodimethane.
Figure 10:
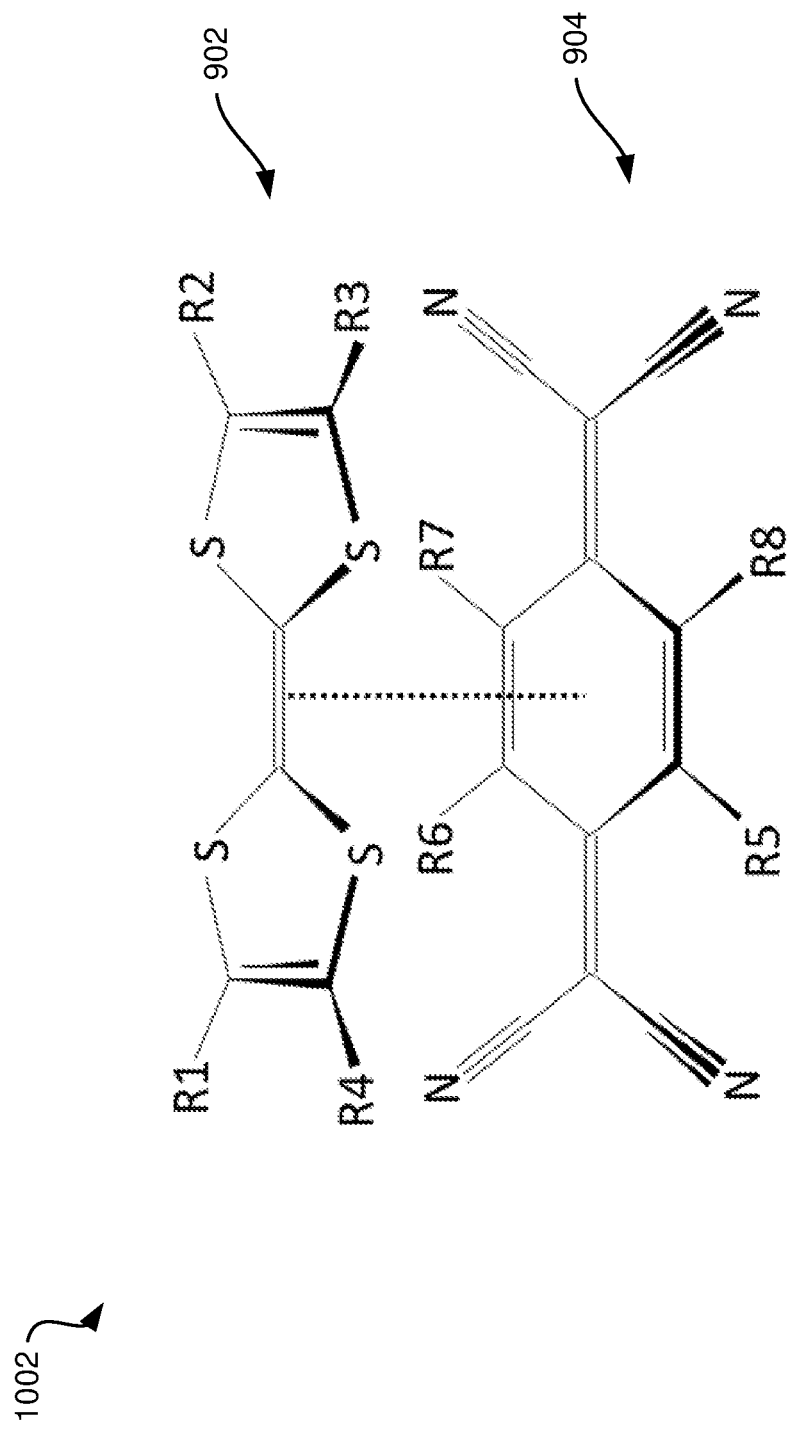
FIG. 10 is a chemical diagram depicting an example charge transfer complex formed by the electron acceptor of FIG. 9A and the electron donor of FIG. 9B.

FIG. 9A is a chemical diagram depicting an example electron acceptor 902 that is a derivative of tetracyanoquinodimethane (TCNQ), an aromatic electron acceptor. The example electron acceptor shown may operate as the electron acceptor (A) of FIG. 2. FIG. 9B is a chemical diagram depicting an example electron donor 904 that is a derivative of tetrathiafulvalene (TTF), an aromatic electron donor. The derived form of TTF is modified to be capable of bonding to a polymer coronae as discussed herein. The example electron donor shown may operate as the electron donor (B) of FIG. 2. Similarly, the derived form of TCNQ is modified to be capable of bonding to a polymer coronae as discussed herein. FIG. 10 is a chemical diagram depicting an example donor-acceptor complex formed by the electron donor 904 and electron acceptor 902.

The electronic energy levels in each component chemical entity are what give them their electronic properties. In the TTF example, the energy levels, particularly the highest occupied molecular orbital (HOMO), are very high in energy relative to many organic molecules. In the TCNQ example, both the HOMO and the lowest unoccupied molecular orbital (LUMO) are low in energy relative to many organic molecules, because the nitrile groups pull electron density away from the centre of the molecule. This means that there is a smaller energy difference between the HOMO of the TTF example and the LUMO of the TCNQ example than between the HOMO and the LUMO of either molecule. A photon which has an energy approximately matching this energy difference has the potential to excite an electron from the HOMO of the TTF example to the LUMO of the TCNQ example if the molecules are in close enough proximity for there to be significant overlap of these two molecular orbitals, as depicted in FIG. 10. Thus, when the electron donor 904 and electron acceptor 902 are in close proximity to one another, an additional absorption band called the charge transfer band appears in the absorption spectrum of the complex which is not present when the molecules are separated. The presence of the additional absorption band in significant proportion in the electrophoretic dispersion changes the colour of the electrophoretic dispersion.

Referring to electron donor 904, at least one of groups R1-R4 may be chosen to attach the chemical entity to a polymer backbone, for example, as shown in FIG. 7 or 8, while the rest of the groups are selected to provide the chemical entity with an appropriate absorption spectrum, confer solubility in the electrophoretic dispersion, or modify the energy levels of the chemical entity, as desired. Additionally, groups R1-R4 may be selected such that they do not interfere with the formation of the aromatic charge transfer complex. In some examples, one of R1-R4 may be an ester group attached to an alkyl chain of between 4 and 8 carbons in length, which in turn is connected to the functional polymer chain by an ether group, and the remaining three of R1-R4 are all hydrogen. In other examples, one of R1-R4 is a short carbon chain of between 1 and 4 carbons in length joined by an ether group attached to an alkyl chain of between 4 and 8 carbons in length, which in turn is connected to the functional polymer chain by an ether group, and the remaining three of R1-R4 are all hydrogen.

Referring to electron acceptor 902, in the case of TCNQ itself, as in the case of the electron acceptor 902 derived from TCNQ, the central aromatic ring is surrounded by nitrile groups which are highly electron withdrawing groups. These nitrile groups allow the molecule to act as an electron acceptor. R5-R8 may be selected such that they do not sterically interfere with the formation of the aromatic charge transfer complex, as well as to modify the energy levels of the chemical entity, in order to tune the energy of the charge transfer band. R5-R8 may also be chosen to control the absorption of the electron acceptor 902 and to confer solubility in the electrophoretic dispersion. In some examples, one of R5-R8 is an ester group attached to an alkyl chain of between 4 and 8 carbons in length, which in turn is connected to the functional polymer chain by an ether group, and the remaining three groups are all hydrogen.

FIG. 10 shows the electron donor 904 and electron acceptor 902 in an aromatic charge transfer complex 1002 corresponding to the optically active state 206 of FIG. 2. The aromatic charge transfer complex 1002 is stabilized by pi interactions. In an aromatic charge transfer complex, pi interactions are partially due to opposite quadrupole moments with respect to the plane of the molecule, where the centre of the flat face of electron donor 904 has a negative electrostatic potential and the centre of the flat face of electron acceptor 902 has a positive electrostatic potential and so the two molecules are attracted to one another. This stabilizes the pair, and promotes the formation of the charge transfer band. The pi interaction stabilizing the component chemical entities is indicated with a dashed line. The interaction corresponds to the interaction scheme depicted in FIG. 1 which forms the complex C. The aromatic charge transfer complex 1002 (Complex C) is a new chemical entity with different electronic properties than the electron donor 904 and electron acceptor 902.

Figure 11B:
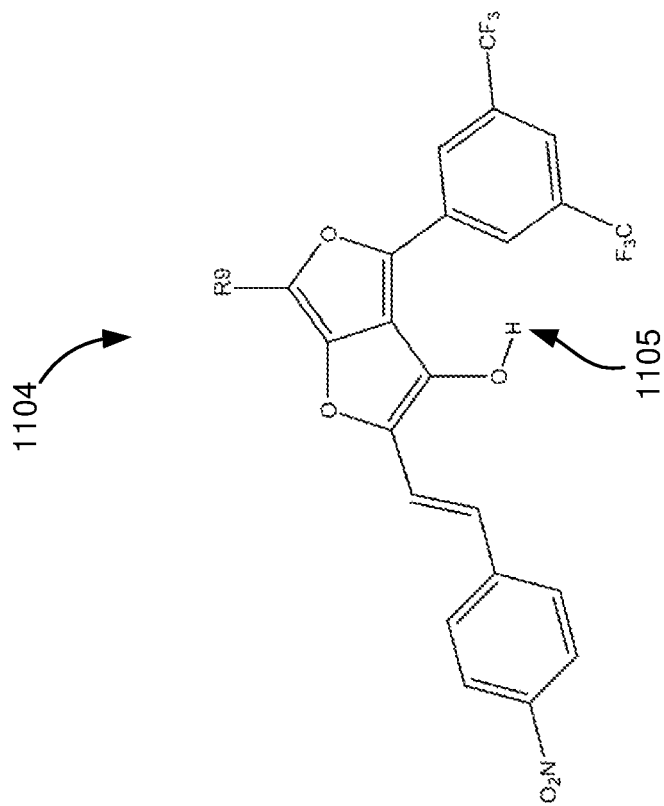
FIG. 11B is a chemical diagram depicting the activatable tautomer of FIG. 11A in a second tautomeric form, the second tautomeric form exhibiting a visible absorption spectra.
Figure 11A:
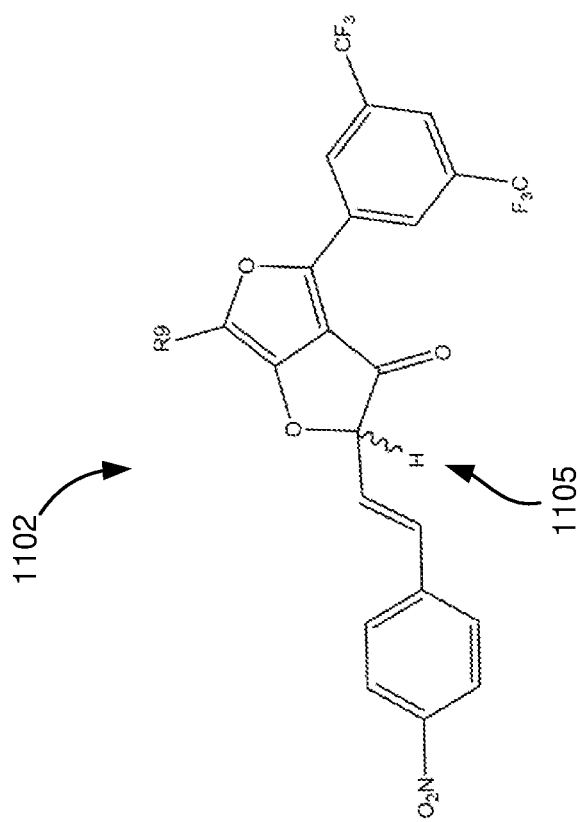
FIG. 11A is a chemical diagram depicting an activatable tautomer in a first tautomeric form, the first tautomeric form exhibiting a colourless absorption spectra.

FIG. 11A is a chemical diagram depicting an example tautomeric form 1102 of an activatable tautomer. FIG. 11B is a chemical diagram depicting another example tautomeric form 1104 of the activatable tautomer of FIG. 11A. The example activatable tautomer has the systemic name 4-[3,5-bis(trifluoromethyl)phenyl]-2-[(1E)-2-(4-nitrophenyl)ethenyl]-2H,3H-furo[3,4-b]furan-3-one. The example activatable tautomer may be referred to as a substituted 2H,3H-furo[3,4-b]furan-3-one. The tautomeric form 1102 appears colourless in the visible light spectrum and the tautomeric form 1104 has an absorption maximum in the visible light spectrum. The tautomeric forms 1102, 1104 may operate as the tautomeric forms D and F of FIG. 3, respectively.

The activatable tautomer can readily interconvert between tautomeric forms 1102 and 1104 at room temperature, especially in the presence of a catalyst, such as, for example, water, an acidic moiety such a carboxylic acid, or a basic moiety such as a pyridine. Interconversion happens by the migration of the prototropic hydrogen 1105 between the carbon to which it is attached of inactive form 1102, which provides the keto form of the activatable tautomer, and the oxygen to which the is attached of active form 1104, providing the enol form of the activatable tautomer. This type of tautomerism is termed keto-enol tautomerism. However, keto-enol tautomerism is only an example of the kinds of tautomerism which may be used to produce a desired change in absorption spectra. Other types of tautomerism are contemplated.

The ratio of concentrations of the two forms, denoted as $K^2_{act,unassoc}$ in FIG. 3 above, is determined by a number of factors, such as temperature, solvent, and the selection of the substituents on the phenyl ring beside the prototropic hydrogen 1105 when attached to the form 1104 as shown in FIG. 11B. For certain selections of these factors, the equilibrium constant may be substantially less than 1, which may make the energy difference between the inactive form and the active form too great for the active form to be present in any detectable quantity. This is typically undesirable because a higher energy difference is more difficult to overcome and may make the process of tautomerism slow. The two tautomeric forms 1102, 1104, differ in energy by about 4.4 kcal/mol in solvent. Thus, while both forms may exist in solution, the optically inactive form 1102 is generally present in a far greater amount, unless stabilized toward the optically active form 1104.

Substituents of the activatable tautomer may also be selected such that the electronic absorption spectra of the inactive and active forms of the molecule fit the criteria of a colour filter of the electrophoretic device.

In some examples, group R9 is selected to be an ether group linking the activatable tautomer to a functional polymer such as the functional polymer 702 of FIG. 6. In such examples, the activatable tautomer is made capable of changing between the inactive form, which is substantially transparent in the visible light spectrum, the active form which is magenta in colour in the visible light spectrum. With these selections, and using tetrahydrofuran as a solvent for the electrophoretic dispersion, $K^2_{act,unassoc}$ was determined to be about 0.0005. In other examples, the group R9 may be an alkyl, substituted alkyl, halogen, alkoxy, or ester, which links the activatable tautomer to a polymer chain.

In some examples, the activatable tautomer may be solvatochromic, whereby solvent polarity can be used to tune the absorption spectrum. Thus, another criteria for selecting substituents to the activatable tautomer is to solubilize the chemical entity in the solvent of choice. For example, the activatable tautomer in the example shown is solvatochromic, and thus solvent polarity can be used to tune the absorption spectrum to some extent.

Figure 13:
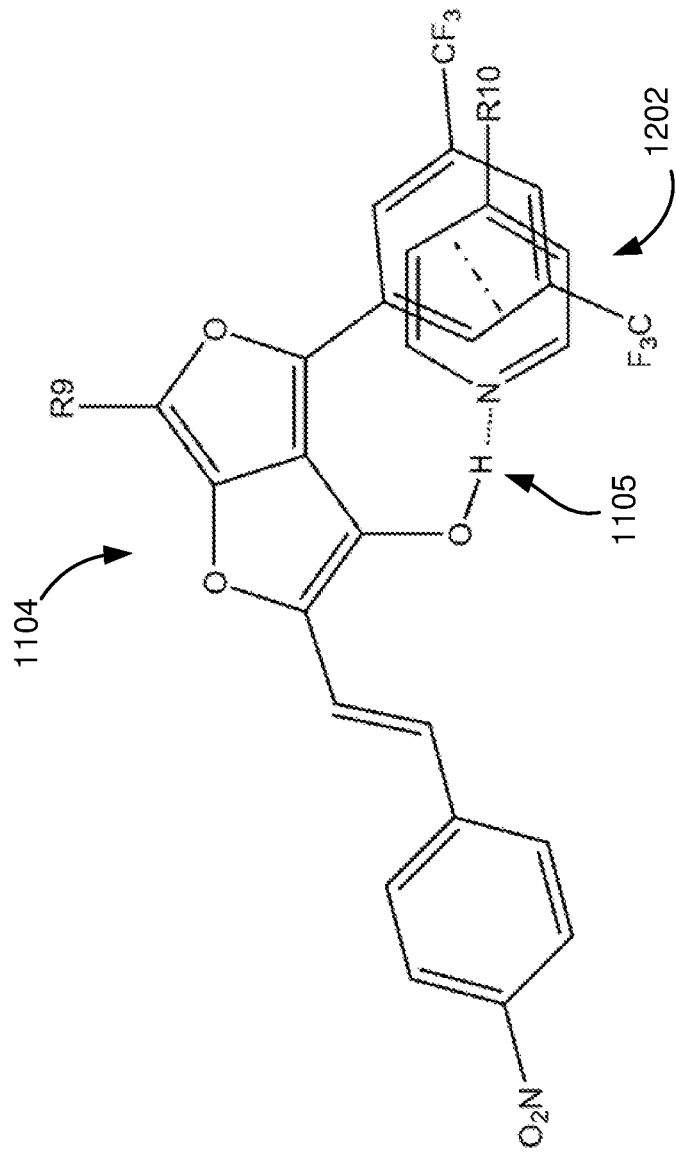
FIG. 13 is a chemical diagram depicting the activatable tautomer of FIGS. 11A and 11B stabilized in the tautomeric form of FIG. 11B by the stabilizer of FIG. 12.
Figure 12:
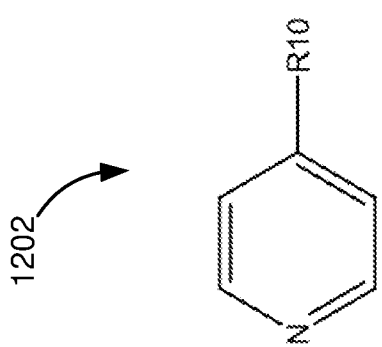
FIG. 12 is a chemical diagram depicting an example stabilizer capable of stabilizing the activatable tautomer of FIGS. 11A and 11B to adopt the tautomeric form of FIG. 11B.

FIG. 12 is a chemical diagram depicting an example stabilizer 1202 capable of stabilizing the activatable tautomer of FIGS. 11A and 11B to adopt the optically active state of the tautomeric form 1104 of FIG. 11B. FIG. 13 is a chemical diagram depicting the activatable tautomer in an example optically active state. The stabilizer 1202 may operate as the stabilizer E of FIG. 3. The stabilizer 1202 is selected to be compatible with the activatable tautomer in that the stabilizer 102 has a stronger intermolecular interaction with the optically active form 1104 than the optically inactive form 1102, which lowers the total energy of a system made up of those two molecules, and consequently, the system will have a greater tendency to be in the lower energy configuration. Thus, the stabilizer 1202 stabilizes the activatable tautomer in the optically active form 1104.

The stabilizer 1202 shown is an example of an activating stabilizer comprising an alkyl-substituted pyridine. The stabilizer 1202 interacts with the activatable tautomer in the optically inactive form 1102 by altering the hybridization of a central carbon atom. The stabilizer 1202 is capable of hydrogen bonding with the optically active tautomeric form 1104, and can have pi-pi interactions with the optically active form 1104, but is not capable of hydrogen bonding with the optically inactive tautomeric form 1102, but rather has pi-pi interactions with it, which are substantially weaker interactions. A stronger intermolecular interaction between two molecules lowers the total energy of a system made up of those two molecules, and consequently, the system will have a greater tendency to be in the lower energy configuration. Thus, the stabilizer 1202 stabilizes the activatable tautomer in the optically active form 1104.

Group R10 of stabilizer 1202 may be selected such that the stabilizer 1202 can be attached to a polymer chain such as the polymer chain 702 of FIG. 7. Such an attachment can be achieved by an ether linkage for example.

Additional substituents may be added to the stabilizer 1202 to assist with solubilizing it in a solvent of choice. The selected substituents should be selected to not sterically hinder the formation of the optically active form 1104. Substituents may also be selected so that the absorption spectrum of the stabilizer 1202 does not substantially interfere with the functioning of the electrophoretic display device in which the electrophoretic dispersion is incorporated. Additional substituents may also be selected to minimize interactions with the inactive form 1102 of the activatable tautomer. When the stabilizer 1202 is present in the electrophoretic dispersion with the activatable tautomer, $K^2_{act,assoc}$, as denoted in FIG. 3, was determined to be about 25, which is highly skewed toward the optically active form 1104.

FIG. 13 shows a complex formed between stabilizer 1202 and the optically active form 1104 of the activatable tautomer, corresponding to the optically active state 308 of FIG. 3. The stabilizer 1202 includes a pyridine ring to hydrogen bond with the prototypic hydrogen 1105 of the activatable tautomer. The hydrogen bond between the prototypic hydrogen 1105 and the nitrogen of the pyridine ring of the stabilizer 1202 is denoted by a dashed line. A pi interaction between the pyridine ring of the stabilizer 1202 and a phenyl ring of the activatable tautomer is denoted by a hatched line. Neither interactions are drawn to scale.

Although in this example, hydrogen bonds and pi interactions stabilize the active form 1104 of the mutable entity, other intermolecular interactions could similarly be used by other pairs of stabilizers and activatable tautomers.

Figure 14:
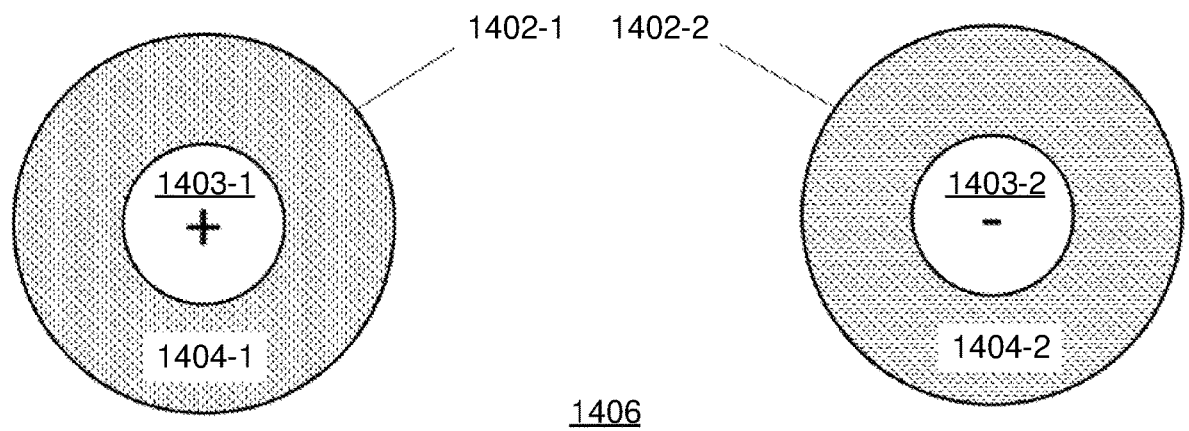
FIG. 14 is a schematic diagram of an example electrophoretic dispersion containing oppositely charged mobile carriers having polymeric coronae with component chemical entities attached thereto. The charged mobile carriers may be brought into close proximity to cause the component chemical entities to form an optically active state.

FIG. 14 depicts example oppositely charged mobile carriers 1402-1, 1402-2, dispersed in a suspension fluid of an electrophoretic dispersion 1406. The charged mobile carrier 1402-1 includes a charged core 1403-1 adorned by a corona of polymers 1404-1 which bears one of two chemical entities, and the other charged mobile carrier 1402-2 includes a charged core 1403-2 adorned by a corona of polymers 1404-2 which bears the other chemical entity. In other words, in the electrophoretic dispersion, one type of component chemical entity is attached or grafted to the charged mobile carriers 1402-1 of one charge, and the other type of component chemical entity is attached or grafted to the charged mobile carrier 1402-2 of the opposite charge. The polymers in the polymeric coronae 1404 extend from the surfaces of the charged polymeric cores 1403 thereof, such as, by grafting onto chemical functional groups on the surfaces thereof. A charged mobile carrier 1402 including charged polymeric core 1403, polymeric corona 1404, and chemical entities, may be referred to herein simply as a particle.

The suspension fluid of the electrophoretic dispersion 1406 may be selected to act as a good solvent for the polymeric corona 1404 so that the polymeric coronae 1404 may freely extend into the fluid rather than coiling up close to the surface of the charged polymeric cores 1403.

When the oppositely charged mobile carriers 1402 are not in close proximity, the optically active states are not formed, or are formed at most in only substantially minor amounts. When the oppositely charged mobile carriers 1402 are bought into close proximity to enable the component chemical entities to interact, optically active states are formed, thereby changing an optical property, such as by changing an absorption spectra, of the electrophoretic dispersion, for use in a colour filter of an electrophoretic device. The two chemical entities may interact to change an optical property of the electrophoretic dispersion by any of the schemes discussed herein, such as the schemes described in FIG. 2 or FIG. 3.

Figure 15:
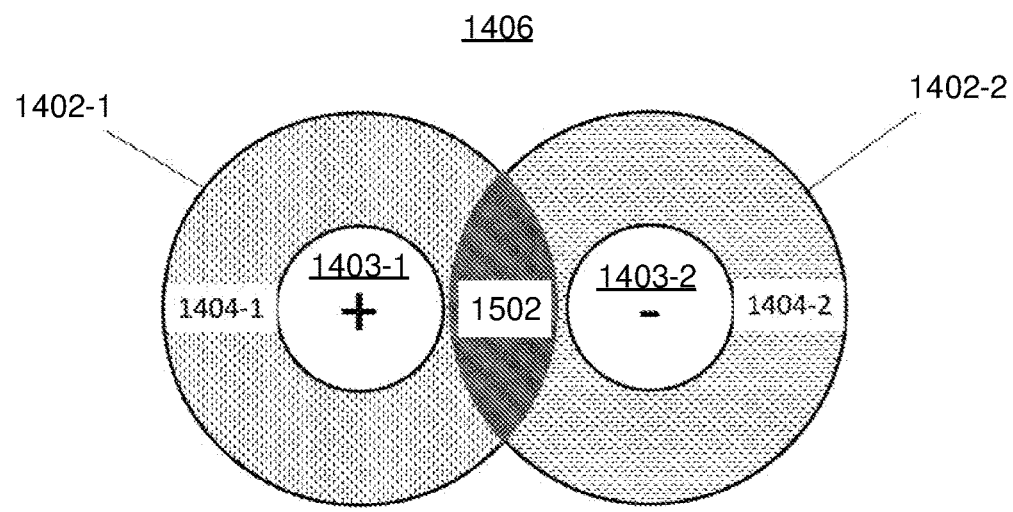
FIG. 15 is a schematic diagram of the electrophoretic dispersion of FIG. 14 in which the oppositely charged mobile carriers are in close proximity with overlapping coronae of polymers enabling the component chemical entities to interact.

When the charged mobile carriers 1402 are not under the influence of an externally applied electric field, the charged mobile carriers 1402 experience a mutually attractive electrostatic force. This electrostatic force serves to bring oppositely charged mobile carriers 1402 together, which makes the formation of the optically active chemical entity more favorable, as shown in FIG. 15. Under the influence of a sufficiently strong externally applied electric field, the oppositely charged mobile carriers 1402 may be separated due to the oppositely directed electrostatic forces which the field applies to the charged mobile carrier 1402, the direction of which is dependent on the charge of the charged mobile carrier 1402, and the direction of the externally applied electric field.

The polymers of the polymeric coronae 1404 may include block copolymers having hydrophilic portions and hydrophobic portions. The hydrophilic portions may be selected to be highly soluble in water and for capability to be functionalized by the component chemical entities. The hydrophilic portions may also be selected to resist remaining electrically charged when placed in a solvent which is less polar than water. This property may be achieved by treatment such as functionalization with a chemical moiety which does not carry a charge. For example, a carboxylic acid may be coupled with an alcohol to produce an ester which does not retain a net charge. The hydrophobic portions may be selected to be soluble in nonpolar solvents, and especially oily monomers. The hydrophobic portions may also be selected to have functional groups which can be used to crosslink the polymers together, and to other hydrophobic molecules. The block copolymers may act as surfactants. The block lengths may be chosen such that the copolymers are appropriate for stabilizing oil-in-water emulsions.

The charged polymeric cores 1403 may include a hydrophobic monomer, a block copolymer such as the kind used in the polymeric coronae 1404, a hydrophobic radical initiator such as a photoinitiator or a thermal initiator, and both ionic and non-ionic cosurfactants. The charged polymeric cores 1403 are the regions which contain the substantial majority of the charge of the charged mobile carriers 1402, and therefore this region is what generates the electric field which surrounds the particle as well as allows it to respond to other electric fields. The charge in this region is conferred by ionic surfactants stripped of counter ions. These ionic surfactants are embedded into the surface of the charged core region and crosslinked into the interior of the charged core region.

The hydrophobic monomer may form the bulk of the interior of the particle, and may be polymerized to be unlikely to dissolve into the solvent which surrounds the charged mobile carriers 1402.

The hydrophobic monomer material may comprise monomers which are capable of bonding to two other monomers, three other monomers, four other monomers, or more than four other monomers. Monomers with polymerisation functionalities higher than 2 may be incorporated because they can crosslink multiple polymer chains together to increase the internal stability of the charged mobile carriers 1402.

The radical initiator may be used to begin the process of polymerisation in the production of the charged mobile carriers 1402.

The block copolymer may behave as the primary surfactant for a nanoemulsion, serves as a location to bind component chemical entities, and further facilitates crosslinking of the interior of the charged particle. It may be preferred for the block copolymer to have a polymerisation functionality of higher than 2 for internal stability.

The nonionic cosurfactant, if used, may aid in the formation of a nanoemulsion for production of the charged mobile carriers 1402 by making the surface of the nanoemulsion particles more elastic and decreasing the surface tension between the interior and exterior of the particles.

The ionic surfactant may be present in only very small quantities and serves to place charged functional groups on the surface of the particles. The ionic surfactant may be a cationic surfactant such as a quaternary ammonium-based positive surfactant, such as oleyl trimethylammonium bromide or undecenyl trimethylammonium bromide. The ionic surfactant may be an anionic surfactant such as a sulfate-based negative surfactant, such as sodium oleyl sulfate or silver omega undecenyl sulfate. These exemplary surfactants use an oleyl hydrophobic tail, and the length of the tail may vary from the length of an oleyl chain, but it may be preferable to have a hydrophobic chain with at least one double carbon-carbon bond present.

The ionic surfactants may be selected such that the counter ions form a salt which precipitates from the solution for ease of removal at a later step. Example ionic surfactants which form a salt include undecenyl trimethylammonium bromide and silver omega undecenyl sulfate. Other examples of salts which may be suitable include silver iodide, and tetraphenyl phosphonium tetraphenyl borate. Salts with both components having a charge of either +1 or −1 fundamental charges are preferred, where the surfactant remains water soluble and the counter ion dissociates some of the time in water, but the combination of counter ions is insoluble in water. Additionally, it is preferred that the surfactants and the counter ions are unreactive towards somewhat basic conditions.

The number of ionic surfactants per particle may be kept low, such that the number of charges per particle is low. Each particle can have a net charge of between about 1 and 50 excess fundamental charges, and preferably between 4 and 10 fundamental charges. It may be preferable for the particles to have a narrow charge distribution, such that a majority of particles in the dispersion have a net charge which differs from other particles of the same polarity by less than 50% of the average net charge. If the charge distribution of the particles is narrow, the average number of charges per particle determines the behaviour of the particles in response to an electric field. A larger average net charge per particle gives particles which react more strongly to an externally applied electric field, and thus the electrophoretic dispersion can have a faster response time, which is defined as the time over which a new screening equilibrium is reached. However, a larger average net charge per particle decreases the number of particles which are required to create a screened region as compared to particles with a lower average net charge per particle. A practical device which uses this electrophoretic dispersion must apply a voltage which is proportional to the average net charge per particle. Since power consumption in such a device can be proportional to the square of the voltage, in applications where low power consumption is desired, a lower average net charge per particle is also preferable.

The sizes of the particles is also relevant. Thus, it is preferable that the particles be produced to have an average size of between 20 and 200 nm, the majority having a size within 60% of the average size. The size distribution of the particles is also preferably narrow, with the majority of the particles having a diameter of within about 60% of the average diameter and most preferably within about 30% of the average diameter. Larger particles are able to carry a greater number of component chemical entities with them because of their higher surface area which can increase the intensity of the colour change, but larger particles also have a lower electrophoretic mobility than particles which have the same charge but are smaller, and a higher electrophoretic mobility is preferable in most applications in order to change state more quickly. The length of the polymer chains extending from the surface of the charged polymeric cores 1403 which make up the polymeric coronae 1404 can be between about 2 nm and 50 nm. Longer polymer chains allow the particles to carry more component chemical entities with them, and also make more of the component chemical entities available to interact with the component chemical entities of other particles, both of which can increase the intensity of the colour change, but this again increases the drag on the particles which lowers their electrophoretic mobility.

The charged polymeric cores 1403 of the particles can have a refractive index which is substantially similar to the refractive index of the surrounding suspension fluid. This decreases the amount of light that is scattered off of them which decreases the transparency of the electrophoretic dispersion, which is preferably as transparent as possible for most applications. In addition, particles that are not refractive index matched to their solvent feel a higher Van der Waals attraction to one another, which has nothing to do with their net charge and can decrease the stability of the dispersion, thus making it preferable to have well matched refractive indices. The difference between the refractive index of the core and the suspension fluid is preferably less than about 0.1 units and most preferably less than about 0.01 units.

The refractive index of the suspension fluid is preferably higher than most organic liquids, so as to minimize the refractive index contrast with solid phase substrates, since every interface which is not refractive index matched can be the source of unwanted light reflection or scattering. Additionally, light waves are guided by high refractive index media, which can increase the amount of time the light spends travelling inside of the electrophoretic dispersion and thus can increase the amount of light that is absorbed by the electrophoretic dispersion.

Thus, a first chemical entity is attached to the first charged mobile carrier 1402-1 dispersed in the electrophoretic dispersion 1406, a second chemical entity is attached to the second charged mobile carrier 1402-2 dispersed in the electrophoretic dispersion 1406, the first and second charged mobile carriers 1402 having opposite electrical charges, and the change in the electromagnetic field passing through the electrophoretic dispersion separates the first and second charged mobile carriers 1402 to put the first and second chemical entities in the separated state.

FIG. 15 depicts a schematic representation of the two example charged mobile carriers 1402 in close proximity. Here, a large number of component chemical entities located within the polymeric coronae 1404 are in close proximity, which are then able to interact to form optically active states. Such interaction is particularly likely in the corona overlap region 1502 which is the region of overlap of the polymeric coronae 1404.

When the charged mobile carriers 1402, and therefore the component chemical entities, are not in close proximity, the association equilibrium constants (e.g. $K^1_{assoc}$, $K^2_{assoc,inact}$ and $K^2_{assoc,act}$ from FIG. 2 and FIG. 3) are substantially close to zero because the component chemical entities physically cannot associate with one another because of their separation distance. However when the charged mobile carriers 1402 are in close proximity, the concentration of component chemical entities which are close enough to associate increases dramatically, and thus the equilibrium of both the scheme of FIG. 2 and the scheme of FIG. 3 shift towards the right, which corresponds to an effective increase in the association equilibrium constants. Although the effect is actually due to changes in the local concentrations of the component chemical entities, it may be helpful to consider that the association constants change to reflect the likelihood of association between component chemical entities, rather than their local concentrations changing.

The component chemical entities may be pendant groups on polymer chains (e.g. as in FIG. 7) or are part of polymer backbones (e.g. as in FIG. 8). Polymer chains to which the component chemical entities are attached are themselves attached in large numbers to the surfaces of oppositely charged mobile carriers 1402.

The charged mobile carriers 1402 are suspended in a suspension fluid of an electrophoretic dispersion 1406. The suspension fluid of electrophoretic dispersion 1406 preferably has a refractive index which is similar to the refractive index of the charged mobile carriers 1402, preferably within about 0.1 units thereof, and most preferably within about 0.01 units thereof. The suspension fluid of electrophoretic dispersion 1406 may contain as few charged mobile carriers 1402 as is practical to achieve a desired saturation of colour change.

It is preferable for about 90% or more of the mobile charges to be located in the charged mobile carriers 1402, and most preferably more than about 99%. This reduces the voltage which is needed to bring the charged mobile carriers 1402 into close proximity to switch the colour filter of the electrophoretic device.

Figure 16:
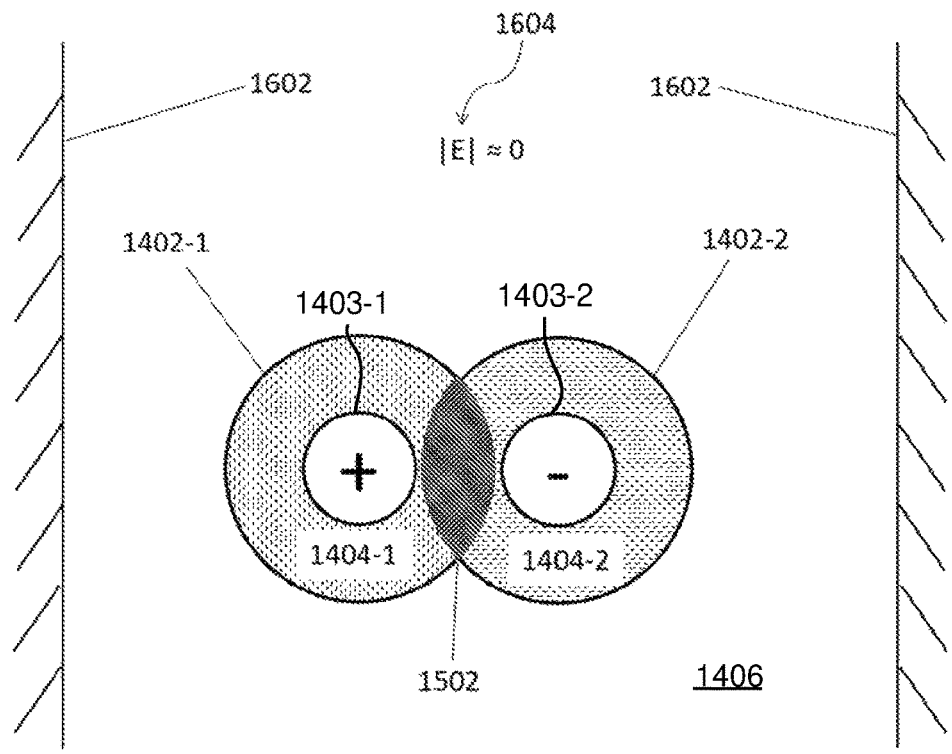
FIG. 16 is a schematic diagram of the electrophoretic dispersion of FIG. 14 disposed in an example pixel chamber.

FIG. 16 shows two example oppositely charged mobile carriers 1402 between two fixed surfaces 1602 and suspended in a suspension fluid of an electrophoretic dispersion 1406. These particles are adorned polymeric coronae 1404 as in FIG. 14. Further, as in FIG. 15, where the polymeric coronae 1404 overlap, the equilibrium shifts in favour of the formation of the optically active state due to the close proximity of the component chemical entities, and the region where this primarily takes place is denoted by the corona overlap region 1502. As noted in FIG. 16, this is under the assumption that there is no more than a weak applied electromagnetic field 1604 present, such that the charged mobile carriers 1402 are still able to come together under their mutual electrostatic attraction and remain in close proximity.

Figure 17:
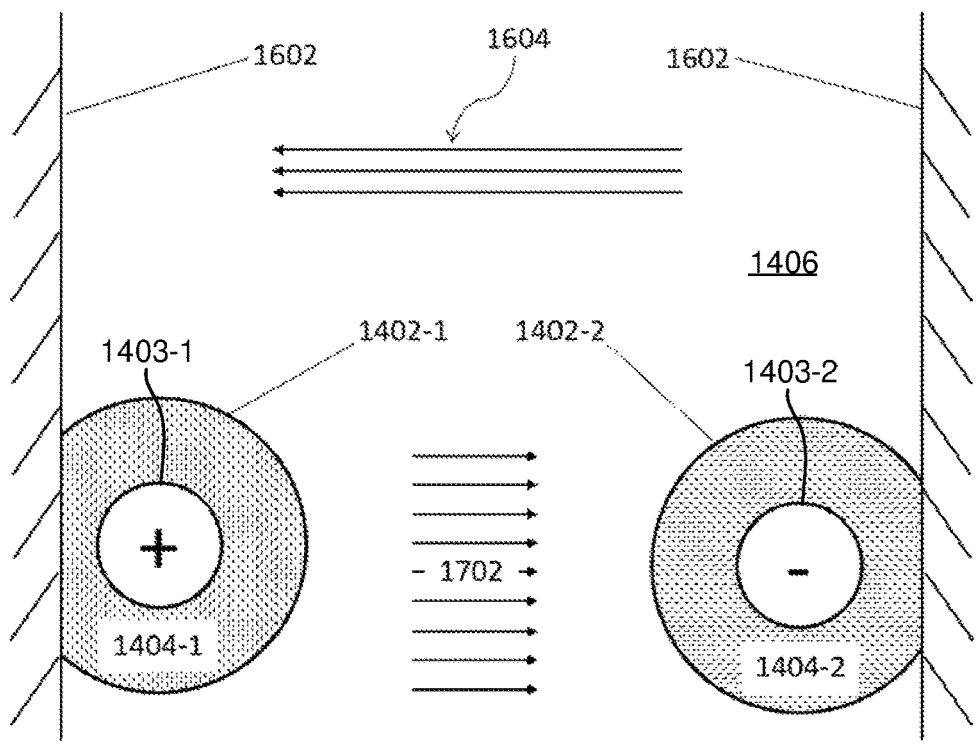
FIG. 17 is a schematic diagram of the electrophoretic dispersion and pixel chamber of FIG. 16 with oppositely charged mobile carriers separated by application of an electromagnetic field.

In FIG. 17 is shown an example effect of an applied electromagnetic field 1604 on two charged mobile carriers 1402 which are situated in between two fixed surfaces 1602. Although only two charged mobile carriers 1402 are shown, it is to be understood that in most pixel chambers a much higher number of charged mobile carriers 1402 will be suspended in the suspension fluid of the electrophoretic dispersion 1406. As the electric field strength increases from zero, some of the pairs or groups of charged mobile carriers are separated so that fewer of the polymeric coronae 1404 are overlapping, and therefore fewer component chemical entities are in close enough proximity to associate, and therefore fewer optically active chemical entities are able to form. The charged mobile carriers 1402 are separated until the point where the resulting charge separation creates an opposing induced electric field 1702 which substantially cancels out the applied electromagnetic field 1604, at which point the number of particles in contact remains substantially constant. As the applied electric field increases to its maximum required strength, all oppositely charged mobile carriers are separated, and thus all complementary chemical entities are separated and the optically active chemical entity reaches its background concentration, which for the scheme of FIG. 2 is substantially close to zero, and for the scheme of FIG. 3 depends on the value of $K^2_{act,unassoc}$.

When the induced electric field 1702 acts to partially or substantially counter the applied electric field, the effect of this displacement is that in a region in the electrophoretic dispersion 1406 between the positively and negatively charged mobile carriers 1402 that are displaced, the magnitude of the applied electromagnetic field 1604 is decreased with respect to its original magnitude. This region may be termed the screened region, and the charged mobile carriers 1402 which generate the opposing electric field may be termed screening particles. Any charged mobile carriers 1402 which do not substantially contribute to the formation of the screened region and are instead located within the screened region are called screened particles. With the applied electromagnetic field 1604 substantially cancelled out, the remaining electric field in the screened region is subject only primarily to the thermal motion of the screening particles and any screened particles within the region, and varies rapidly in direction and magnitude, and varies between different locations within the screened region. The time averaged net electric field within the screened region is substantially close to zero. As a result, any screened particles within the region do not experience a substantial electric field and are free to continue being attracted to one another, allowing their component chemical entities to form optically active chemical entities. By increasing the strength of the applied electromagnetic field 1604, the number of charged particles required to maintain the screened region increases, and therefore the number of screened particles decreases. This results in a decrease in the number of charged particles which still have intermingling polymeric coronae 1404 and a decrease in the number of optically active chemical entities which form, changing the absorption spectrum of the electrophoretic dispersion 1406. Similarly, by decreasing the strength of the applied electromagnetic field 1604, fewer charged mobile carriers 1402 are needed to maintain the screened region, and the number of optically active chemical entities can increase.

This screened region also highlights an aspect of the electrophoretic dispersion 1406 that may be considered when building a device to house and control the colour of the electrophoretic dispersion 1406. That is, the larger the screened region, the larger the applied electromagnetic field 1604 needed to separate all of the particles within it, or the fewer particles needed to be present. Above a certain electric field strength, the materials around or within the electrophoretic dispersion 1406 can break down, creating a conductive channel and potentially damaging the device. It is therefore preferable to have narrow channels through which the charged particles can move in response to the applied electromagnetic field 1604, though the channels can be extensive in directions perpendicular to the applied electromagnetic field 1604. Several channels may be housed in series in the direction of the applied electromagnetic field 1604, and an equivalent electric field strength can be used to move many more particles simultaneously, as can be seen by applying Gauss's law to the system.

By applying an electric field within the right geometry, two distinctive states can be realised: a first state in which there is no force being used to separate the component chemical entities such that the system reaches an equilibrium between separated component chemical entities and optically active chemical entities and is shifted maximally in favour of the optically active chemical entities, and a second state in which the maximal force the device can apply to separate the component chemical entities is being applied such that a different equilibrium between separated component chemical entities and optically active chemical entities is reached which favours the minimum number of optically active chemical entities. In most applications, it is expected that the optically active chemical entities need to form across a large enough fraction of the surface area of the device that when the device is switched between the first state and the second state, the colour change is visible to an observer or is detectable by a sensor. In addition, enough optically active chemical entities should form in the first state and be separated into the component chemical entities in the second state such that when the device is switched between the first state and the second state, the colour change is visible to an observer or is detectable by a sensor. The way in which both of these objectives are achieved necessarily varies depending on the mechanism being used to switch between the first state and the second state.

The electric field strength applied need only require as much power as is necessary to separate the charged mobile carriers 1402, as anything higher than this value would not change the number of particles in contact, and thus would not have a substantial effect on the colour of the device. The applied electromagnetic field 1604 may be directed in any direction, and the charged mobile carriers 1402 will be separated as described.

Generally, it is preferable to have a large amount of charged mobile carriers 1402 in the suspension fluid to ensure the greatest chance for optically active states to form. Because the charged mobile carriers 1402 are charged, only a certain areal density of particles may be separated at a time with a given applied electric field strength, because as mentioned before, the charged mobile carriers 1402 will only separate until the induced electric field 1702 caused by the charge separation cancels out the applied electromagnetic field 1604, in effect screening any unseparated pairs of charged mobile carriers from the applied electric field. This screened region has only a small net electric field within it which tends to change direction and strength due to the thermal motion of the charged mobile carriers which are providing the screening effect, and so any charged mobile carriers within this region feel a negligible net force which lasts for only a short period of time. It is thus preferable to keep the space over which the charged mobile carriers 1402 are free to migrate under the influence of the applied electric field to between about 2 and 50 times the diameter of a charged mobile carrier 1402 so that as the charged mobile carriers begin to line the walls of the pixel chamber under the influence of the applied electric field, the screened region is kept small so that fewer charged mobile carriers 1402 are left in contact within the region. Another option is to increase the applied electric field strength significantly such that more charged mobile carriers 1402 need to be separated against the walls of the pixel chamber in order to cancel out the applied electric field. However, this will generally work only up to the point where the dielectric materials in the device begin to break down under the applied electric field, at which point the system may fail irreversibly, which is an adverse outcome. A high applied electric field strength is commonly either generated with a voltage drop between electrodes which are separated by only a small distance, which limits the space between the electrodes, or by increasing the voltage drop to be very high. Since power consumption of typical devices tends to increase as the square of the voltage used, this could increase the power consumption to power levels which may be prohibitively high for some applications. Thus, it is preferable to keep the region of space over which the charged mobile carriers 1402 may migrate smaller to decrease the maximum required strength of the applied electric field.

Figure 18:
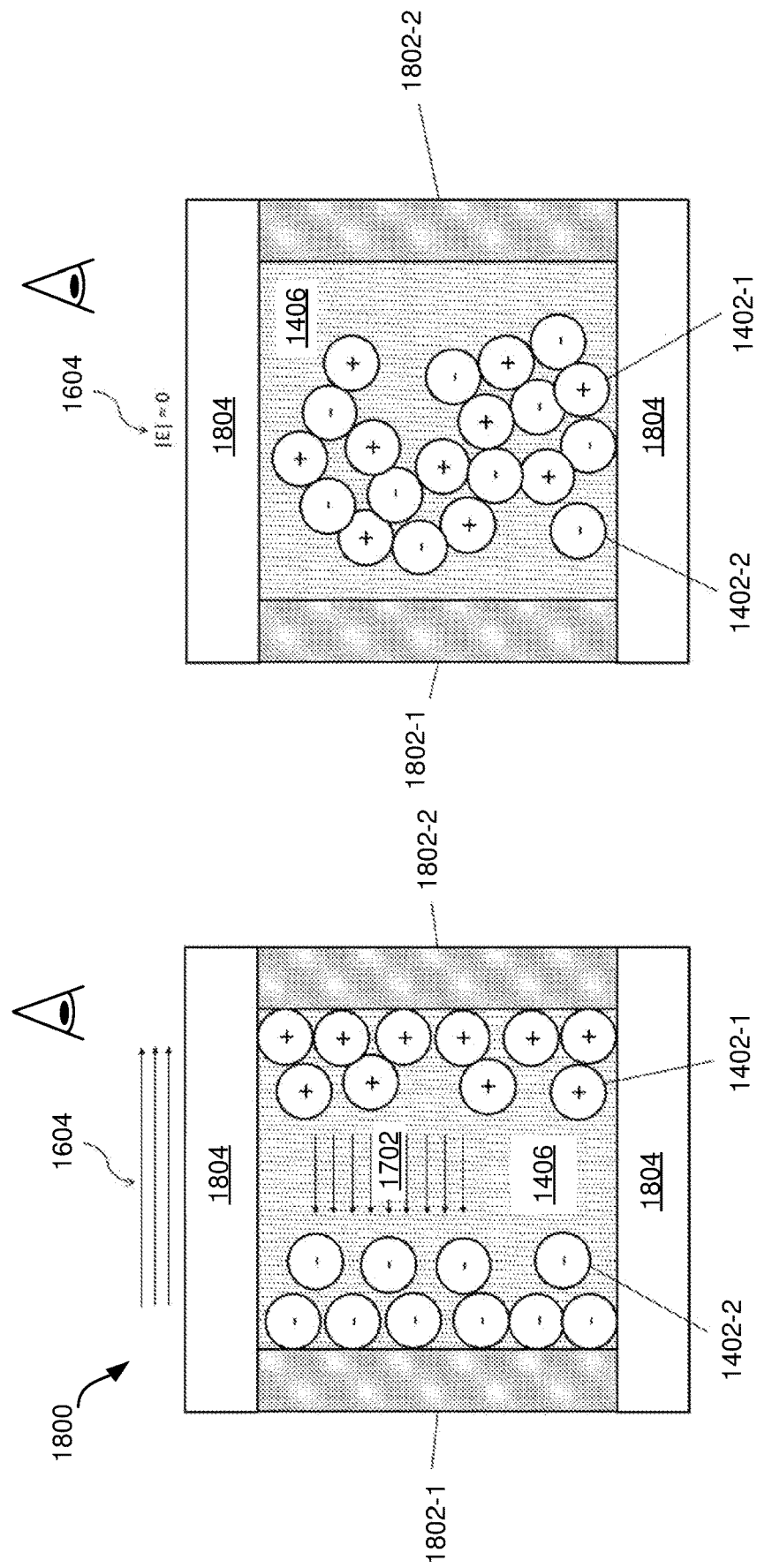
FIG. 18 is a schematic diagram showing a cross-section of structure of an example pixel chamber containing example oppositely charged mobile carriers in an electrophoretic dispersion. A voltage is applied to electrodes to alter an electromagnetic field passing through the pixel chamber to separate the oppositely charged mobile carriers.

FIG. 18 shows a cross section of an example pixel chamber 1800 to contain an electrophoretic dispersion for use in a colour filter of an electrophoretic device. The pixel chamber 1800 includes two electrodes 1802, a driving electrode 1802-1 and a reference electrode 1802-2, which are connected to different voltage sources. The electrodes 1802 are separated by a pixel chamber which is filled with a suspension fluid of an electrophoretic dispersion 1406, and the positively charged mobile carriers 1402-1,1402-2. An applied electromagnetic field 1604 is generated across the space between electrodes 1802 when there is a voltage difference applied between the electrodes. This is the applied electric field which is capable of separating the charged mobile carriers 1402. The separation of the charged mobile carriers gives rise to an induced electric field 1702 which is oppositely directed to and which partially or substantially cancels out the applied electromagnetic field 1604 in the pixel chamber.

The electrodes 1802 shown here can be made of any conductive material, but the choice of conductor may limit the orientation relative to the viewing plane of the device that the electrodes 1802 may adopt. For example, if the electrodes 1802 are substantially transparent to the wavelengths of light which are important to the functioning of the device, typically the visible spectrum, the electrodes 1802 may lie in any direction, as the light is able to penetrate from any direction. However, if the conductive material is not transparent, the electrodes 1802 should have their thinnest direction oriented substantially perpendicular to the viewing angle of the device, such that most of the impinging light is able to penetrate the layer rather than being absorbed or reflected away by the electrodes 1802. It is not necessary for both of the electrodes 1802 to be made of the same conductive material.

Many fluids can be electrolyzed by being in contact with the surfaces of electrodes 1802 as in this configuration, and this may limit the voltage which can be applied by such electrodes 1802, which in turn may limit the total colour change that can be achieved by the colour filter device in this configuration.

The pixel chamber 1800 further includes two regions of encapsulation material 1804 which are used to seal in the suspension fluid of the electrophoretic dispersion 1406, and charged mobile carriers 1402, as well as to keep foreign gases and liquids out of the interior of the pixel chamber. These regions of encapsulation material 1804 may in most cases be electrically insulating, but may have electrically conductive portions, as long as the configuration does not short the electrodes together. The encapsulation material 1804 is preferably chosen to have a refractive index within about 0.2 units of the suspension fluid of the electrophoretic dispersion 1406, and charged mobile carriers 1402 and most preferably within about 0.05 units thereof. The encapsulation material 1804 is also chosen to have low or minimal absorption around the active band produced by the optically active state so as not to interfere with the functioning of the device. Preferably the encapsulation material 1804 is substantially transparent to all visible light or whichever wavelengths are important to the functioning of the device.

Figure 19:
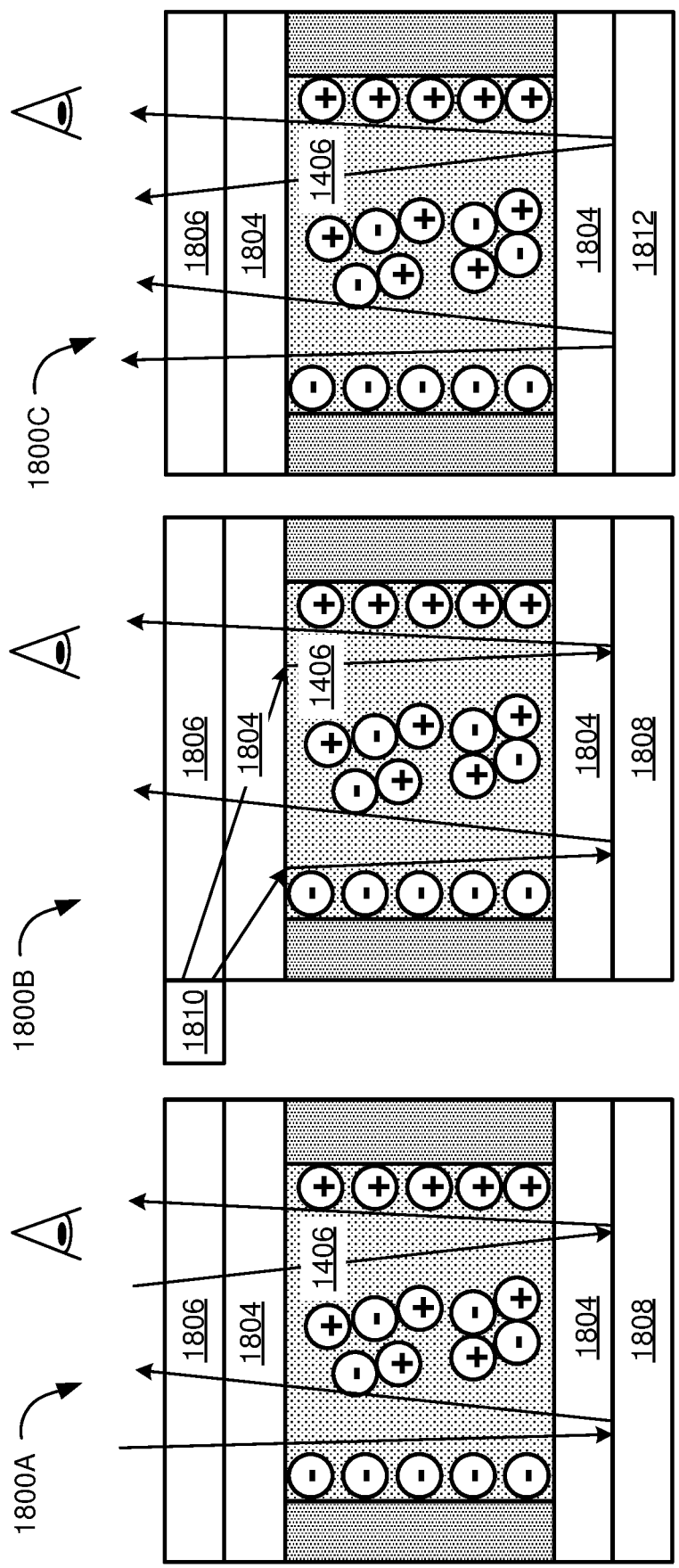
FIG. 19 is a schematic diagram of the pixel chamber of FIG. 18 with the voltage withdrawn, allowing the example oppositely charged mobile carriers to attract and come into close proximity with one another.

FIG. 19 shows the pixel chamber 1800 with a negligible voltage difference applied across the pixel chamber, and thus the charged mobile carriers 1402 are attracted to one another due to the electrostatic attraction between oppositely charged particles, and the charged mobile carriers 1402 come into contact with one another, promoting the formation of an optically active state according to a scheme as discussed herein. Thus, in the state with negligible voltage difference applied, the colour filter becomes partially or substantially opaque to light in the active band. The charged mobile carriers 1402 in the pixel chamber experience thermal motion and will experience a constant average number of interactions with oppositely charged mobile carriers 1402 to produce the active band.

FIG. 19A is a schematic diagram of an example pixel chamber 1800A incorporated into a reflective display. The pixel chamber 1800A is similar to the pixel chamber 1800 of FIGS. 18 and 19, and thus for further description of the pixel chamber 1800A, reference to the description of the pixel chamber 1800 of FIGS. 18 and 19 may be had. Further, in addition to the encapsulation material 1804 encapsulating the electrophoretic dispersion 1406, the pixel chamber 1800A includes a display panel 1806 to convey incident light to, and reflected light from, the pixel chamber 1800A. The pixel chamber 1800A further includes a reflective layer 1808 to reflect incident light passing through the electrophoretic dispersion 1406. The reflected light leaves the pixel chamber 1800A toward a viewer. An optical property of the reflected light is impacted by the component chemical entities in the electrophoretic dispersion 1406.

FIG. 19B is a schematic diagram of an example pixel chamber 1800B incorporated into a side-lit reflective display. The pixel chamber 1800B is similar to the pixel chamber 1800A of FIG. 19A, and thus for further description of the pixel chamber 1800B, reference to the description of the pixel chamber 1800A of FIG. 19A may be had. Further, in addition to the display panel 1806 and reflective layer 1808, the pixel chamber 1800B includes a side light 1810 to light the pixel chamber 1800B from the side. Light transmitted by the side light 1810 travels through the electrophoretic dispersion 1406, reflects off the reflective layer 1808, and leaves the pixel chamber 1800B toward a viewer. The side light 1810 may be provide the pixel chamber 1800B with additional lighting in poor lighting conditions. An optical property of the reflected light is impacted by the component chemical entities in the electrophoretic dispersion 1406. Optical films may be used optical films may be used to produce an even lighting intensity across the surface of the display panel 1806.

FIG. 19C is a schematic diagram of an example pixel chamber 1800C incorporated into a back-lit transmissive display. The pixel chamber 1800C is similar to the pixel chamber 1800A of FIG. 19A, and thus for further description of the pixel chamber 1800C, reference to the description of the pixel chamber 1800A of FIG. 19A may be had. However, in place of the reflective layer 1808, the pixel chamber 1800C includes a back light 1812 to light the pixel chamber 1800B from the side opposite the display panel 1806. The light transmitted by the back light 1812 travels through the electrophoretic dispersion 1406 and leaves the pixel chamber 1800B toward a viewer. An optical property of the reflected light is impacted by the component chemical entities in the electrophoretic dispersion 1406.

Figure 20:
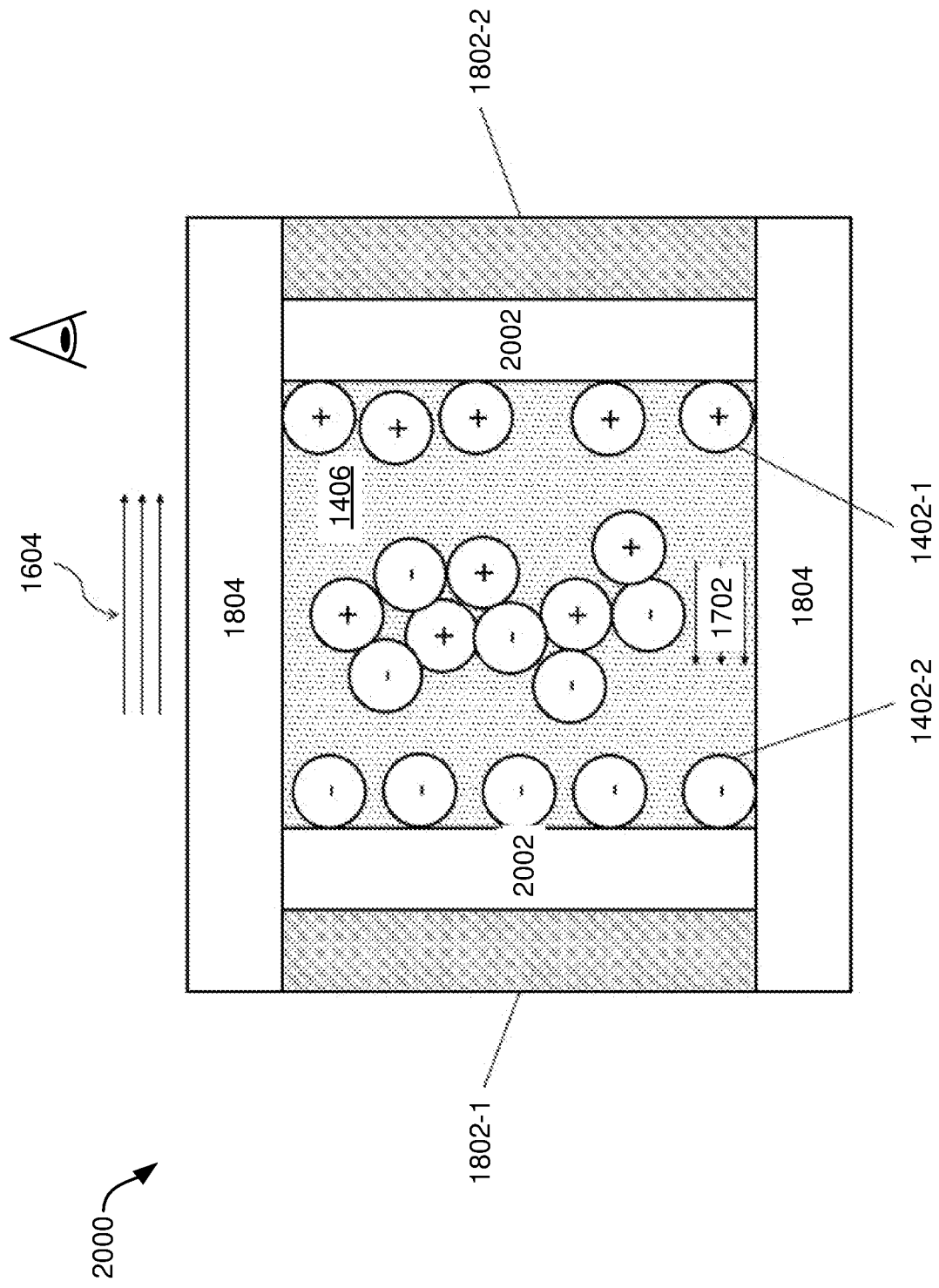
FIG. 20 is a schematic diagram showing a cross-section of structure of another example pixel chamber, the pixel chamber including dielectric barriers to separate the electrophoretic dispersion from electrodes.

FIG. 20 shows another example pixel chamber 2000. The pixel chamber 2000 is similar to the pixel chamber 1800, but includes two dielectric barriers 2002 in the structure which prevent direct contact between the electrodes 1802 and the suspension fluid of electrophoretic dispersion 1406. In most cases, it is preferable that the material comprising the dielectric barriers 2002 is substantially transparent to the wavelengths of light which are important to the functioning of the device, typically visible light, such that it has a small impact on the transmission of these wavelengths of light through the colour filter device. The material comprising the dielectric barriers 2002 should also have a refractive index similar to the refractive index of both the charged mobile carriers 1402 and the suspension fluid, within about 0.1 units and preferably within 0.01 units thereof. In addition, the higher the dielectric constant of the material comprising the dielectric barriers 2002, the smaller the voltage drop will be inside the dielectric barriers 2002, which is generally preferred. The refractive index of the dielectric barriers 2002 may be lower than the refractive index of the suspension fluid by up to about 0.1 units, which may help to concentrate light inside of the suspension fluid where it has a chance of interacting with optically active chemical entities as opposed to within the dielectric barriers 2002 where it may not have a chance to interact with optically active chemical entities.

Figure 21A:
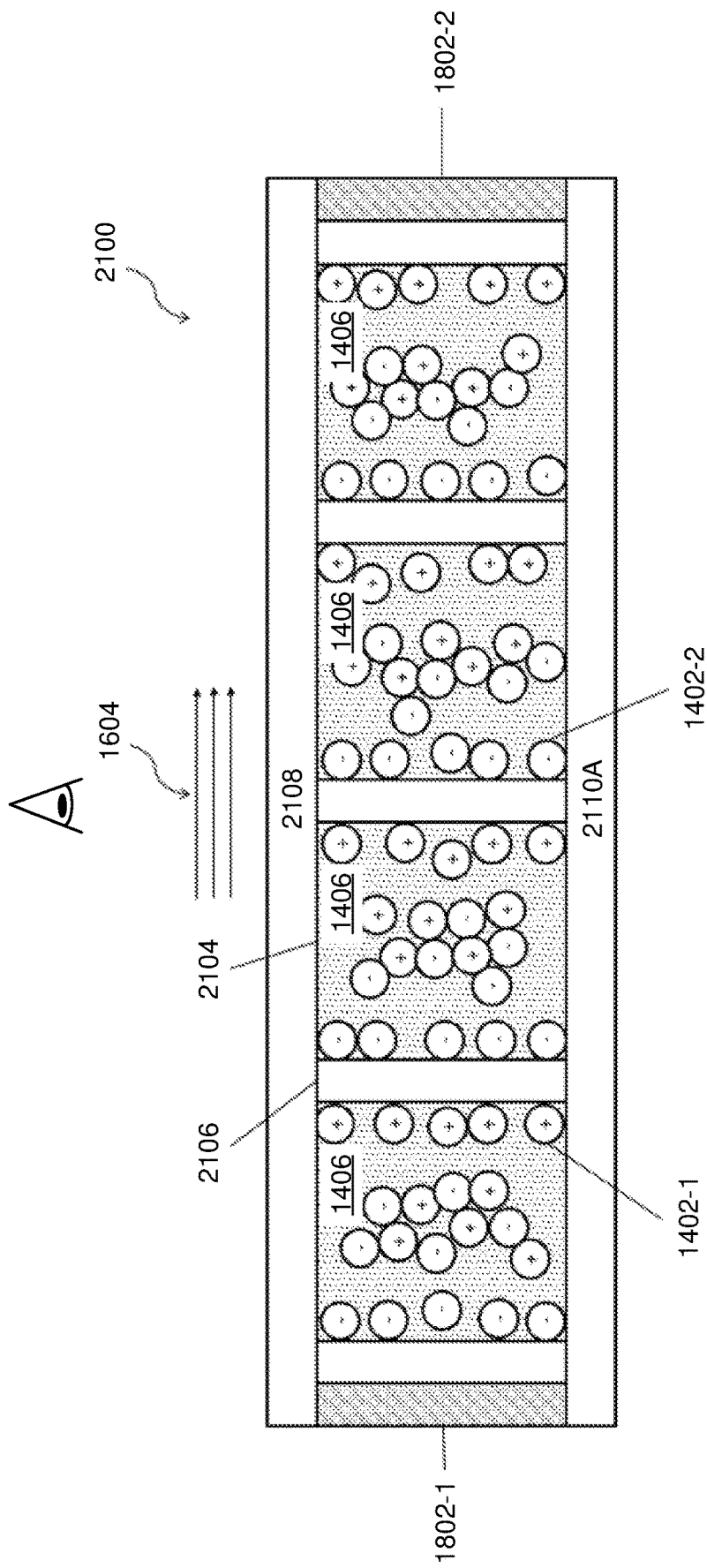
FIG. 21A is a schematic diagram showing a cross-section of structure of an example array of vertical pixel chambers.

FIG. 21A shows an example array 2100 of pixel chambers. Each pixel chamber in the array 2100 may be similar to the pixel chamber 1800, and with electrodes 1802 at either end of a series of pixel chambers. The array 2100 includes vertical pixel chambers arranged side by side in parallel with a viewing direction. The vertical pixel chambers may be termed trench voids 2104, each of which is separated by another trench void 2104 by dielectric fin barriers 2106, and each of which is filled with the suspension fluid of electrophoretic dispersion 1406, and charged mobile carriers 1402. The viewing direction from which the array 2100 is intended to be viewed is indicated by an eyeball symbol. The array 2100 may comprise a layer in a colour filter of an electrophoretic display.

The repeated structure of the array 2100 has the benefit of increasing the number of charged mobile carriers 1402 that can be placed between two consecutive electrodes 1802, while decreasing the amount of light which is blocked by the electrodes 1802. In addition, this configuration reduces the current needed to power the device, since several trench voids 2104 contain charged mobile carriers 1402 moving in parallel, and by Gauss' law, the charge density on the electrodes 1802 matches the charge density of charged mobile carriers 1402, which line the dielectric fin barriers 2106, and so additional trench voids 2104 may be added without increasing the current draw. The voltage required to maintain the strength of the applied electromagnetic field 1604 increases however, as the electrodes 1802 are separated by additional space, and the applied electric field strength is proportional to the reciprocal of the distance between the electrodes 1802 for a constant voltage difference. Further, the separation of trench voids 2104 by dielectric fin barriers 2106 help reduce clumping and other spatial disparities in the charged mobile carriers 1402, and reduce the distance travelled by the charged mobile carriers 1402 in solution when induced by a change in electromagnetic field to alter between active and inactive state, thereby reducing the current draw required to cause a transition between active and inactive states.

The sizes and aspect ratios of the components of the array 2100 depend largely on the manufacturing processes and materials used, however, preferred ranges are given. For dye entities with molar extinction coefficients of about 10,000 L/mol·cm in the active band, a thickness of the array 2100 in the vertical direction of about 300 µm can give reasonable contrast ratios between the separated and optically active states, and this dimension can decrease with the reciprocal of the molar extinction coefficient. If a lower contrast ratio is desired, a thinner thickness may be used, and vice versa for a higher contrast ratio.

The dielectric fin barriers 2106 may have a horizontal width substantially equal to the width of the trench voids 2104, or may differ in width from the trench voids 2104 by a factor of ten or more, but for mechanical stability and to maximize the achievable contrast ratio, the widths may range from about 100 nm to about 10 µm. It may be desirable in many applications to have widths of less than about 25 µm such that the periodicity of trench voids 2104 is less than about 50 µm, which human eyes could begin to distinguish as separate lines across the colour filter.

The charge on the charged mobile carriers 1402 can be kept low to decrease the voltage required to operate the device, but an optimal point may be approached because the response time of the device is inversely proportional to the particle charge and the voltage used.

The number of trench voids 2104 between two consecutive electrodes need not be four as pictured in FIG. 21A, but can be as few as 1 or as many as about 100. As the number of trench voids 2104 between consecutive electrodes 1802 increases, the transmissivity of the device increases, but so too does the voltage required to operate the device.

The electrodes 1802 preferably have a width which is as thin as can be manufactured reasonably, but may range between about 50 nm and about 10 µm, with thinner electrodes giving higher transmissivity.

The particle size of the charged mobile carriers 1402 affects the number of complementary chemical entities which may interact, in that smaller particles have a higher surface area-to-volume ratio. However, if the charged mobile carriers 1402 are too small, the areal charge density of the particles in their fully separated state require an extremely high applied electric field, which is not preferred, as described previously. The size affects the electrophoretic mobility of the particles with smaller particles having higher mobility, allowing the device to switch between colour states more quickly. However, if the particles are too small, their charges attract one another too strongly, decreasing the response time of the device, so again an optimal value may be approached depending on material selection and voltage requirements. The higher the dielectric constant of the dielectric fin barriers 2106, the more the applied electric field is concentrated inside the trench voids 2104. Preferably, the dielectric constant is greater than 3, but higher dielectric constants are achievable depending on the material selected.

The materials comprising the encapsulation layer 2108 and the substrate layer 2110A are chosen such that they are substantially transparent to wavelengths of light which are important for the functioning of the device, most typically about 400 nm-700 nm.

Figure 21B:
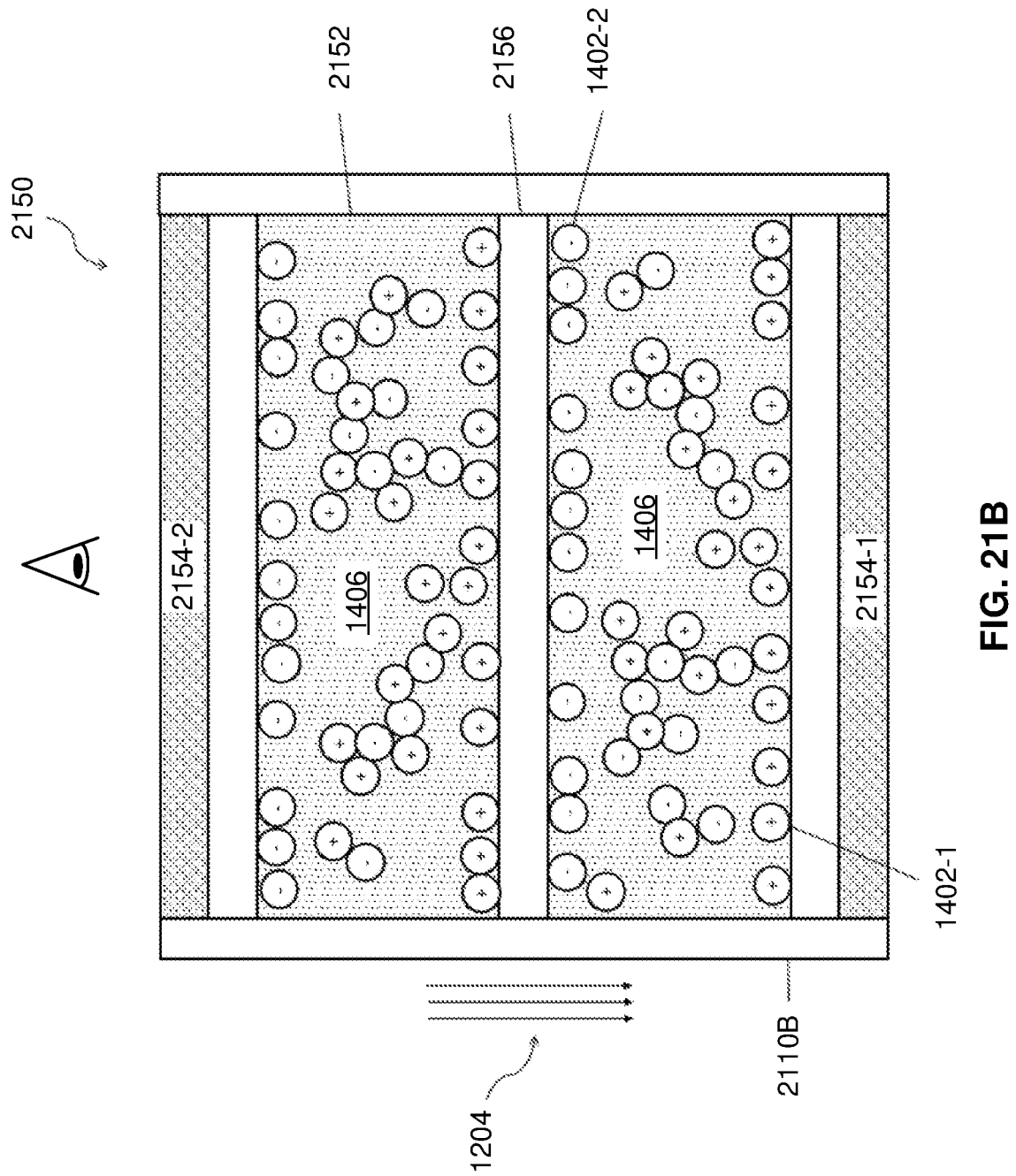
FIG. 21B is a schematic diagram showing a cross-section of structure of an example array of horizontal pixel chambers.

FIG. 21B shows another example array 2150 of pixel chambers. The array 2150 is similar to the array 2100 of FIG. 21A, and thus includes pixel chambers 2152 containing electrophoretic dispersions 1406 and electrodes 2154 as discussed herein. However, the array 2150 includes two layers of horizontal pixel chambers 2152 arranged in horizontal pixel layers stacked on top of one another. The array 2150 may similarly be incorporated into a colour filter of an electrophoretic display device.

The viewing direction is from the top of the page, looking down through a transparent driving electrode 2154-2 and transparent reference electrode 2154-1. The electrodes 2154 therefore apply the electromagnetic field 1204 vertically. However, whether the transparent driving electrode 2154-2 or transparent reference electrode 2154-1 is on the top or bottom is of no consequence. In this example, the transparent electrodes 2154 are made of a transparent conductive film, such as a thin film of indium tin oxide, or a layer of silver nanowires.

Several layers of pixel chambers 2152 may be stacked on top of one another to improve the contrast of the colour filter layer provided by the array 2150. Further, the electrode labeled 2154-1 opposite the viewing direction can also be an opaque material, particularly a reflective material, and the colour filter layer will take on the appearance of a colour changing mirror.

Sheet dielectric barriers 2156 may be positioned in between layers of pixel chambers 2152. These sheet dielectric barriers 2156 may employ spacer beads in order to stay evenly spaced out, which may be any dielectric material shaped in monodisperse particles. Further, the layers of pixel chambers 2152 may be contained within the colour filter by sealant material 2110B.

Figure 21C:
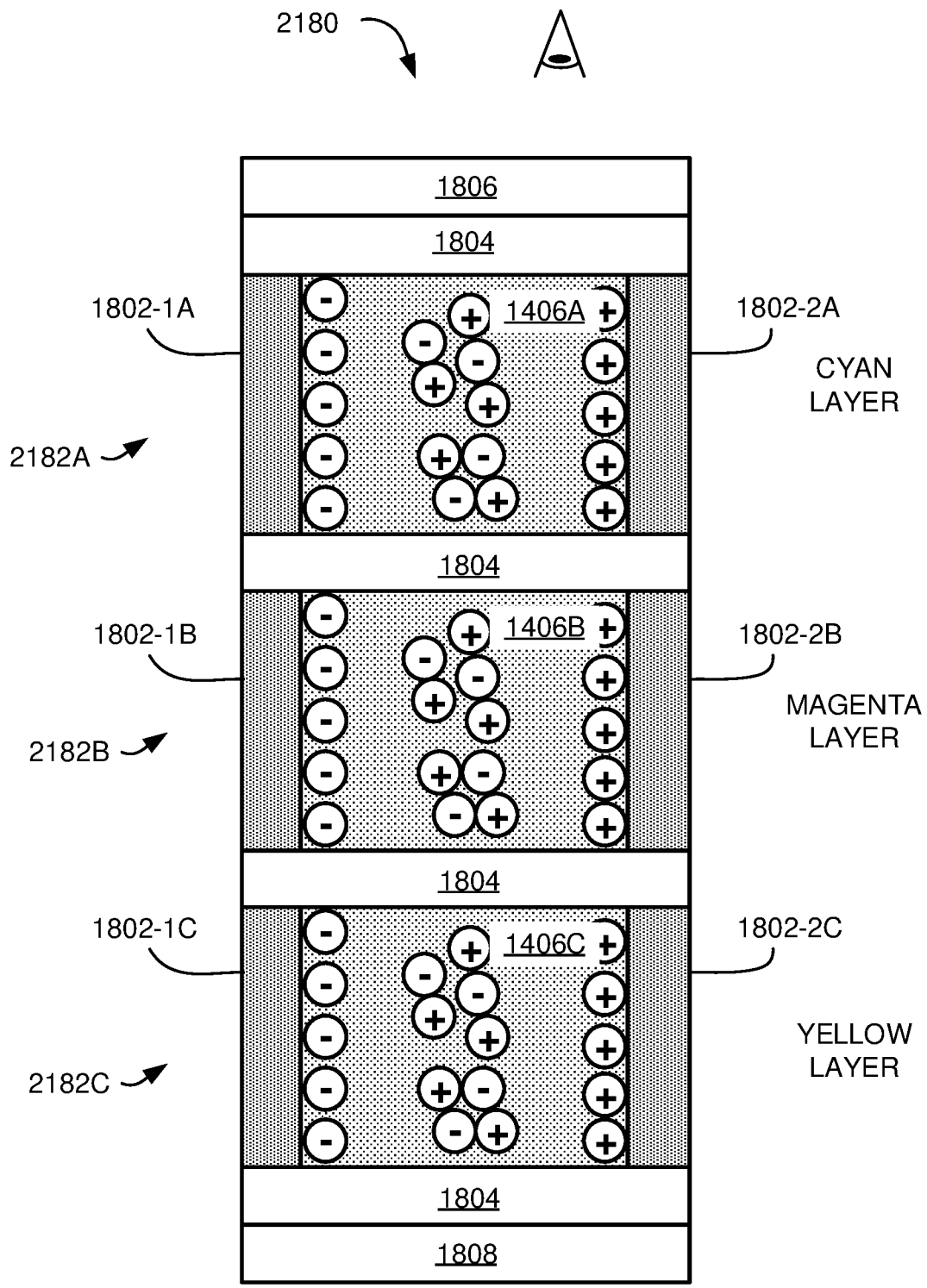
FIG. 21C is a schematic diagram of an example multi-colour pixel unit including a plurality of pixel chambers.

FIG. 21C is a schematic diagram of an example multi-colour pixel unit 2180. The multi-colour pixel unit 2180 includes a first pixel chamber 2182A, a second pixel chamber 2182B, and a third pixel chamber 2182C, each stacked in layers along the viewing direction. Each of the pixel chambers 2182A, 2182B, 2182C, is similar to the pixel chamber 1800 of FIGS. 18 and 18, and thus for further description of each of the pixel chambers 2182A, 2182B, 2182C, reference to the description of the pixel chamber 1800 of FIGS. 18 and 19 may be had. However, each pixel chamber 2182A, 2182B, 2182C, includes different electrophoretic dispersions 1406A, 1406B, and 1406C, respectively, which each include different pairings of component chemical entities that may be induced to interact under an electromagnetic field to exhibit different absorption spectra. For example, as shown, the component chemical entities in the first pixel chamber 2182A may be induced to exhibit a cyan colour, the component chemical entities in the second pixel chamber 2182B may be induced to exhibit a magenta colour, and the component chemical entities in the third pixel chamber 2182C may be induced to exhibit a yellow colour. The order of the differently colored layers shown is exemplary only.

The multi-colour pixel unit 2180 includes a display panel 1806 and reflective layer 1808 at opposite ends of the stack of pixel chambers. Further, each of the pixel chambers 2182A, 2182B, and 2182C includes independently addressable electrodes so that each respective electrophoretic dispersion 1406A, 1406B, 1406C, may be independently exposed to substantially separate electromagnetic fields, and the component chemical entities therein may be independently induced to alter between optically inactive states and optically active states, as discussed herein. Thus, the electrodes 1802-1A and 1802-2A may be controlled to alter an electromagnetic field passing through the electrophoretic dispersion 1406A, the electrodes 1802-1B and 1802-2B may be controlled to alter an electromagnetic field passing through the electrophoretic dispersion 1406B, and finally the electrodes 1802-1C and 1802-2C may be controlled to alter an electromagnetic field passing through the electrophoretic dispersion 1406C.

Thus, the multi-colour pixel unit 2180 may be used in a display to display coloured images or video in a wide range of colours, hues, and saturations. In other examples, other multi-colour pixel units may include two layers of pixel chambers or greater than three layers of pixel chambers.

Figure 22A:
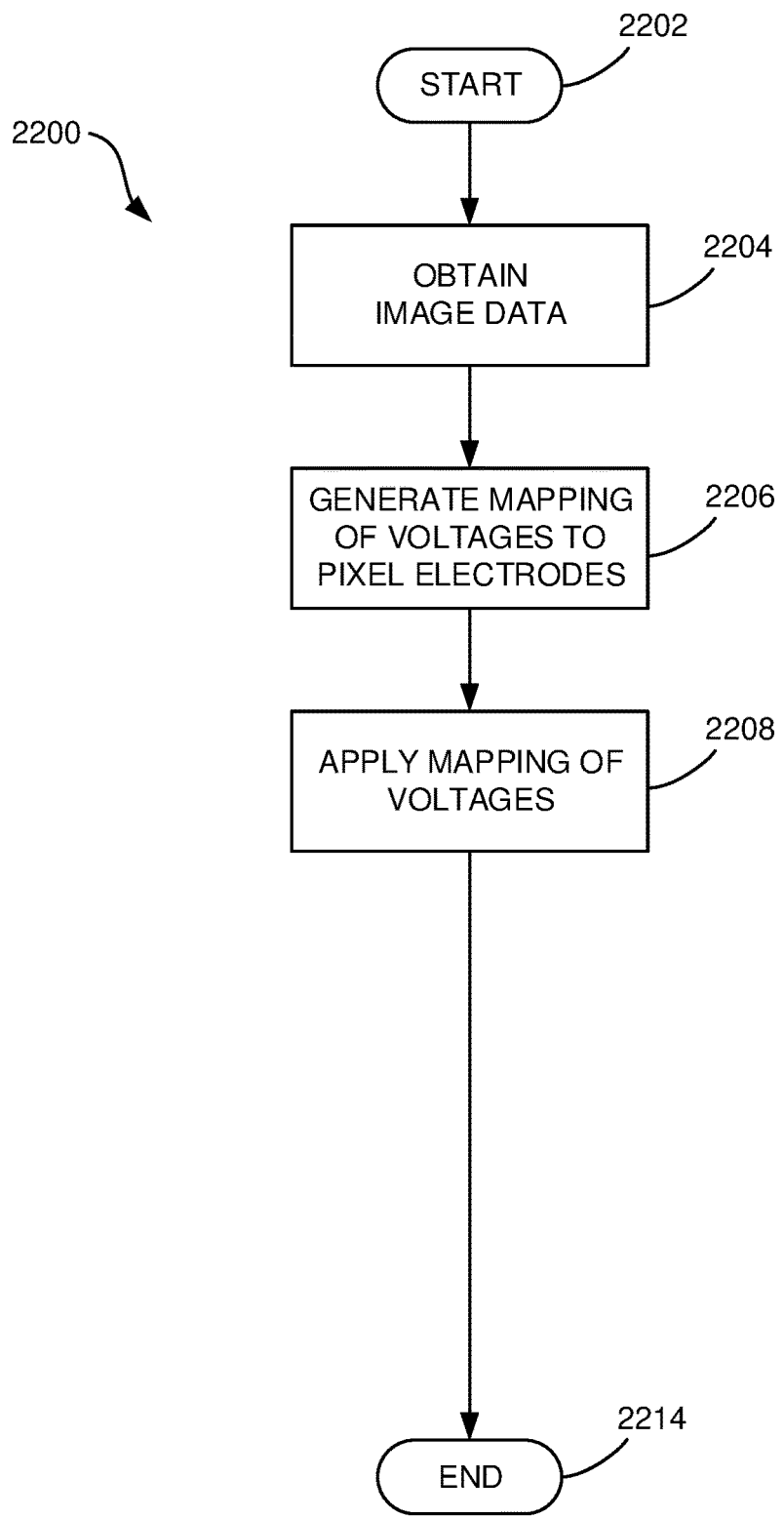
FIG. 22A is a flow chart of an example method for operating an electrophoretic display device.

FIG. 22 is a flow chart of an example method 2200 for operating an electrophoretic display device. One or more of the blocks of the method 2200 may be embodied in instructions stored on a non-transitory machine-readable storage medium executable by one or more processors of a computing device. The computing device may include an electrophoretic display as discussed herein. In the present example, the method 2200 is described as being performed at an electrophoretic display device having a colour filter comprising a plurality of pixel chambers corresponding to pixels of the display device, the pixel chambers containing electrophoretic dispersions which include chemical entities which may be induced to interact under an electromagnetic field to switch states to change an optical property exhibited by the pixel chambers, as discussed herein.

At block 2202, the method 2200 is begun. The method 2200 may begin at an update or refresh of an image frame corresponding to an image to be displayed by the display device.

At block 2204, image data representing an image to be displayed by the electrophoretic display device is obtained. The image data maps an image to be displayed by the display device to one or more pixels of the display device. In other words, the obtained image data corresponds to at least one pixel of the electrophoretic display device. The image data includes instructions for optical properties to be adopted by pixels of the display device. For example, the image data may include instructions for colour and/or degree of saturation or other optical properties of each of the pixels of the display device. As another example, the image data may include instructions for voltages to be applied to electrodes coupled to pixel chambers corresponding to the pixels of the display device to achieve display of the image. Image data may be obtained at a display driver coupled to the electrodes.

At block 2206, a mapping of voltages to pixel electrodes of the electrophoretic display device is generated. As discussed herein, the pixel electrodes control pixel chambers containing component chemical entities that exhibit a first optical property when induced by an electromagnetic field to adopt a separated state and that exhibit a second optical property when induced by an electromagnetic field to adopt an active state. In other words, the pixel electrodes are coupled to pixel chambers corresponding to the pixels of the display device. The voltage may be applied to a driving electrode relative to a reference electrode.

At block 2208, the mapping of voltages is applied to the pixel electrodes to cause the component chemical entities to adopt the separated state or the active state. The mapping of voltages may be applied to one or more pixel electrodes. In other words, a voltage is applied to at least one pixel electrode coupled to a pixel chamber corresponding to a pixel of the display device. Application of the voltage results in adjustment of an electromagnetic field passing through one or more pixel chambers. The applied voltage may substantially generate the electromagnetic field, substantially eliminate the electromagnetic field, increase the strength of the electromagnetic field, or decrease the strength of the electromagnetic field.

Further, adjustment of the electromagnetic field results in states of chemical entities in one or more pixel chambers being switched. The states of the chemical entities may be altered between separated and optically active states, or vice versa, as discussed herein. As such, adjustment of the electromagnetic field may cause chemical entities to separate, thereby adopting a separated state, or to come into close proximity, thereby adopting an optically active state.

Further still, altering the state of chemical entities results in one or more pixel chambers exhibiting an optical property corresponding to the image data. Thus, an optical property, such as colour, contrast, or degree of saturation, of one or more pixels of the display may be changed. For example, the colour of a pixel may change as a result of a change in the strength of the absorption spectrum of an active band according to the scheme of FIG. 2 or FIG. 3. Thus, application of the voltage results in adjustment of an electromagnetic field passing through the pixel chamber, switching of states of chemical entities in the pixel chamber; and exhibition by the pixel chamber of an optical property corresponding to the image data.

At block 2214, the method is ended. However, it is to be understood that any of the blocks of the method 2200 may be repeated as necessary for the display of an image or video on the display device.

Figure 22B:
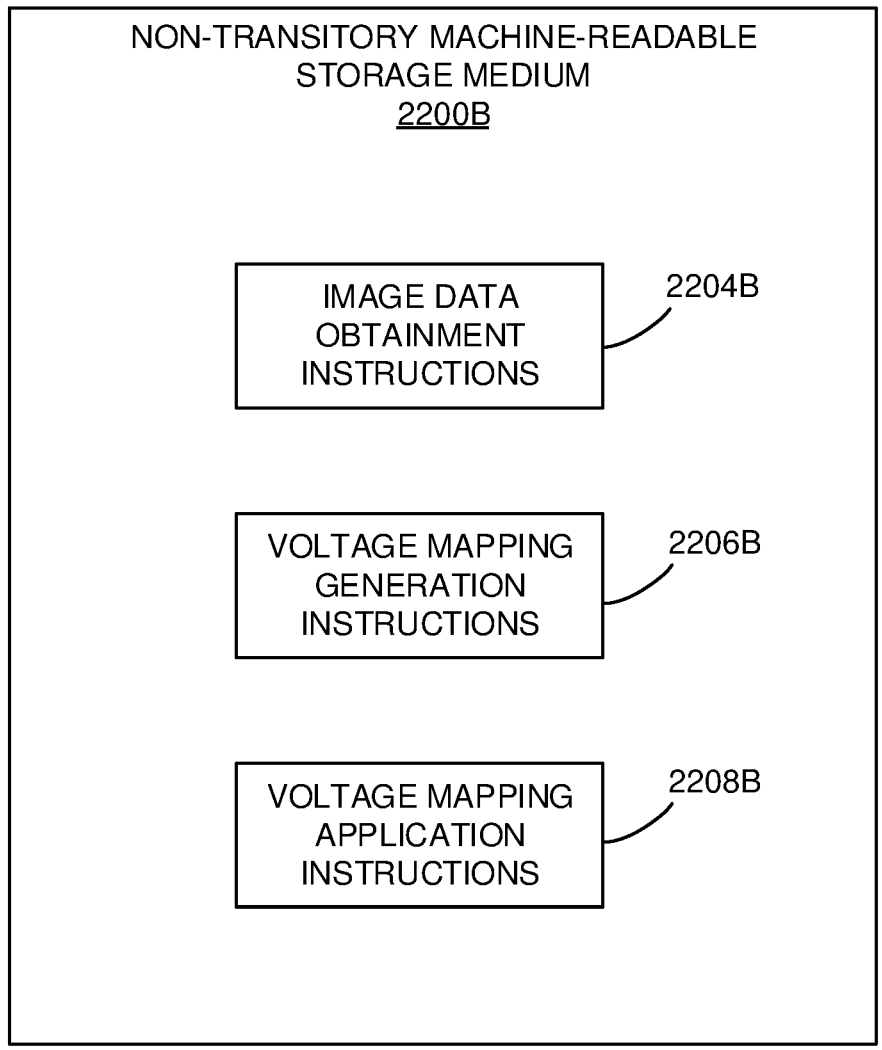
FIG. 22B is a schematic diagram of an example non-transitory machine-readable storage medium containing instructions to control an electrophoretic display device.

FIG. 22B is a schematic diagram of an example non-transitory machine-readable storage medium 2200B containing instructions to control an electrophoretic display device. The instructions are executable by one or more processors of a computing device. The computing device may include an electrophoretic display as discussed herein.

The storage medium 2200B includes image data obtainment instructions 2204B to obtain image data representing an image to be displayed by the electrophoretic display device.

The storage medium 2200B further includes voltage mapping generation instructions 2206B to generate a mapping of voltages to pixel electrodes of the electrophoretic display device. The pixel electrodes are to control pixel chambers containing component chemical entities that exhibit a first optical property when induced by an electromagnetic field to adopt a separated state and that exhibit a second optical property when induced by an electromagnetic field to adopt an active state, as discussed herein.

The storage medium 2200B further includes voltage mapping application instructions 2208B to apply the mapping of voltages to the pixel electrodes to cause the component chemical entities to adopt the separated state or the active state.

Thus, an electrophoretic device may be controlled to display images or video as discussed herein.

Figure 23:
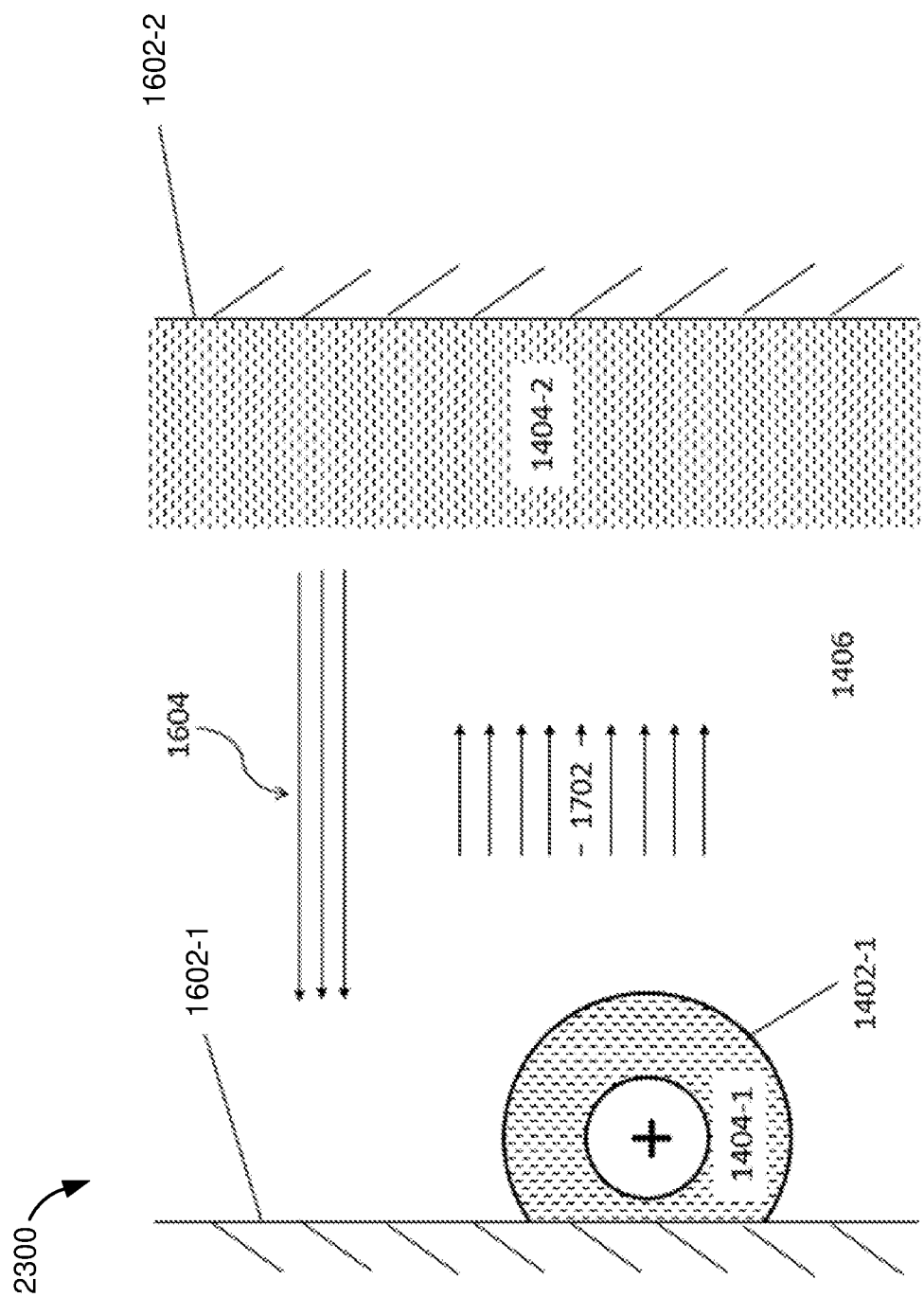
FIG. 23 is a schematic diagram of another example electrophoretic dispersion disposed in a pixel chamber. The pixel chamber includes a charged mobile carrier having a corona of polymers containing a component chemical entity, and an inner wall adorned by a corona of polymers which bears a complementary component chemical entity.

FIG. 23 shows an example charged mobile carrier 1402-1 disposed in an example electrophoretic dispersion 1406 contained in an example pixel chamber 2300. The charged mobile carrier 1402-1 is adorned by a corona of polymers 1404-1 which bears one of two chemical entities. The pixel chamber 2300 includes one inner wall 1602-2 adorned by a corona of polymers 1404-2 which bears the other chemical entity. The two chemical entities may interact to change an optical property of the electrophoretic dispersion as discussed herein. The charged mobile carrier 1402-1 is pulled to one side of the pixel chamber 2300 opposite the inner wall 1602-2 adorned by the corona of polymers 1404-2 under the influence of an electromagnetic field 1604. Alternatively, in some examples, application the electromagnetic field 1604 may pull the charged mobile carrier 1402-1 toward the other inner wall 1602-1 opposite the corona of polymers 140402.

Figure 24:
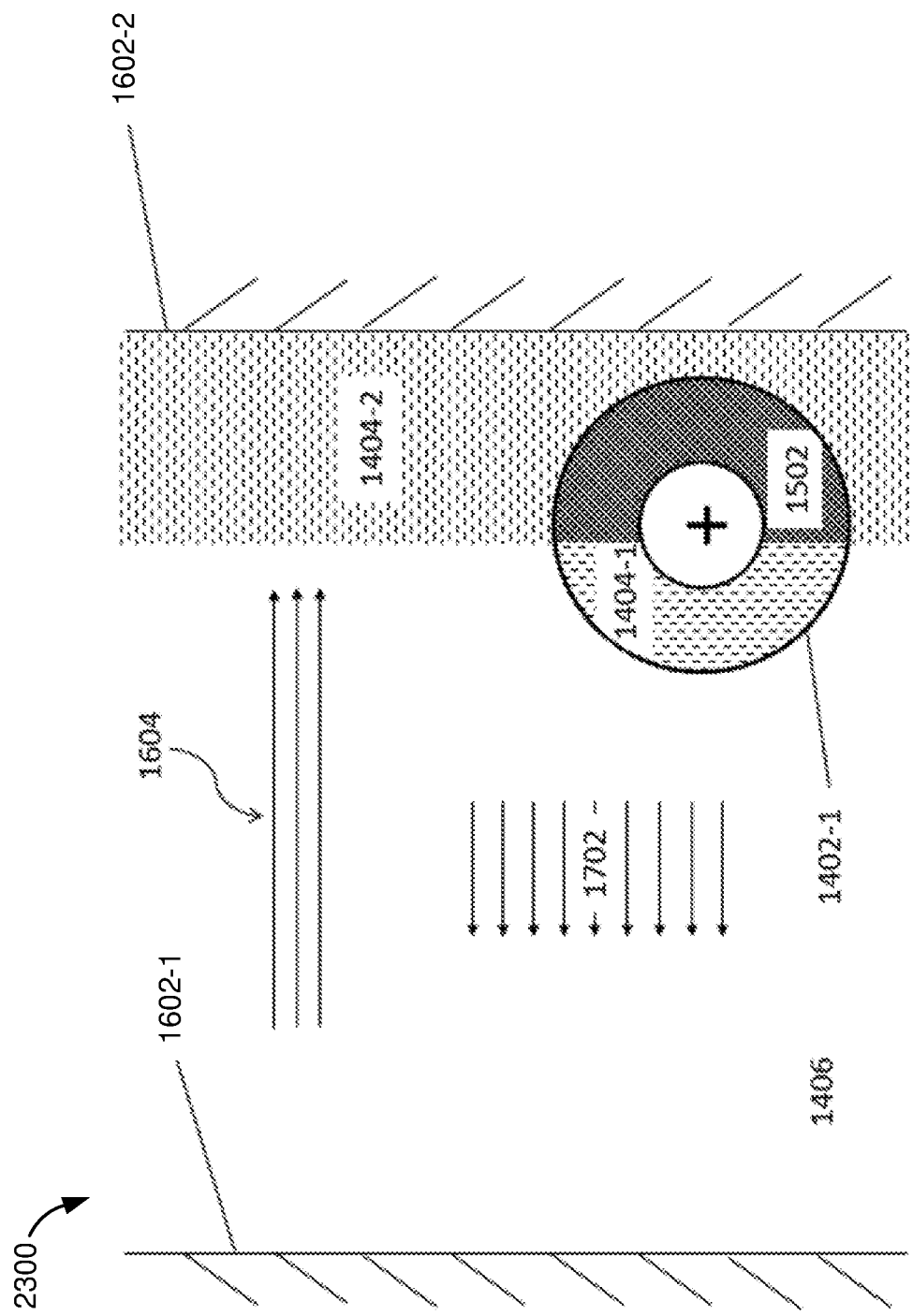
FIG. 24 is a schematic diagram of the electrophoretic dispersion in which charged mobile carrier of pulled to the inner wall, thereby enabling the complementary component chemical entities to interact.

A counter ion may be present in the electrophoretic dispersion 1406 in order to balance out the charge from the charged particles. This counter ion is preferably highly soluble in the electrophoretic dispersion 1406 such that it is not affixed to the surface of the mobile charged particles 1402-1, which would result in substantially uncharged particles. A similar mechanism may also be accomplished with paramagnetic particles, replacing the electromagnetic field 1604 with a non-uniform magnetic field to move the charged mobile carrier 1402-1. FIG. 24 shows the charged mobile carrier 1402-1 pulled to the inner wall 1602-2 adorned by the corona of polymers 1404-1 under the influence of the electromagnetic field 1604, bringing the complementary component chemical entities into close proximity in the overlapping region 1502 of the coronae, thereby enabling the chemical entities to interact.

Thus, one of a first and second chemical entities is attached to the charged mobile carrier 1402-1 dispersed in the electrophoretic dispersion 1406, and the other of the first and second chemical entities is attached to the inner wall 1602-2 of the pixel chamber 2300 containing the electrophoretic dispersion.

Figure 25:
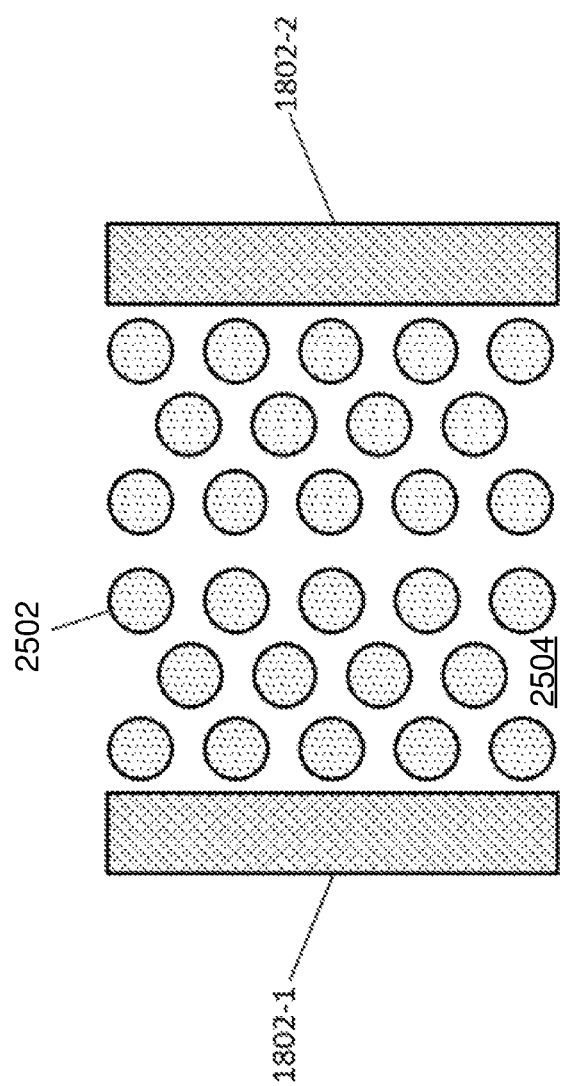
FIG. 25 is a schematic diagram showing a cross-section of structure of an example pixel chamber including a plurality of cylindrical voids containing electrophoretic dispersions.

FIG. 25 shows an example pixel chamber 2500 including a plurality of cylindrical voids 2502 containing electrophoretic dispersions containing chemical entities which may interact to change an optical property of the pixel chamber 2500 as discussed herein. The cylindrical voids 2502 are spaced apart by a dielectric barrier 2504. The dielectric barrier 2504 may be a honeycomb dielectric barrier or a dielectric foam barrier.

The pixel chamber 2500 includes electrodes 1802 which have an extended dimension which goes into the page and is parallel with the axial dimension of the cylindrical voids 2502. The orientation of the electrodes 1802 may depend upon whether the material of the electrodes 1802 is transparent. If the electrodes 1802 are not transparent, the short dimension in the horizontal direction of FIG. 25 should be in the plane of the device. If the electrodes 1802 are transparent, there is no restriction on the orientation of the electrodes 1802. The axial dimension of the cylindrical voids 2502 lies perpendicular to the short dimension of the electrodes 1802, and can either be in the plane of the device or out of plane. Although the cylindrical voids 2502 are shown arranged in a hexagonal packing arrangement for high packing density, other arrangements of the cylindrical voids 2502 are contemplated.

Figure 26A:
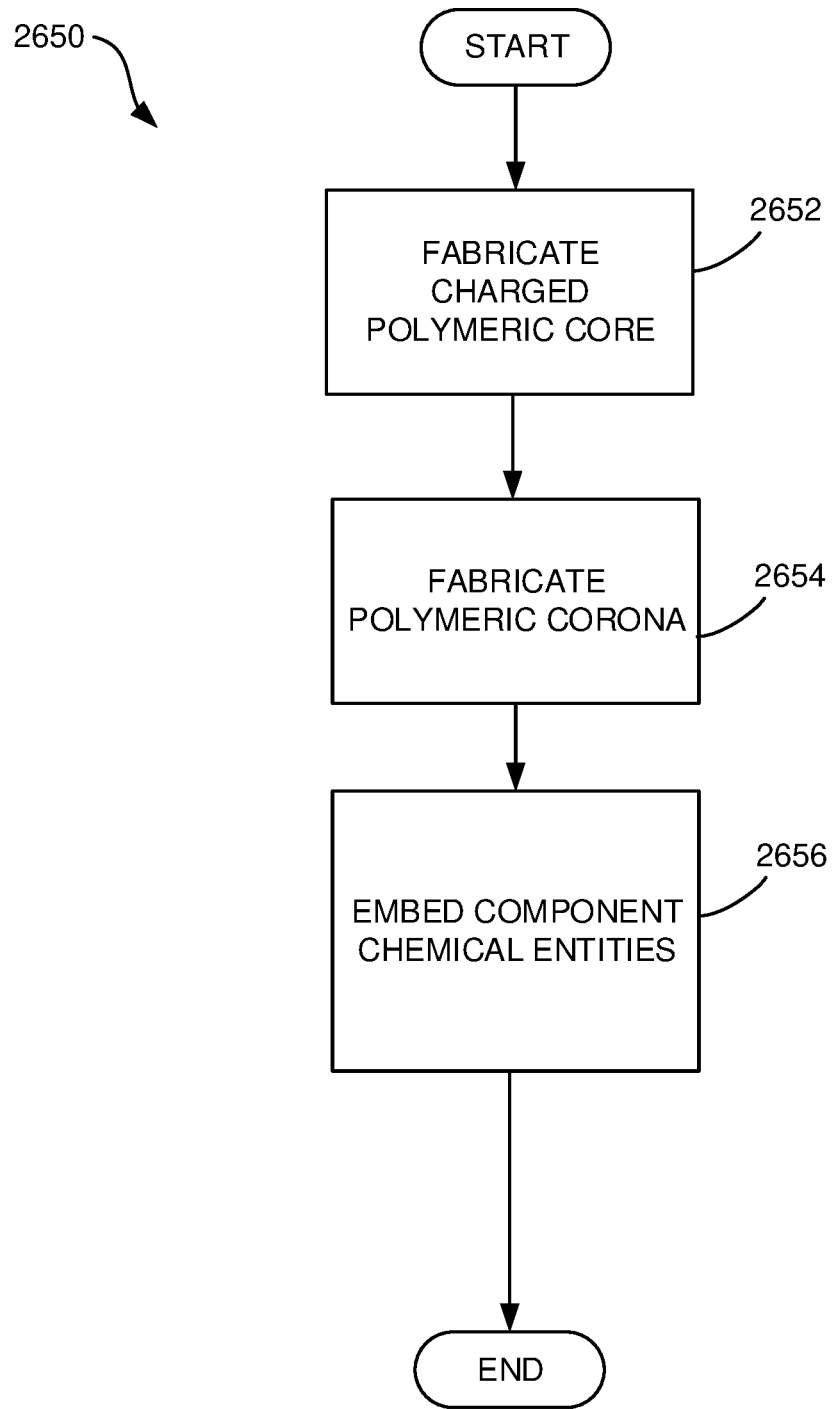
FIG. 26A is a flowchart of an example method for producing an electrophoretic dispersion for use in an electrophoretic display.

FIG. 26A is a flowchart of an example method 2650 for producing an electrophoretic dispersion for use in an electrophoretic display. The method 2650 is one method by which charged mobile carriers containing chemical entities which interact as discussed herein may be formed. It is emphasized that the method 2650 need not be performed in the exact sequence as shown, as discussed in greater detail below.

In brief, a charged polymeric core is fabricated at block 2652; a polymeric corona, or a precursor to the polymeric corona, is fabricated at block 2654; and component chemical entities are embedded in the polymeric corona, or precursor to the polymeric corona, at block 2656. As discussed herein, the component chemical entities that are embedded in the polymeric corona at block 2656 each exhibit a first optical property when induced by an electromagnetic field to adopt a separated state, and exhibit a second optical property when induced by an electromagnetic field to adopt an active state.

Figure 26B:
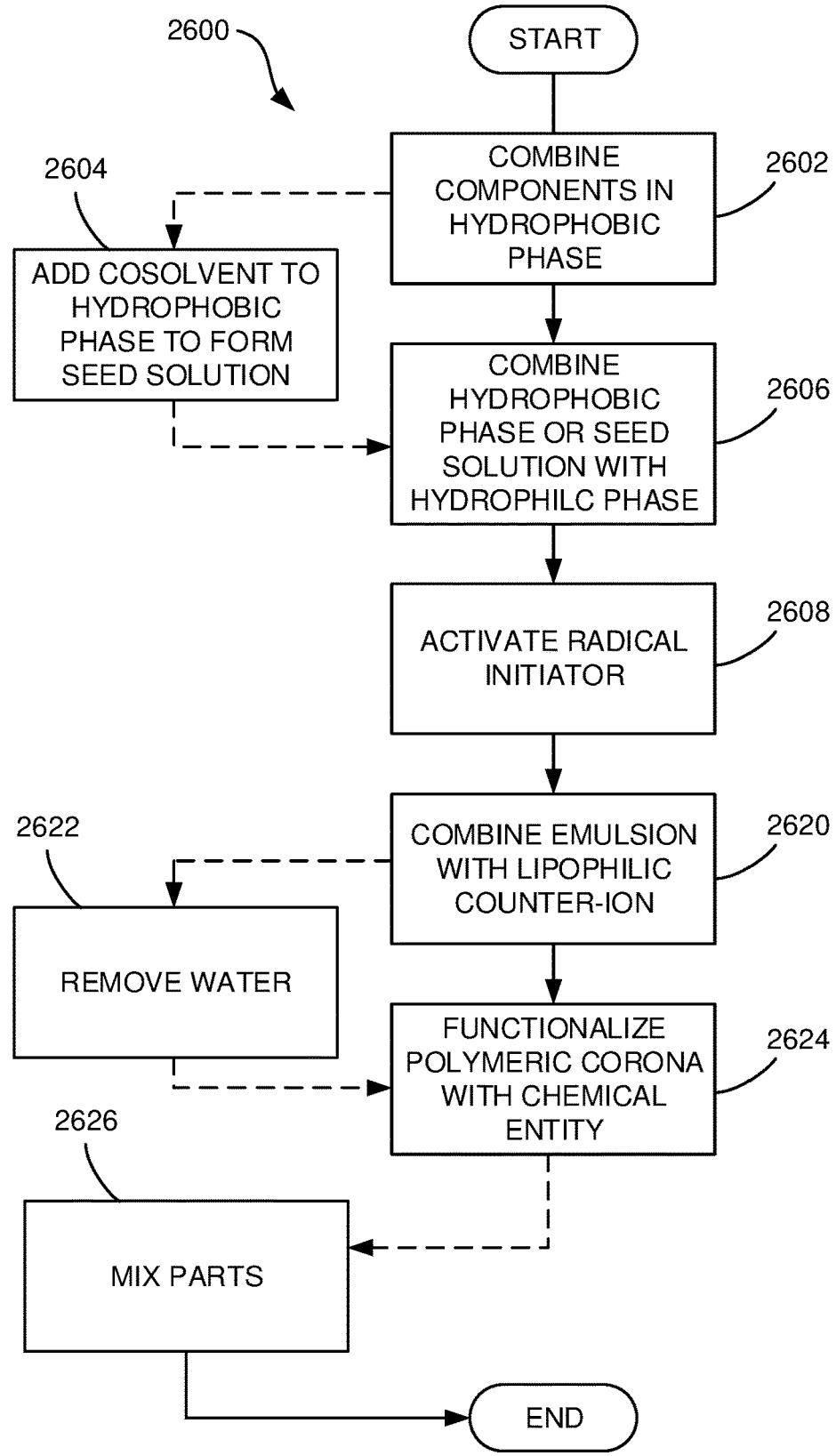
FIG. 26B is a flowchart of another example method for producing an electrophoretic dispersion for use in an electrophoretic display.
Figure 26D:
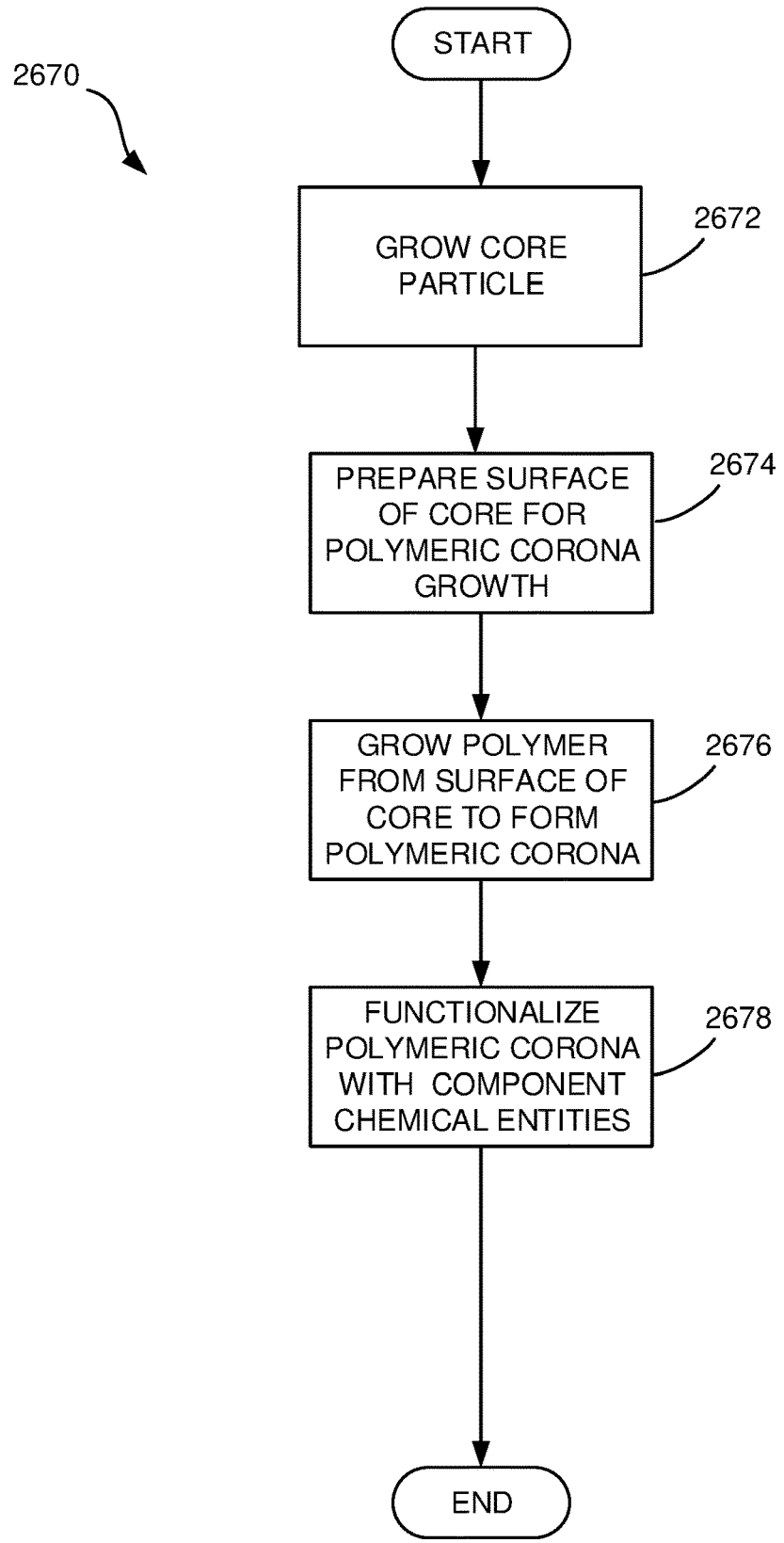
FIG. 26D is a flowchart of another example method for producing an electrophoretic dispersion for use in an electrophoretic display.

When the method 2650 is executed with block 2652 before block 2654, as in the example order shown, the method may be termed a "core-first" method. FIG. 26D provides an example of such a "core-first" method, as described below. In "core-first" methods, execution of the method 2650 may proceed from block 2652 to 2654 to 2656, or from 2652 to 2656 to 2654. That is, the component chemical entities may be embedded before or after formation of the polymeric corona. In some examples, the component chemical entities may be embedded in the polymeric corona. In other examples, the component chemical entities may be embedded in a precursor to the polymeric corona, before fabrication of the polymeric corona.

When the method 2650 is executed with block 2654 before block 2652, the method may be termed an "arm-first"

method. FIG. 26B provides an example of execution of such an "arm-first" method, as described below. In "arm-first" methods, execution of the method 2650 may proceed from block 2654 to 2652 to 2656, or from 2654 to 2656 to 2652. That is, component chemical entities may be embedded before or after formation of the charged polymeric core. Further, in some examples, the component chemical entities may be embedded in the polymeric corona.

When the method 2650 is executed with block 2656 before blocks 2652 and 2654, the method may be termed a "component-first" method. In "component-first" methods, execution of the method 2650 may proceed from block 2656 to 2652 to 2654, or from 2656 to 2654 to 2652. That is, the charged polymeric core and a precursor of the polymeric corona may be formed in either order. In such examples, the precursor of the polymeric corona may be termed a prefunctionalized monomer, which is later formed into a polymeric corona around a charged polymeric core.

FIG. 26B is a flowchart of another example method 2600 for producing an electrophoretic dispersion for use in an electrophoretic display. The method 2600 is one method by which charged mobile carriers containing chemical entities which interact as discussed herein may be formed. In particular, the method 2600 is one example of execution of the method 2650 of FIG. 26A as an arm-first method. FIG. 26C depicts example stages of the electrophoretic dispersion being formed according to the method 2600.

At block 2602, several components are first combined into a hydrophobic phase 2602B (FIG. 26C). These components comprise an amphiphilic block copolymer which has a hydrophobic portion and a hydrophilic portion, an ionic cosurfactant, a radical initiator such as a photoinitiator which is sensitive to UV radiation or a thermal initiator sensitive to temperature, and a hydrophobic monomer. Optionally, the combination may also include non-ionic cosurfactants.

The amphiphilic block copolymer may be selected such that the hydrophilic block may be functionalized with component chemical entities in a later step. Suitable polymers for the hydrophilic block include polyvinyl alcohol, polyacrylic acid, or other water-soluble polymers with reactive functional groups such as alcohols and carboxylic acids.

The hydrophobic block of the block copolymer may be selected to have a high polymerisation functionality, especially one which will crosslink with monomers initiated by free radicals. Suitable polymers for the hydrophobic block include polybutadiene, polyisoprene, or other hydrophobic polymers with double bonds or thiols, or other functional groups which can be used to crosslink two organic molecules together.

Preferably, the block copolymer is substantially colourless in the visible spectrum, so that it does not interfere with a desired change in optical property of the electrophoretic dispersion by interaction of component chemical entities. The block copolymer may have a hydrophobic-liphophilic balance (HLB) of between about 8 and about 16 so that it can act as an oil-in-water surfactant.

The nonionic cosurfactant may be selected to be a smaller molecule than the block copolymer to help lower the surface tension of the emulsion which will be formed in a later step. The nonionic cosurfactant may also be selected to have an HLB of between about 8 and about 16. The non-ionic cosurfactant should preferably have at least one functional group which can be used to crosslink it with the other organic molecules in the system, such as a double bond between two adjacent carbons, and is also preferably colourless. An example of a suitable nonionic cosurfactant is Polyoxyethylene (10) oleyl ether.

The ionic cosurfactant is used to impart charge to the emulsion particles that will be formed in a later step. The ionic cosurfactant is used in such small quantities in the formulation that its colour is not of great concern, but is still preferably a colourless molecule, and should preferably have at least one functional group which can be used to crosslink it with the other organic molecules in the system, such as a double bond between two adjacent carbons. To form positively charged cores, the ionic cosurfactant is a cationic surfactant, for example oleyl trimethylammonium bromide. For negatively charged particles, the ionic cosurfactant is an anionic surfactant, such as sodium oleyl sulphate.

The radical initiator may be a photoinitiator, an oil-soluble molecule which generates free radical species upon absorption of ultraviolet light. Preferably, the products of the initation reaction are not gaseous and are not coloured. A suitable exemplary photoinitiator is 2-Hydroxy-2-methylpropiophenone. The radical photoinitiator may be a thermal initiator such as azobisisobutyronitrile. Other reagents for initiating the crosslinking reactions are contemplated.

The hydrophobic monomer is an oil soluble molecule which can polymerize with nearby monomers or crosslinkable sites upon encounter with a radical species. This monomer preferably has a very low to negligible solubility in water. The polymer which forms from the polymerisation of this monomer should have a refractive index which is substantially similar to the refractive index of the suspension fluid which will be used to suspend the charged particles as described previously.

These components can be combined in one vessel and mixed thoroughly, though there is no requirement that the components form a homogeneous solution. The block copolymer may make up between about 10% and 60% of the mixture by mass, depending on its molecular weight and composition, the nonionic cosurfactant should make up about 0-10% of the mixture by mass depending on its molecular weight and the molecular weight of the block copolymer, and depending on the desired properties of the charged particles. The ionic surfactant should be present in a mole fraction of between $\frac{1}{40}$ and $\frac{1}{500}$ of the block copolymer, depending on the desired charge and size of the charged particles. The radical initiator should make up between about 1% and 10% of the mass of the mixture, and the hydrophobic monomer should make up the rest of this mass. The actual proportions will depend on the desired properties of the charged particles.

At block 2604, optionally, a cosolvent may be added to the hydrophobic phase 2602B to produce a seed solution 2604B for combination with the hydrophilic phase 2606B (FIG. 26C). The cosolvent should be a good solvent for all of the components of the mixture, and is miscible with water. The choice of this cosolvent is dependent on the components of the mixture therefore, but solvents such as tetrahydrofuran, acetone and ethanol can often fulfill these criteria. This cosolvent is also preferably more volatile than water, as in some embodiments it will need to be removed preferentially. The resulting seed solution 2604B may be substantially less viscous than the hydrophobic phase 2602B. The volume of cosolvent required may depend on many factors including but not limited to the molecular weight of the block copolymer and the amount needed to reduce the viscosity a sufficient amount. It is preferable that as little solvent is used as practical. Alternatively, the hydrophobic phase 2602B may be added directly to the hydrophilic phase 2606B.

At block 2606, the seed solution 2604B is combined with a hydrophilic phase 2606B (FIG. 26C). Combination may be accompanied with agitation or stirring. The surfactants coalesce around the water-insoluble components to form a nanoemulsion, which consists of hydrophobic droplets surrounded by water and cosolvent. The cosolvent provides more time for the block copolymers to arrange themselves in a spherical shape as the cosolvent diffuses out from the oil phase and into the water phase. The resulting nanoemulsion consists of nearly monodisperse oil droplets in water in the size range of about 20-200 nm. These oil droplets may thus form into precursor particles 2612B.

At block 2608, the nanoemulsion is then exposed to stimulant 2608B (FIG. 26C), such as ultraviolet radiation with a wavelength suitable to cause a photoinitiator to generate radical species, or such as heating of the nanoemulsion sufficient to activate a thermal initiator, or another stimulant to activate the radical initiator. This begins to crosslink the components of the nanoemulsion droplets to form polymeric nanoparticles 2610B (FIG. 26C). This stage can last for several hours to ensure a high degree of crosslinking, and may also require constant gentle mixing to ensure even exposure for all of the particles and discourage aggregation. Because of the crosslinking the polymeric nanoparticles 2610B may be resistant to dissolution, ageing or dissociation processes. The polymeric nanoparticles 2610B may also have a refractive index which is substantially similar to the refractive index of the suspension fluid of an electrophoretic dispersion in which the polymeric nanoparticles 2610B will be used. The polymeric nanoparticles 2610B also have a polymeric corona which can be functionalized in a later step with the component chemical entities. Thus, the polymeric nanoparticles 2610B may be considered a precursor to charged mobile carriers for chemical entities, such as the charged mobile carriers 1402 of FIG. 14. The polymeric nanoparticles 2610B may also have a few ionic functional groups on their surface, which can be used to impart charge to the particles in a later step.

At block 2620, the nanoemulsion is combined with a lipophilic counter-ion or pair of counter-ions. The nanoemulsion may be combine with an excess of counter-ion. The counter-ion may be oil soluble to the solution of polymeric nanoparticles. Where a pair of counter-ions is used, the pair of counter-ions may be selected to precipitate as a solid for ease of removal at a later step. To produce charged mobile carriers with positively charged cores, a suitable addition can be sodium tetraphenylborate, where the counter ion of the cationic surfactant is intended to be replaced with the tetraphenylborate ion by competition. For negative particles, tetraphenylphosphonium bromide can be added with the intention of replacing the counter ion of the anionic surfactant with the tetraphenylphosphonium ion.

At block 2622, optionally, excess water is removed from the nanoemulsion. Dialyzing in ultra pure water can remove the excess of these compounds which were added, as well as any surfactants which are freely dissolved in the water phase and not crosslinked into any of the particles. A solvent exchange may also be performed to remove water from the system which can interfere with further chemical reactions in later steps. The solvent employed may be a polar aprotic solvent in many cases, but will typically depend on the nature of the next step. A drying agent such as calcium sulfate may also be employed. Alternatively, functionalization of the polymeric coronae in the nanoemulsion may take place directly. Further, the polymeric coronae may be functionalized prior to polymerization of the block copolymers, or after polymerization of the block copolymers.

At block 2624, the polymeric coronas of the polymeric nanoparticles 2610B are functionalized with chemical entities. A polymeric nanoparticle functionalized with a component chemical entity may be similar to a charged mobile carrier as discussed herein, such as a charged mobile carrier 1402 of FIG. 14. A different component chemical entity is to be coupled to the positively charged particles than to the negatively charged particles. As an example, attaching the component chemical entities to the polymeric nanoparticles 2610B may be achieved by a coupling reaction between a hydroxyl group on the component chemical entity and a carboxylic acid on the hydrophilic block of the amphiphilic block copolymer that makes up the polymeric corona of the particle. In a similar way, a small molecule may be coupled to the polymeric corona in order to deter charged groups of the polymeric corona from influencing the charge of the particle. This depends on the degree of ionization of the functional groups on the polymeric corona in the suspension fluid of the electrophoretic dispersion.

At block 2626, optionally, a solution containing a positively charged mobile carriers with first chemical entities (a first part) is mixed with a solution containing negatively charged mobile carriers with second chemical entities (a second part) to produce an electrophoretic dispersion as discussed herein, such as the electrophoretic dispersion 1406 (FIG. 14). Alternatively, a single part of the electrophoretic dispersion may be stored and combined with another part at a later time.

Following mixing, optionally, the resultant combination may be further conditioned. For example, the mixture may be dialyzed in order to remove the counter ions that were added earlier. As another example of counter ion removal, if the ionic surfactants used form a salt which precipitates in solution (such as where the negative surfactant is silver omega undecenyl sulfate and the positive surfactant is undecenyl trimethylammonium bromide), the precipitated salt may be removed by another process such as filtration or centrifugation. As another example of further conditioning, a further solvent exchange may be performed to change the solvent.

Other methods for forming polymeric nanoparticles similar to the polymeric nanoparticles 2610B are contemplated, including phase inversion methods, ultrasonication, among others. A phase inversion method would involve heating the hydrophobic phase 2602B before combining the hydrophobic phase 2602B with a cooled hydrophilic phase 2606B. An ultrasonic method would involve the use of high amplitude and high frequency sound waves to break up surfactant and oil droplets suspended in the mixture of the hydrophobic phase 2602B and hydrophilic phase 2606B into finer particles. The method 2600, which may be termed the spontaneous nanoemulsion method, along with phase inversion methods, may result in particles which are substantially monodisperse in size and thus preferable to other methods which may result in wider size distribution.

An example formulation of an electrophoretic dispersion derived from execution of the method 2600 of FIG. 26B is now described. In this example formulation, Glycerol Monomethacrylate (a water soluble monomer) and Glycidyl Methacrylate (functionalizable monomer) are polymerized to a chain length of about 35 units using a living polymerization mechanism. In this example, the method chosen is known as Initiators for Continuous Activator Regeneration Atom Transfer Radical Polymerization (ICAR ATRP), but other methods of living polymerization may be employed as well, such as reversible addition fragmentation polymerization (RAFT), nitroxide mediated polymerization (NMP), and others, so long as the reagents are compatible with the method chosen. In this example, reduction of activator species is carried out by a free radical initiator such as AIBN or Benzoyl Peroxide. The activator species employed, also referred to as the metal catalyst, is a copper (II) bromide complex with a bidentate ligand such as bipyridine or a tridentate ligand such as TPMA, Me6Tren or PMDETA. The slow and continuous generation of free radicals converts the copper(II) species to a copper(I) species by transfer of the halogen group. The reaction is carried out at temperatures between 65-70 C in bulk, single solvent or in a solvent combination of Methanol, DMF and Anisole. At the end of the reaction the growing Polyglycerol Monomethacrylate chains are capped off with a bromo group which can be re-initiated to continue monomer addition at the chain end. Isolation of polymer is achieved in an oily non solvent such as Benzene, toluene or DCM. The precipitated polymer is dried under vacuum at 50 C and collected as a white solid. Arm extension of the Polyglycerol Monomethacrylate with another 20 units of Butyl Methacrylate is carried out via Activators ReGenerated by Electron Transfer (ARGET) ATRP by dissolving the obtained precipitates in a combination of Methanol, DMF and Anisole and addition of reducing agent such as glucose, Tin(II) Ethylhexanoate or ascorbic acid, previously described catalayst-ligand complex and Butyl Methacrylate. The reaction is carried out at 60-70 C for 3 to 5 hours depending on rate of polymerization. Other methods of chain extension of the polymer may be used as well, the choice will vary depending on which method was used to produce the first block of the polymer.

The polymer is isolated and purified as necessary. To this polymer is added a cosolvent such as 1,4-dioxane, a water-insoluble monomer, preferably the same monomer that was used in the hydrophobic block of the copolymer, an oil-soluble crosslinker such as Ethylene Glycol Dimethacrylate (EGDMA), a charge-carrying surfactant which has at least one group which may react with a radical species to form a bond such as sodium oleyl sulfate, and an oil-soluble radical photoinitiator such as 2-Hydroxy-2-methylpropiophenone. Other non-ionic surfactants may be added to aid in emulsion formation. This is rapidly mixed into deionized water, forming a nanoemulsion, using the block copolymer as the principal surfactant. The emulsion is subjected to ultraviolet light which is of a suitable wavelength to cause the photoinitiator to generate radicals, and the core of the emulsion droplets proceed crosslink the droplets into solid particles. The remaining polymerizable groups at the ends of the block copolymers serve to link the copolymers into the matrix, and the double bond or other reactive group in the charged surfactant does the same. The ratio of the block copolymer surfactant to the charged surfactant is large (4000:1 in the present example) so that each of the particles end up with very few net charges.

The particles were then purified by dialysis into a polar aprotic solvent such as ethyl acetate, and concentrated by rotary evaporation. To the particles, the appropriate component chemical entity was added and allowed to react overnight. The particles were again dialyzed to remove the excess.

Particles of one charge & component chemical entity are then mixed with their complements, and purification is performed as needed to remove counter ions.

Figure 26E:
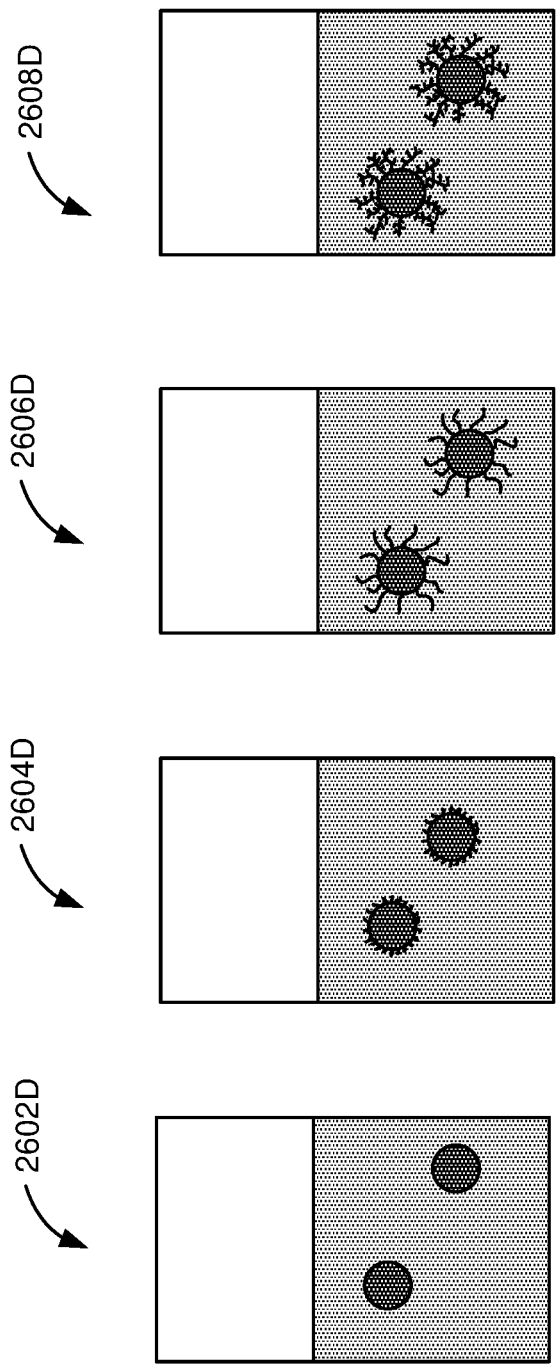
FIG. 26E is a schematic diagram depicting example stages of the production of an electrophoretic dispersion according to the method of FIG. 26D.

FIG. 26D is a flowchart of an example method 2670 for producing an electrophoretic dispersion for use in an electrophoretic display. The method 2670 is one method by which charged mobile carriers containing chemical entities which interact as discussed herein may be formed. In particular, the method 2670 is one example of execution of the method 2650 of FIG. 26A as a core-first method. FIG. 26E depicts example stages of the electrophoretic dispersion being formed according to the method 2670.

At block 2672, a core particle is grown (2602D of FIG. 26E). The core particle may be grown using a charge control agent which imparts a charge to the surface of the core, such as a surfactant, special charged initiator, or another charge control agent.

At block 2674, the surface of the core particle is functionalized for growth of a polymeric corona (2604D of FIG. 26E). The core particle may be made such that it has a high density of functional groups on the surface which can either be directly used to initiate a polymerization reaction from the surface (preferably a form of living polymerization such as RAFT, ATRP, NMP etc.), or can be modified to be a polymerization initiator.

At block 2676, a polymeric corona is grown from the surface of the core particle (2606D of FIG. 26E). The polymeric corona may be grown according to the techniques discussed herein.

At block 2678, the polymeric corona is functionalized with component chemical entities (2608D of FIG. 26E). The polymeric corona may be functionalized according to the techniques discussed herein.

The polymer that is grown from the surface of the charged core may include monomers that already include the component chemical entity (i.e. "pre-functionalization"), or may include monomers that contain functional groups which can be used, after polymerization of the polymeric corona, to attach the component chemical entity (i.e. "post-functionalization"). Additional monomers may be included in the corona to confer better solubility in the dispersion medium. Pre-functionalization and post-functionalization techniques may be combined. Purification may be performed as needed.

An example formulation of an electrophoretic dispersion derived from execution of the method 2670 of FIG. 26B is now described. In this example formulation, an emulsion polymerization system was utilized for production of core crosslinked polymeric particles which would then be extended with hydrophilic brushed using ATRP. The monomer addition was either performed in batch, semi-batch or in-situ seeded growth formats, each of these systems allow varying levels of control over final particle size and particle's surface functionality. A crosslinked core of Butyl Methacrylate and Ethylene Glycol Dimethacrylate (EGDMA) was synthesized using a water soluble, thermally activated, free radical initiator such as Potassium Persulfate for negatively charged particles, or 2,2'-azobis-[2-(1,3-dimethyl-4,5-dihydro-1H-imidazol-3-ium-2-yl)]propane triflate for positively charged particles. Other initiators may be used which are not charged, in which case charged surfactants or other charge-providing components must be added. The core monomers were stabilized in oil phase droplets by non-ionic surfactants such as polysorbate (Tween20, Tween 80) and polymerized inside growing surfactant micelles where monomer transfer was controlled by a concentration gradient. The reaction was conducted at a temperature between 55 C-65 C for optimum thermal initiation. The particle size was controlled to be under 60 nm and above 10 nm. Size analysis was done using DLS.

In a batch version of the core-first method Hydroxypropyl methacrylate was added simultaneously with the core monomers to attain a partial hydroxyl functionality on particle surface.

In the semi-batch and in-situ seeded versions of the core-first method Hydroxypropyl methacrylate was added after particle/seed formation to attain a dense hydroxyl functionality on the particle surface.

The particles were then gradually dialyzed out of water and monomer containing medium and into a polar aprotic solvent such as Tetrahydrofuran. Lyophilization is another example of a technique to remove water at this step. The hydroxyl functional groups on the surface of particles were then modified to a tertiary bromo functionality using $\alpha$-Bromoisobutyryl bromide, which reacts with the hydroxyl functional groups to form an ester linkage.

The resulting particle was then used as a tetherable macro-initiator for a surface-initiated ATRP (SI-ATRP) to produce water soluble Poly(glycerol monomethacrylate-co-glycidyl methacrylate) brushes extending from the hydrophobic core particle.

The SI-ATRP was conducted in a manner similar to the ICAR polymerization described earlier with a secondary free radical generator such as AIBN for the reduction of the activator species in a solvent system composed of THF, Anisole, methanol or a combination thereof.

The particles were then purified by dialysis into a polar aprotic solvent such as ethyl acetate, and concentrated by rotary evaporation. To the particles, the appropriate component chemical entity was added and allowed to react overnight. The particles were again dialyzed to remove the excess chemical entity.

Particles of one charge & component chemical entity are then mixed with their complements, and purification is performed as needed to remove counter ions.

Figure 27B:
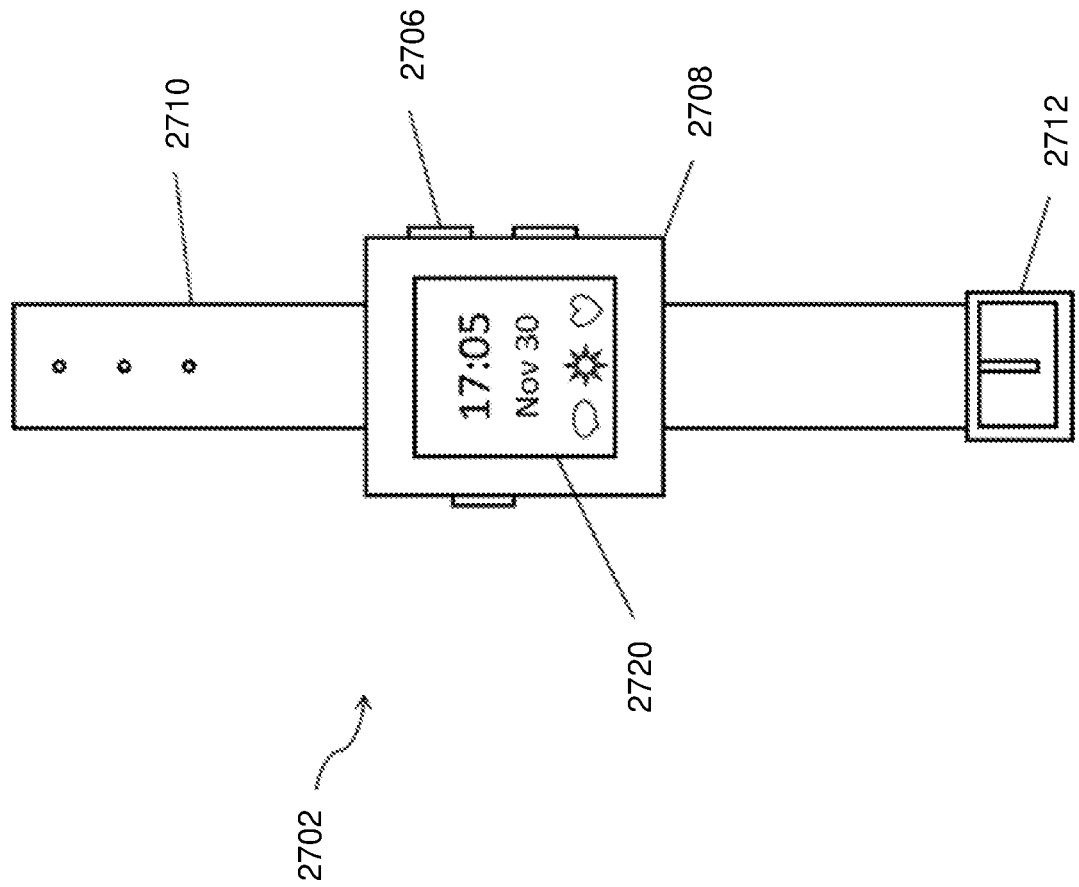
FIG. 27B is a schematic diagram of another example electrophoretic display device.
Figure 27A:
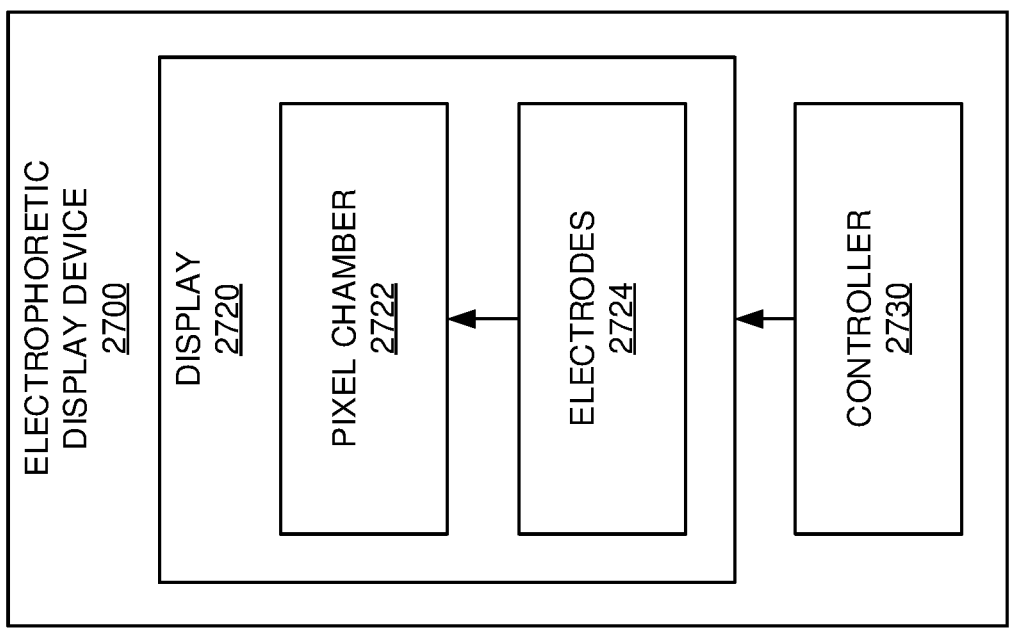
FIG. 27A is a schematic diagram of an example electrophoretic display device.

FIG. 27A shows an example electrophoretic display device 2700. The electrophoretic display device 2700 includes a display 2720. The display 2720 includes a pixel chamber 2722 to contain an electrophoretic dispersion and to convey an optical property of the electrophoretic dispersion. The electrophoretic dispersion is to contain a first chemical entity and a second chemical entity which may be induced to interact as discussed herein. The pixel chamber 2722 may be part of a colour filter as discussed herein, wherein colour filter includes several pixel chambers corresponding to pixels of the display 2720, the pixel chambers containing component chemical entities in electrophoretic dispersions. The pixels of the display 2720 create spatial contrast and can be changed over time to display images or video.

The electrophoretic display device 2700 further includes electrodes 2724 to alter an electromagnetic field passing through the pixel chamber 2722 to induce the first and second chemical entities to reversibly switch between a separated state and an optically active state to change an optical property of the electrophoretic dispersion.

The electrophoretic display device 2700 further includes a controller 2730 to control the electrodes 2724 to change the electromagnetic field to cause the pixel chamber to convey an optical property corresponding to an image to be displayed by the display 2720.

The display 2720 may include a single layer of a colour filter or multiple layers of a colour filter. Where a single layer of a colour filter is included, the display 2720 may operate as a monochromic display. Where two layers of colour filters are included, the display 2720 may operate as a polychromatic display. Two or more layers of colour filters may be provided in accordance with the multi-colour pixel unit 2180 of FIG. 21C. Where two or more layered colour filters are included, the different layers of colour filters may include different electrophoretic dispersions which cause different changes in colour. Thus, a broad range of colours may be displayed by combination of light passing through each of the colour filters. For example, where there are three layers of colour filters, one layer may include electrophoretic dispersions containing chemical entities which switch between transparent and cyan, another layer may include electrophoretic dispersions containing chemical entities which switch between transparent and magenta, and yet another layer may include electrophoretic dispersions containing chemical entities which switch between transparent and yellow. These colour changes may be achieved by any of the schemes discussed herein. Thus, the multiple layers of colour filters may be situated on top of one another to create a full-colour display. The layers of colour filters may be situated on top of a highly reflective layer which reflects light through each of the layers of colour filters.

FIG. 27B shows another example electrophoretic display device 2702. The electrophoretic display device 2702 may be similar to the electrophoretic display device 2700, and therefore may include a display 2720 including a pixel chamber and electrodes (not shown) and a controller (not shown).

The electrophoretic display device 2702 may further include a body 2708 and one or more interactive controls 2706 to interact with the information on the display 2720. The electrophoretic display device 2702 may include a strap 2710 and clasp 2712 which may be used to affix the device to a user's wrist, in a similar fashion to an ordinary watch. The electrophoretic display device 2702 may be termed a smart watch. Incorporation of an electrophoretic display as discussed herein into a smart watch may be particularly useful in high brightness environments such as outdoor environments.

Thus, it can be seen that an electrophoretic display device may be provided which may be capable of achieving a high degree of saturation and transmittance along with a high refresh rate and low power requirements. Changes in optical properties of pixels is achieved by the reversible interaction of chemical entities rather than the bulk movement of particles having fixed optical properties. Thus, the interaction of chemical entities may be used to produce images and video in display devices.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. An electrophoretic dispersion for use in an electrophoretic display, the electrophoretic dispersion comprising:
    a suspension fluid;
    a first chemical entity and a second chemical entity dispersed within the suspension fluid, wherein the first and second chemical entities are to be induced to reversibly interact to switch between a separated state and an optically active state in response to a change in an electromagnetic field passing through the electrophoretic dispersion to change an optical property of the electrophoretic dispersion;
    wherein the first chemical entity is an activatable tautomer, the second chemical entity is a stabilizer of the activatable tautomer, and the optically active state comprises the activatable tautomer being stabilized by the stabilizer, and wherein the electrophoretic dispersion comprising a polymeric corona of a charged particle to couple the first chemical entity to a block of a polymer or copolymer of the charged particle.

2. The electrophoretic dispersion of claim 1, wherein the optically active state is achieved by a reversible chemical or conformational change of at least one of the first and second chemical entities caused by the first and second chemical entities interacting.

3. The electrophoretic dispersion of claim 1, wherein the optical property is an absorption spectrum exhibited by the electrophoretic dispersion.

4. The electrophoretic dispersion of claim 1, wherein the stabilizer includes a pyridine ring to hydrogen bond with a prototropic hydrogen of the activatable tautomer.

5. The electrophoretic dispersion of claim 1, wherein:
the first chemical entity is attached to a first charged mobile carrier dispersed in the electrophoretic dispersion;
the second chemical entity is attached to a second charged mobile carrier dispersed in the electrophoretic dispersion, the first and second charged mobile carriers having opposite electrical charges; and
the change in the electromagnetic field passing through the electrophoretic dispersion separates the first and second charged mobile carriers to put the first and second chemical entities in the separated state.

6. The electrophoretic dispersion of claim 5, wherein the first charged mobile carrier comprises:
the corona of polymers to which the first chemical entity is attached, and
a charged core to provide a net charge to the first charged mobile carrier.

7. The electrophoretic dispersion of claim 6, wherein the corona of polymers comprises a block copolymer having a hydrophilic portion and a hydrophobic portion, the hydrophilic portion to be functionalized by the first chemical entity to attach the first chemical entity thereto, the hydrophobic portion to crosslink with other block copolymers in the corona.

8. The electrophoretic dispersion of claim 6, wherein the charged core comprises a hydrophobic monomer to provide stability to an interior of the charged core, a block copolymer to bind with chemical entities, a radical initiator to initiate polymerization of the charged core, and an ionic surfactant stripped of counter ions to contribute to the net charge.

9. The electrophoretic dispersion of claim 1, wherein one of the first and second chemical entities is attached to a charged mobile carrier dispersed in the electrophoretic dispersion, and the other of the first and second chemical entities is attached to an inner wall of a pixel chamber containing the electrophoretic dispersion.

10. The electrophoretic dispersion of claim 9, wherein the charged mobile carrier comprises:
a corona of polymers to which the one of the first and second chemical entities is attached, and
a charged core to provide a net charge to the charged mobile carrier.

11. The electrophoretic dispersion of claim 10, wherein the corona of polymers comprises a block copolymer having a hydrophilic portion and a hydrophobic portion, the hydrophilic portion to be functionalized by the first chemical entity to attach the first chemical entity thereto, the hydrophobic portion to crosslink with other block copolymers in the corona.

12. The electrophoretic dispersion of claim 10, wherein the charged core comprises a hydrophobic monomer to provide stability to an interior of the charged core, a block copolymer to bind with chemical entities, a radical initiator to initiate polymerization of the charged core, and an ionic surfactant stripped of counter ions to contribute to the net charge.

13. A method for producing an electrophoretic dispersion for use in an electrophoretic display of claim 1, the method comprising:
fabricating a charged polymeric core;
fabricating a polymeric corona or a precursor to the polymeric corona; and
embedding component chemical entities in the polymeric corona or precursor to the polymeric corona, the component chemical entities to exhibit a first optical property when induced by an electromagnetic field to adopt a separated state and that exhibit a second optical property when induced by an electromagnetic field to adopt an active state.

14. The method of claim 13, wherein:
fabricating the polymeric corona or precursor to the polymeric corona comprises fabricating the polymeric corona around the charged polymeric core; and
embedding component chemical entities in the polymeric corona or precursor to the polymeric corona comprises embedding the component chemical entities in the polymeric corona.

15. A method for producing an electrophoretic dispersion for use in an electrophoretic display of claim 1, the method comprising:
combining an amphiphilic block copolymer, a hydrophobic monomer, an ionic surfactant, and a radical initiator in a hydrophobic phase;
combining the hydrophobic phase with a hydrophilic phase to form a nanoemulsion including a hydrophobic droplet suspended in the hydrophilic phase and ionic surfactant coalescing around the hydrophobic droplet;
activating the radical initiator to crosslink a hydrophobic block of the amphiphilic block copolymer with the hydrophobic monomer to form a polymeric particle having a polymeric corona, the ionic surfactant imparting a charge to the polymeric corona;
combining the nanoemulsion with a lipophilic counter-ion to neutralize the charge of the polymeric particle; and
functionalizing the polymeric corona of the polymeric particle to couple a chemical entity to hydrophilic block of the amphiphilic block copolymer of the polymeric particle to form a first part of an electrophoretic dispersion, the chemical entity to be induced to interact with a complementary component chemical entity of a second part of the electrophoretic dispersion to change an optical property of the electrophoretic dispersion in response to a change in an electromagnetic field passing through the electrophoretic dispersion.

16. The method of claim 15, wherein the radical initiator is a photoinitiator, and activating the initiator comprises exposing the nanoemulsion to UV radiation.

17. The method of claim 15, wherein the radical initiator is a thermal initiator, and activating the initiator comprises heating the nanoemulsion.

18. The method of claim 15 further comprising, prior to combining the hydrophobic phase with the hydrophilic phase, adding a cosolvent to the hydrophobic phase to improve mixing with the hydrophilic phase.

19. The method of claim 15, further comprising, prior to functionalizing the polymeric corona with the chemical entity, removing excess water from the nanoemulsion by one or more of: dialyzing the nanoemulsion, solvent exchange, or application of a drying agent.

20. The method of claim 15, further comprising combining the first part of the electrophoretic dispersion with the second part of the electrophoretic dispersion.

\* \* \* \* \*